United States Patent [19]

Erwin

[11] 3,745,532

[45] July 10, 1973

[54] MODULAR DIGITAL PROCESSING EQUIPMENT

[75] Inventor: Floyd Dennis Erwin, Brea, Calif.

[73] Assignee: Hughes Aircraft Company, Culver City, Calif.

[22] Filed: May 27, 1970

[21] Appl. No.: 41,040

[52] U.S. Cl. .............................................. 340/172.5
[51] Int. Cl. .............................................. G06f 13/00
[58] Field of Search .................................. 340/172.5

[56] References Cited

UNITED STATES PATENTS

| | | | |
|---|---|---|---|
| 3,473,160 | 10/1969 | Wahlstrom | 340/172.5 |
| 3,537,074 | 10/1970 | Stokes et al. | 340/172.5 |
| 3,597,744 | 8/1971 | Case | 340/172.5 |
| 3,349,375 | 10/1967 | Seeber et al. | 340/172.5 |
| 3,411,139 | 11/1968 | Lynch et al. | 340/172.5 |
| 3,274,561 | 9/1966 | Hallman et al. | 340/172.5 |
| 3,535,694 | 10/1970 | Anacker et al. | 340/172.5 |
| 3,419,852 | 12/1968 | Marx et al. | 340/172.5 |
| 3,492,654 | 1/1970 | Fresch et al. | 340/172.5 |

*Primary Examiner*—Harvey E. Springborn
*Attorney*—James K. Haskell and Robert Thompson

[57] ABSTRACT

Modular digital processing equipment of the type that can include one or more functional characters of the type that include an input bus, an output bus, control signal input means and which can have inputs and outputs that can be connected to similar or other characters for modular expansion of the operational capabilities. The functional characters including: a modular register character which provides storage for operands of a micro-program; a general logic character that performs basic logic functions for use by the micro-program; an arithmetic logic character that provides major arithmetic functions for use by the micro-program; an input/output character that provides input/output interface to the micro-program machine; a micromemory counter character that provides micromemory address registers and related functions; a micro-instruction register that contains the micromemory word registers; and a micro-array character that contains a micromemory array.

16 Claims, 67 Drawing Figures

INVENTOR
FLOYD DENNIS ERWIN,
BY
Robert Thompson
ATTORNEY

SOURCE CODE PORTION OF CONTROL BUS

PATENTED JUL 10 1973 3,745,532

SHEET 10 OF 41

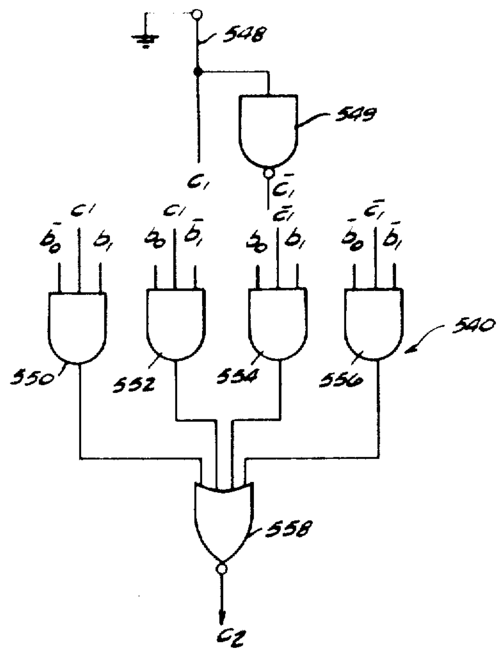
FIG. 45.
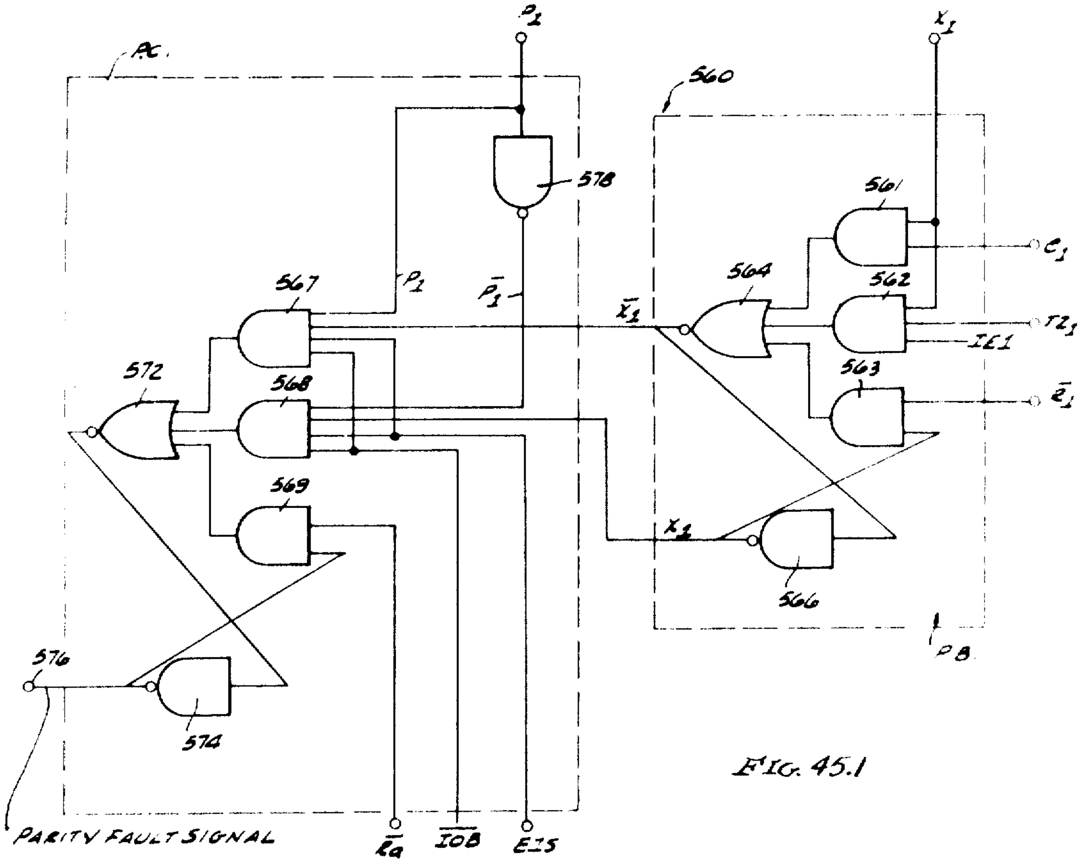
FIG. 45.1

| 1ST INSTR. TIME — DATA BUS TEST — I (INPUT) L | M | O (OUTPUT) L | M | 2ND INSTR. TIME — DATA BUS TEST — I (INPUT) L | M | O (OUTPUT) L | M | MNEMONIC | TRANSFER ACTION | ACTION TIME OF JUMP |
|---|---|---|---|---|---|---|---|---|---|---|
| 1 | - | - | - | - | - | - | - | LI | $T_1 \rightarrow$ MMC | IMMED |
| - | - | - | - | - | - | 1 | - | LO | $T_2 \rightarrow$ " | DELAYED |
| - | - | - | - | 1 | - | 0 | - | LIO | $T_1 \rightarrow$ " | " |
| - | - | - | - | 0 | - | 1 | - | LIO | $T_2 \rightarrow$ " | " |
| - | - | - | - | 1 | - | 1 | - | LIO | $T_1+T_2 \rightarrow$ " | " |
| - | 1 | - | - | - | - | - | - | MI | $T_2 \rightarrow$ " | IMMED |
| - | - | - | - | - | - | - | 1 | MO | $T_2 \rightarrow$ " | DELAYED |
| - | - | - | - | - | 1 | - | 0 | MIO | $T_1 \rightarrow$ " | " |
| - | - | - | - | - | 0 | - | 1 | MIO | $T_2 \rightarrow$ " | " |
| - | - | - | - | - | 1 | - | 1 | MIO | $T_1+T_2 \rightarrow$ " | " |
| 1 | 0 | - | - | - | - | - | - | LIMI | $T_1 \rightarrow$ " | IMMED |
| 0 | 1 | - | - | - | - | - | - | LIMI | $T_2 \rightarrow$ " | " |
| 1 | 1 | - | - | - | - | - | - | LIMI | $T_1+T_2 \rightarrow$ " | " |
| - | - | - | - | 1 | - | - | 0 | LIMO | $T_1 \rightarrow$ " | DELAYED |
| - | - | - | - | 0 | - | - | 1 | LIMO | $T_2 \rightarrow$ " | " |
| - | - | - | - | 1 | - | - | 1 | LIMO | $T_1+T_2 \rightarrow$ " | " |
| - | - | - | - | - | 1 | 0 | - | MILO | $T_1 \rightarrow$ " | " |
| - | - | - | - | - | 0 | 1 | - | MILO | $T_2 \rightarrow$ " | " |
| - | - | - | - | - | 1 | 1 | - | MILO | $T_1+T_2 \rightarrow$ " | " |
| - | - | - | - | - | - | ALL BITS ZERO | | ZO | $T_2 \rightarrow$ " | " |
| - | - | - | - | 1 | - | NOT ALL ZERO | | ZOLI | $T_1 \rightarrow$ " | " |
| - | - | - | - | 0 | - | ALL ZERO | | ZOLI | $T_2 \rightarrow$ " | " |
| - | - | - | - | 1 | - | ALL ZERO | | ZOLI | $T_1+T_2 \rightarrow$ " | " |
| - | - | - | - | - | 1 | NOT ALL ZERO | | ZOMI | $T_1 \rightarrow$ " | " |
| - | - | - | - | - | 0 | ALL ZERO | | ZOMI | $T_2 \rightarrow$ " | " |
| - | - | - | - | - | 1 | ALL ZERO | | ZOMI | $T_1+T_2 \rightarrow$ " | " |

FIG. 52

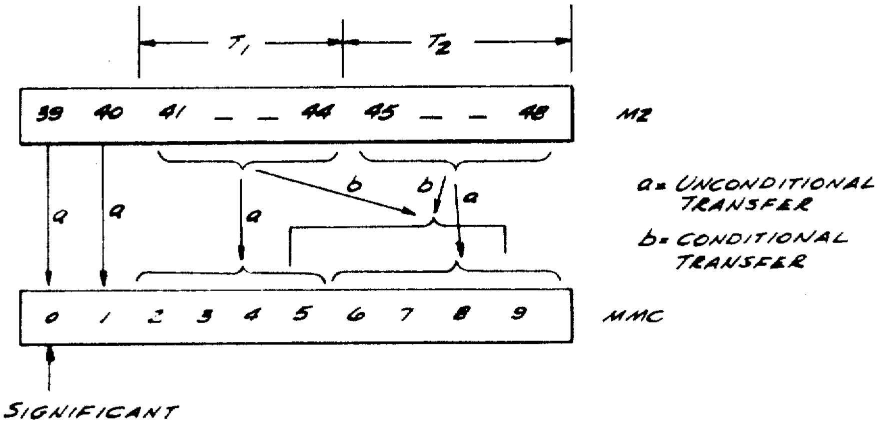

Φ = BUS(OUTPUT)
Φ1 = LSB
Φ2 = MSB
b = BUS(INPUT)
b1 = LSB
b2 = MSB

BASIC MICROMEMORY

MODULAR DIGITAL PROCESSING EQUIPMENT

BACKGROUND OF THE INVENTION

This invention relates generally to digital devices and relates more particularly to expandable, modular digital computer devices.

Generally, digital computers can be utilized for many different operations. These different operations can all require different performance, function, and sizes for generally efficient operation of the computer. For example, the computer can be inefficient if it is too small for the intended operation, too large, or its architecture might not be suitable for the intended operation.

Heretofore, modular digital computers have generally been arranged and fabricated such that if the capability of the computer were to be increased or decreased, or its function changed, it was necessary to reconfigure the logic and circuitry in accordance with the capability desired. Although this reconfiguration approach can be desirable if many units are to be produced, it might not be economically justified where only a few computers of the desired type are fabricated. In addition, very unlike the situation where multiple whole central processors and memory units are functionally coupled together at a single large computer facility to obtain efficient operation, if less than a whole computer is needed, or less than a large control processor, etc. is needed, it would not be efficient to use a portion of a whole computer where only a portion of the capabilities are needed.

An object of this invention is to provide modular digital computer devices whch can be utilized to fabricate different size and function digital machines, including digital computers.

Other objects of this invention can be attained with the provision of modular functional characters of a type each having associated therewith an input bus, an output bus, control signal receiving means, and which can selectively have input and output means associated with other functional characters of the same or different types and which can functionally cooperate with the other characters to provide expandable operational capabilities in the functional characters.

Specifically, one module is a register storage character which provides the bulk of storage for operands of the micro-program. This character contains a plurality of registers of n bits each accompanied by reading and writing selection gates and can additionally have simultaneous dual reading and writing capability so that the digital signal from one or more input busses can be stored and read out on one or more output busses in response to decoded control signals.

A general logic character provides the basic logic functions selectable by the micro-program. Input bussing is provided for a plurality of n bit wide channels each of which can be associated with a separate other character. Logic functions that can be performed include any or all of the operations of rotate, shift (logical), no-operation, complement and incrementation in response to logic control signals operably provided by decoding logic. In addition, least significant bits and most significant bits outputs can be coupled to other similar general logic characters.

An arithmetic logic character provides the major arithmetic functions used by the micro-program. The arithmetic logic character is responsive to control signals applied to decoder logic to perform one or more of the functions: 2's complement; sum of the contents of an A and B register using addition with carry look ahead byte parallel; or alternatively to provide a mode 2 addition instead of 2 full addition or an input carry to the lowest order bit for full addition (this forced carry in conjunction with a negated operand also accomplishes a 2's complement operand for subtraction). Structurally, the arithmetic logic character includes two holding registers for the operands of the adder, the adder itself, decoding logic, and a bussing gate.

An input/output character provides input/output capabilities for the micro-program machine not only for the usual peripherals but also for main memory scratch pads and real time clocks. Operationally, the input/output character can provide for external devices including buffered and non-buffered channels. Buffer input gating can be controlled either by the external program or the input-output device itself. External storage for some of the channels is available and parity functions with odd/even control provided for some of the channels. In addition, destination and selection decoding logic is responsive to control signals for selecting the I/O channels.

A control unit includes a micromemory counter character, a micro-array character, and a micro-instruction character.

The micromemory counter character provides the micromemory address register and related functions. The $x$ address bits of the character allows addressing up to $2^x$ micromemory words. The addresses contained in a micromemory counter register serves to address the micromemory proper. A $y$ bit incrementer (where $y$ is less than $x$) automatically steps through $2^y$ micromemory address states and then repeats addresses in a micro-program ring until the micro-program issues an unconditional transfer command. In addition, a save register allows for subroutine jumps and saves the contents of the micromemory counter upon command keeping it available for reinsertion into the micromemory counter. Branching or transferring in the micromemory is provided by 2 modes: unconditional transfer of $x$ bits width; and conditional transfers of $z$ bits width where $z$ is less than $x$.

The micro-array character contains the micromemory array. The address register for accessing the micromemory array can be located in the micromemory counter character and the word register can be located in the micro-instruction register character. The micro-array character is a read only array and the presence of an address on the input lines causes the contents of the referenced location to appear on the output lines after an appropriate delay. Several micro-array characters can be combined to form a larger micromemory array.

The micro-instruction register character contains a micromemory word register. The register is one full micromemory word long divided into two insruction fields and a constant field. In operation, the two instruction fields are transferred into the register location of the first instruction field during a second time period resulting in sequential expansion of two instructions in the micromemory word.

The above indicated modular digital characters have numerous advantages. For example, fabricated computers can be expanded by word length expansion, functional expansion, parallel computation expansion, and multicomputation expansion. In addition, the modular digital characters are versatile in that they can be used to fabricate different digital devices ranging from simple operating requirements to complex operating requirements by means of only a limited number of standard modular characters. This eliminates the users need to become deeply involved with logic design and the limited number of characters permits a low inventory of off-the-shelf devices since the same character can be used numerous times and in numerous different machines. Furthermore, standard interconnects can be used between the modules thereby eliminating the need to know the specific character interconnects and can lead to complete design automation. Still further, the modular characters have the advantage that the computer can be diagnosed to isolate a malfunctioning component which can be removed and replaced in a facile manner. These advantages have the attendant advantage of low cost.

BRIEF DESCRIPTION OF THE DRAWINGS

Other features, objects, and advantages of this invention would become apparent upon reading the following detailed description and referring to the accompanied drawings wherein:

FIG. 4 is a graph illustrating timing waveforms associated with the micromemory register storage character of FIG. 3;

FIG. 23 is a block diagram illustrating 3 byte modulator expansion using three general logic characters L1;

FIG. 45 is a logic diagram illustrating in detail one stage of the parity error checking circuit of FIG. 44 and FIG. 45.1 is a logic diagram illustrating in detail one of the parity check comparison circuits of FIG. 44;

FIG. 52 is a graphical table illustration of a transfer address relationship for unconditional transfers (a) and conditional transfers (b);

DESCRIPTION OF THE PREFERRED EMBODIMENTS

Figure 1:
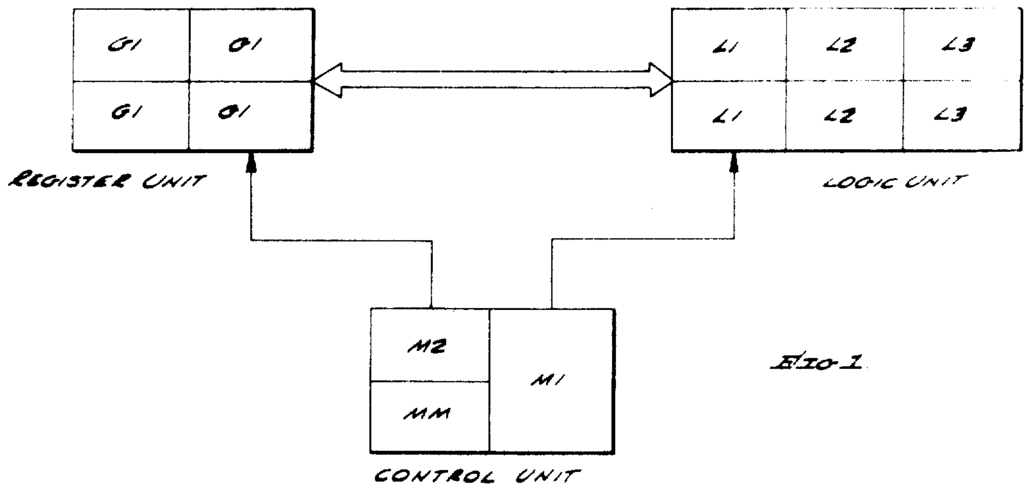
FIG. 1 is a block diagram illustrating an exemplary digital device including a register unit, a logic unit, and a control unit all fabricated from different ones of the modular digital characters.

Referring to the drawings in more detail, FIG. 1 illustrates a typical functional configuration of a digital system using a plurality of standard building block elements defined as characters. For example, the digital system includes: a register unit having one or more micromemory register storage characters G1; a logic unit having general logic characters L1, arithmetic characters L2, and input/output characters L3; and a control unit having a micromemory counter character M1, a micro-instruction register character M2, and a micro-array character MM.

As can be seen from FIG. 1 and as will become more apparent as the system is described in more detail, a plurality of expandable digital systems can be fabricated from the seven characters referred to above. The expansion can be of four different types. For example, the characters are capable of word length expansion, functional expansion, parallel computation expansion, and multicomputation expansion. Thus, it will be seen that there is little limit to the expansion of the digital systems using the particular characters.

Before describing the details of the characters, the micromemory word utilized by the system has been arbitrarily selected to be a double word 100 bits long. This word is divided into two identical words each including the bits $b_0$ through $b_{49}$ and $b_{50}$ through $b_{99}$, respectively. One of the words, including bits $b_0$ through $b_{49}$, operates upon and through one logic unit while the other word of bits $b_{50}$ through $b_{99}$ operates upon and through any expansion second logic unit as will be explained in more detail subsequently. It should be understood that additional words could be used in larger systems and that other word lengths could be used.

Since each word is identical, only the word, including the bits $b_0$ through $b_{49}$ (FIG. 2*a*), will be explained in detail with respect to one logic unit. Assuming then that the micromemory word can be 50 bits long, the word including the bits $b_0$ through $b_{49}$ is composed of two 16 bit fields and a 17 bit field, plus one parity bit. For example, bits $b_0$ through $b_{15}$ comprise a first instruction field, bits $b_{16}$ through $b_{31}$ comprise a second instruction field, bits $b_{32}$ through $b_{48}$ include a constant field and bit $b_{49}$ a parity bit. The first and second instruction fields are substantially identical differing only in that execution of the second instruction follows the first instruction by one-half a cycle time where a cycle time is the time required for a complete cycle of the micromemory. As will be explained in more detail subsequently, the instruction fields can access the constant field introducing into the data stream this constant from the micromemory. At those times when the constant field is not used as such, it takes on additional capabilities such as trasnfer and machine control fields.

Figure 2A:
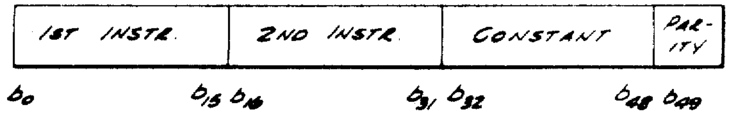
FIGS. 2a through 2c are graphical illustrations of: a micromemory word; one of the instruction fields of the micromemory word; and the constant and the machine control field of the micromemory word.
Figure 2B:
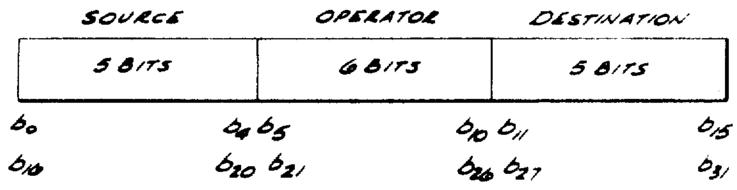

Each of the two identical instruction fields, including the bits $b_0$ and $b_{15}$ and bits $b_{16}$ through $b_{31}$, respectively, are further divided into three sub-fields as illustrated in FIG. 2*b*. For example, the bits $b_0$ through $b_4$ of the first instruction field and the bits $b_{16}$ through $b_{20}$ of the second instruction field comprise five bit source sub-fields that specify, either directly or indirectly, the source of information from a microcommand. The bits $b_5$ through $b_{10}$ of the first instruction field and the bits $b_{21}$ through $b_{26}$ of the second instrucion field comprise six bit long operator sub-fields that specify the type of operation the micro-instruction involves. The bits $b_{11}$ through $b_{15}$ of the first instruction field and the bits $b_{27}$ through $b_{31}$ of the second instruction field comprise five bit long destination sub-fields that specify directly the register to receive the instruction results. With the instruction field now in mind, reference will subsequently be made to particular modular characters utilized to fabricate expandable digital systems.

Figure 2C:
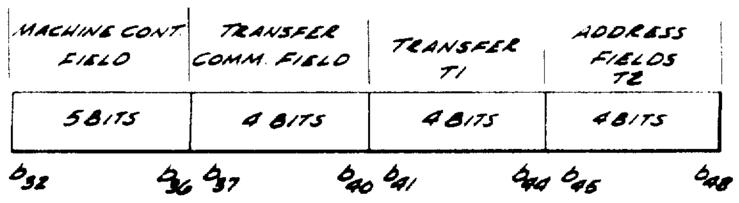

As illustrated in FIG. 2*c*, bits $b_{32}$ through $b_{36}$ comprise a 5 bit machine control field that defines a plurality of active codes which control various machine operations executed simultaneously with the actions defined in the two instruction fields. Only one of the various machine operations may be defined for any given word except when an extended machine control field is specified as will be explained by example subsequently.

Transfer bits $b_{37}$ through $b_{48}$, illustrated in FIG. 2*c*, are the transfer fields that allow for micro-program specification for both conditional and unconditional transfers within the micro-program. Bits $b_{37}$ through $b'$are a 4 bit transfer command field. Bits $b_{41}$ through $b_{44}$ are a 4 bit transfer address field $T_1$; bits $b_{45}$ through $b_{48}$ are a 4 bit transfer address field $T_2$.

MICROMEMORY STORAGE CHARACTER G1

Figure 3:
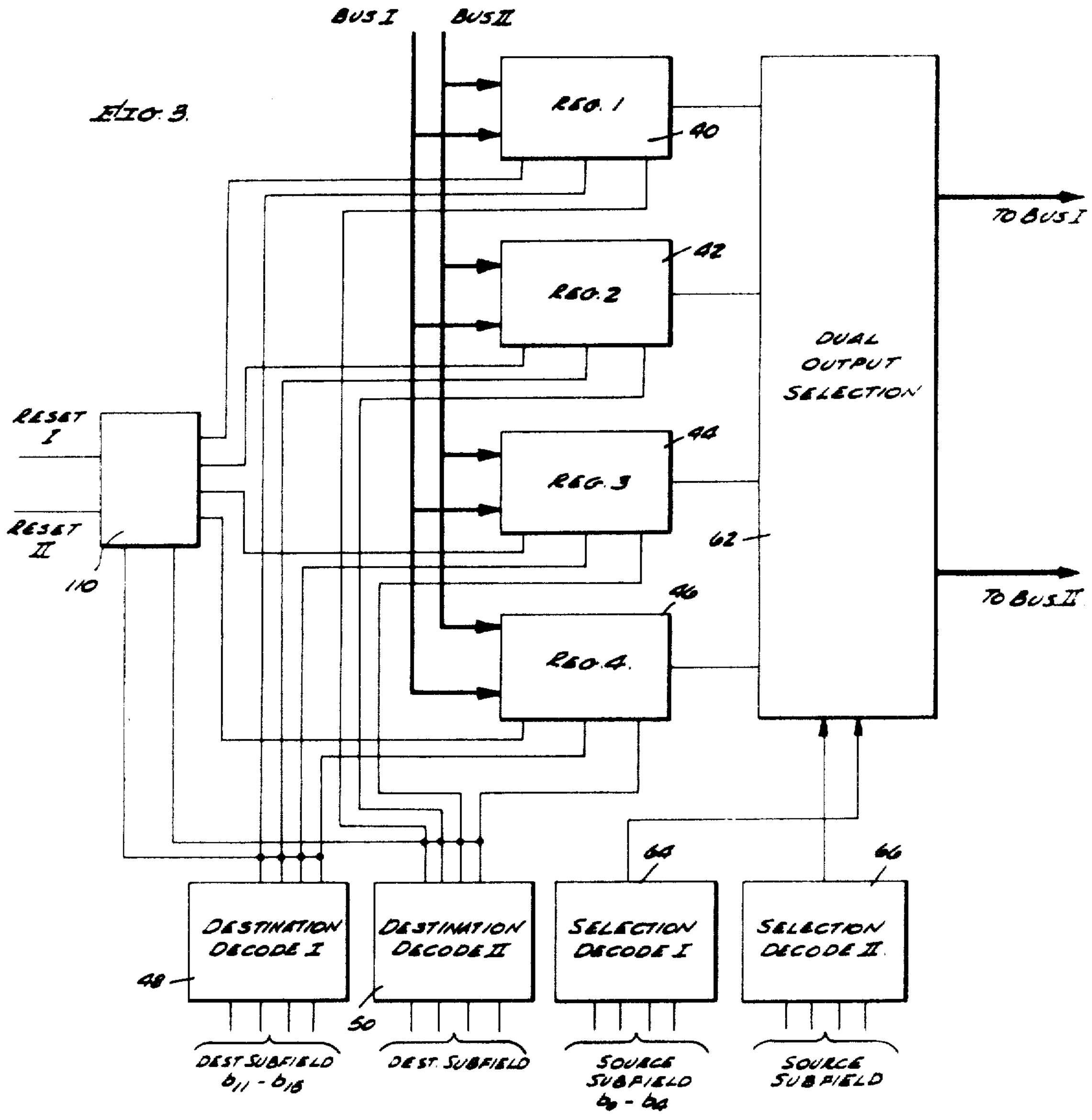
FIG. 3 is a block diagram illustrating a micromemory register storage character of the type used in the register unit of FIG. 1.

Referring to the block diagram of FIG. 3 and the timing diagram of FIG. 4, the micromemory register storage character G1 provides the bulk of storage for operands of the micro-program. Each register storage character G1 contains four eight bit registers 40, 42, 44, and 46 controllable by two independent sources. Two input busses BUS I and BUS II are capable of simultaneously feeding two eight bit parallel words received from general logic characters L1 to four registers 40, 42, 44, and 46 wherein the two words can be simultaneously written into two of the selected registers in response to two destination sub-field bits $b_{11}$ through $b_{15}$ received from two micro-instruction register characters M2 (FIG. 1). The data stored in these two registers can be selectively read out and fed to the general logic unit L1 (FIG. 1) on a first output BUS I or a second output BUS II in response to two sets of source sub-field bits $b_0$ through $b_4$ received by the micromemory register storage character G1.

Prior to storage of the eight bit words in the two selected registers, these two registers only are cleared in response to reset signals RESET I and RESET II received from up to two micro-instruction register characters M2 as will be explained in more detail subsequently. As will also be explained in more detail subsequently, the data received on input BUS I and BUS II can be operated on by a general logic character L1 before it is loaded into the micromemory register storage character G1.

Figure 5:
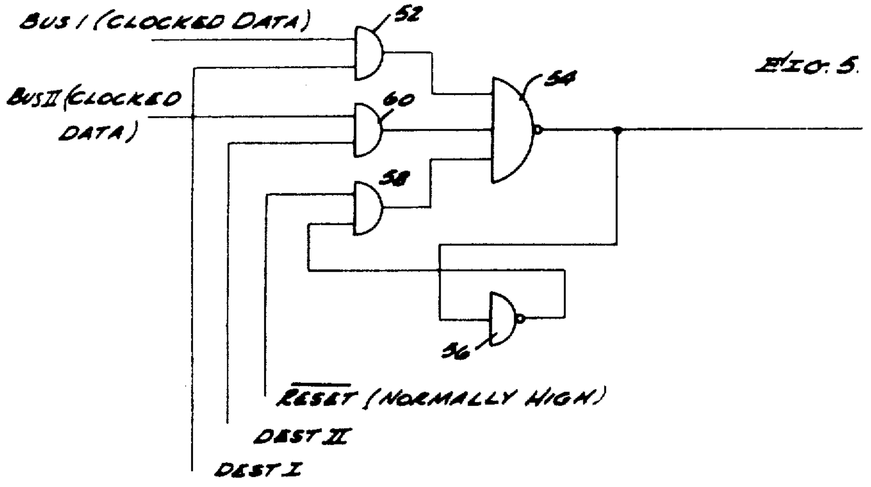
FIG. 5 is a graph illustrating a typical stage in any one of the registers of the micromemory register storage character of FIG. 3.
Figure 5:
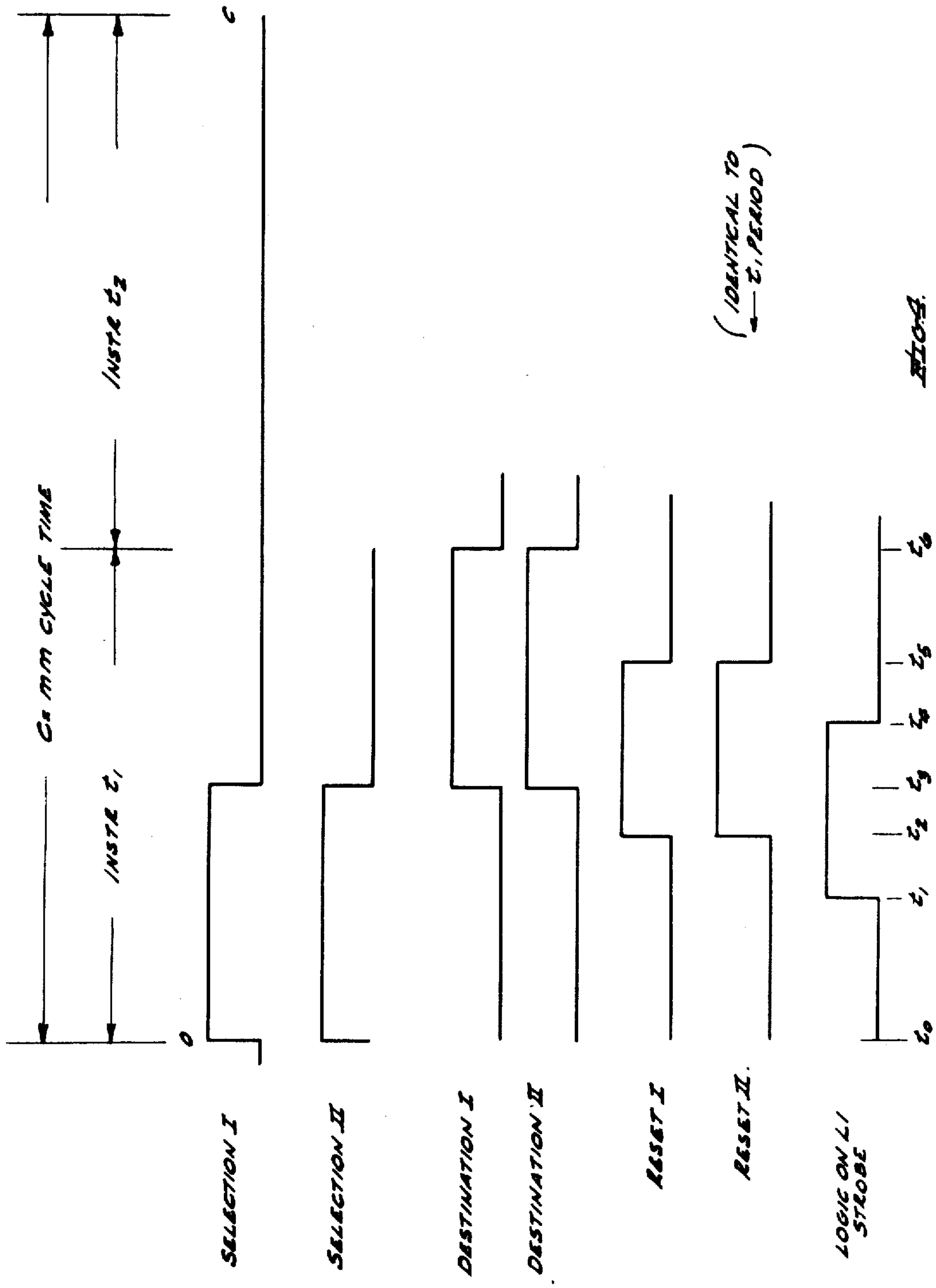

Referring now to the details of the micromemory register storage character G1, it will be assumed that at the time $t_0$ of FIG. 4 data has been previously stored in two of the registers 40 through 46. Structurally each of these registers includes eight parallel storage flip-flops of the type illustated in FIG. 5 operable for short read after write delay. Each of these eight flip-flops are connected to simultaneously receive a different significant data bit of the eight bit input word from input BUS I or input BUS II in the form of clocked data. It should be noted that the BUSSES are all 8 bit wide parallel sets of conductors throughout the embodiments illustrated. Writing is accomplished by resetting the flip-flops before set. For example, assuming the digital signals are binary and that a binary ONE is of a more positive voltage level than a binary ZERO, then if BUS I is to be selected a control signal DEST I from the destination decoder I 48 (FIG. 3) goes to a more positive voltage level relative to its other level. Hereinafter, when a voltage level goes to a more positive voltage level it will also be referred to as going high and when a voltage level goes to a more negative voltage level it will be referred to as going low.

Accordingly, if a ONE clocked data bit on BUS I and a high DEST I control signal are received in coincidence by AND gate 52 of the flip-flop, its output goes high and is fed to common NOR gate 54. Thus, since NOR gate 54 receives at least one high input signal, its output goes low to provide a binary ONE storage output signal in complemented form. In order to store this bit, the low output of NOR gate 54 is fed back through a NAND gate 56 causing the NAND gate's output to go high. Before writing is to be accomplished, the $\overline{\text{RESET}}$ signal must be low whereupon the output from AND gate 58 is low. Thereafter, the $\overline{\text{RESET}}$ signal goes high. The high output from NAND gate 56 and the normally high $\overline{\text{RESET}}$ signals are applied to AND gate 58 causing its output to go high. This high output is fed to another input of the common NOR gate 54 whereupon, if the clock data pulse from the input BUS I is terminated, the output of NOR gate 54 remains low.

Where a ZERO or low clocked data bit is received on selected input BUS I and fed to AND gate 52, its output goes low. In addition, the DESTINATION II signal for selecting BUS II is low if BUS II is not also selected whereupon the output of AND gate 60 is also low. Since all of the inputs to NOR gate 54 are low, its output goes high to provide a binary ZERO storage output in complemented form. This output is fed back to NAND gate 56 whereupon its output goes low. This low output is fed back to the AND gate 58 to maintain the output thereof low when the $\overline{\text{RESET}}$ signal goes to its normally high level.

Similarly, if the clocked data bit on input BUS II is selected the DESTINATION II signal for selecting BUS II received from destination decoder II circuit 50 goes high and the DESTINATION I signal remains low. As a result, any clocked data bit on BUS II will determine the level of the output signal of AND gate 60 whereupon a low ONE storage output signal or a high ZERO storage output signal in complemented form are produced on the output terminal of NOR gate 54 in the same manner as was described with reference to the operation of AND gate 52 for data bits on BUS I.

Similarly, the data bits on BUS I and BUS II can be simultaneously loaded into the registers in response to simultaneous destination control signals DEST I and DEST II.

Thus, the information stored in parallel on the eight storage flip-flops of two of the registers 40, 42, 44, and 46 is read by a dual output selection circuit 62 (FIG. 3) and simultaneously fed to general logic characters L1 on the two output busses, BUS I and BUS II respectively, in response to a selection signal decoded from the SOURCE sub-field received from the micro-instruction register character M2.

More specifically, a selection decoder I circuit 64 receives the bits $b_0$ through $b_4$ of the SOURCE sub-field (FIG. 2*b*), decodes them, and produces a SELECTION I control signal that is fed to the dual output selection circuit 62. More specifically, the selection decoder circuit 64 can be of the type illustrated in FIG. 6 wherein the bits *b*0 through *b*4 of the SOURCE sub-field are selectively fed through a decoding matrix to four parallel NOR gates 66, 68, 70, and 72. These NOR gates produce the one out of four SELECT signals that are fed to the dual output selection circuit 62 (FIG. 3). As will be explained in more detail subsequently, the two bits $b^*_1$ and $b^*_2$ can have one of four possible combinations of true and false levels $b_1$, $\bar{b}_1$ and $b_2$, $\bar{b}_2$ so that only one micromemory storage character G1 is enabled to feed data to a general logic character L1 at any one instant of time when there are up to four micromemory register storage characters G1(A), G1(B), G1(C), and G1(D) connected in parallel circuit relationship if there is expansion of the number of registers.

The other two bits $b_3$ and $b_4$ of the source sub-field selectively determine which register of registers 40 through 46 will be read out on output BUS I and the data fed to the general logic character L1. Thus, assuming that the micromemory register storage character G1 of FIG. 3 is the micromemory register storage character G1(A) selected by the bits $\bar{b}_1$ and $\bar{b}_2$, all of the parallel NOR gates 66 through 72 (FIG. 6) receive three low input signals out of the five inputs thereto. The other two input signals $b_3$ and $b_4$ are each selectively fed directly to two selected ones of the NOR gates 66 through 72 through the decoding matrix and are inverted by the NAND gates 74 and 76 before being selectively fed to the other two out of the four NOR gates 66 through 72. As a result, one out of the four NOR gates 66 through 72 produce a SELECT control signal in accordance with the logic equations illustrated on the output line.

When the micromemory storage character G1 is to be utilized for parallel expansion or dual operation, the SOURCE sub-field bits $b_0$, $b^*_2$, $b_3$, and $b_4$ from the second micromemory word are received by selection decoder II circuit 66 to produce the one out of four SELECT signals in the same manner that the previously described selection decoder I circuit 64 does.

The SELECT signals from the two selection decoder 64 and 66 circuits are fed to the dual output selection circuit 62 either independently or simultaneously depending upon the degree of expansion required.

Figures 7A, 7B, 8:
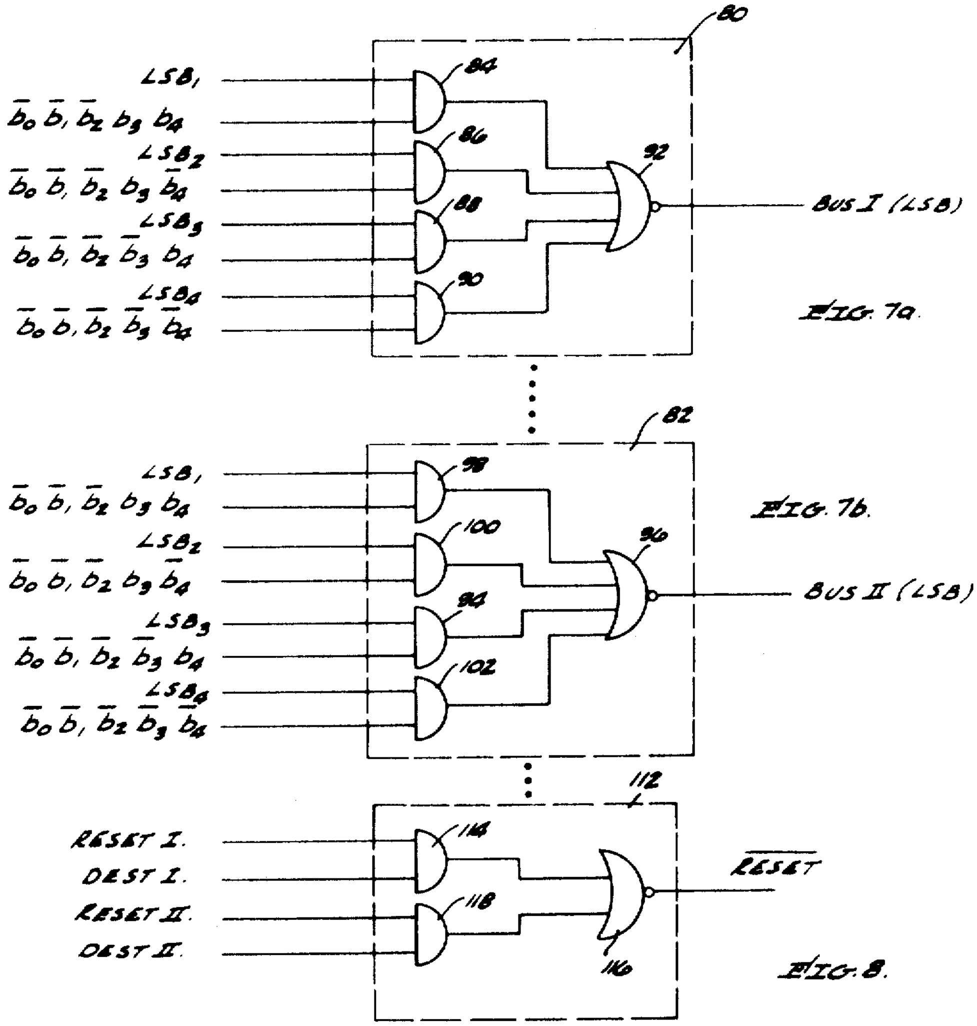
FIGS. 7a and 7b are stages associated with a single bit of the dual output selection circuit utilized in the micromemory storage character illustrated in FIG. 3, each of which is associated with a separate bus.
FIG. 8 is a logic diagram illustrating the reset logic utilized in the micromemory storage character illustrated in FIG. 3.

The dual output selection circuit 62 (FIG. 3) is responsive to the SELECT signals for placing data from one or two of the registers 40 through 46 on one or two of the two output busses BUS I and BUS II. The dual output selection circuit 62 includes 16 parallel gate circuits, two of which 80 and 82 are illustrated in FIGS. 7*a* and 7*b*. A first set of eight of these gate circuits, including gate circuit 80 of FIG. 7*a*, has input terminals coupled to all four of the registers 40 to 46 and output terminals coupled to separate ones of the parallel conductors of output BUS I. A second set of the other eight of these gate circuits, including gate circuit 82 of FIG. 7*b*, has their inputs coupled to all four registers 40 through 46 and their outputs coupled to separate ones of the parallel conductors of output BUS II.

The individual gate circuits are each associated with the same significant bit of all four registers 40 through 46 from the most significant bit MSB to the least significant bit LSB. For example, the gate circuit 80 illustrated in FIG. 7*a* could be coupled to receive the least significant bit LSB from all four registers 40 through 46 while each of the other seven parallel gate circuits (not shown) would each be respectively coupled to receive the next most significant bits NMSB on up through the most significant bit MSB from the four registers.

Similarly, the gate circuit 82 of FIG. 7*b* could also be coupled to receive the least significant bit LSB from all four registers 40 through 46 and the other parallel gate circuits (not shown) would each be respectively coupled to receive other ones of the next most significant bits NMSB on up through the most significant bit from these registers 40 through 46.

Figure 6:
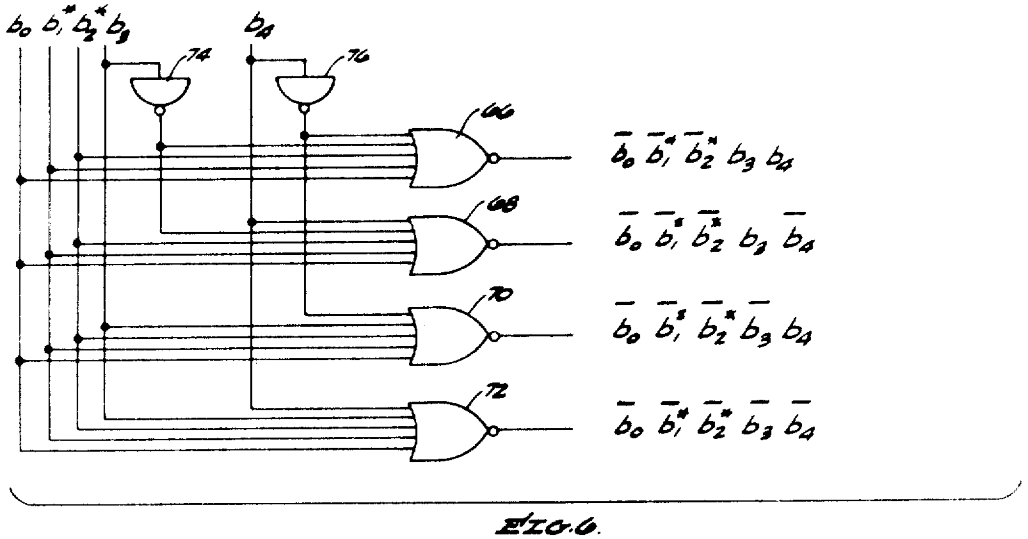
FIG. 6 is a logic diagram illustrating a selection decoder of the type utilized in the micromemory storage character of FIG. 3.

Thus, assuming that the data on register 40 is to be read and fed on BUS I to a general logic character L1 it can be seen with respect to the least significant bit LSB, that the gate circuit 80 would receive the selection signal $\bar{b}_0 \cdot \bar{b}_1 \cdot \bar{b}_2 \cdot b_3 \cdot b_4$ from the selection decoder I circuit 64 of FIG. 6 at AND gate 84 along with the least significant bit of register 40 $LSB_1$. As a result, the output of AND gate 84 will go high or low depending upon whether the output signal from the LSB storage flip-flop (FIG. 5) is high or low. If the least significant bit LSB from the storage flip-flop is a complementary ZERO or high, the output of AND gate 84 goes high. Thus, with one high input to NOR gate 92 its output goes low to produce a binary ZERO output signal on the least significant bit line of BUS I. Conversely, a complementary ONE which is low will cause the output of AND gate 84 to stay low. Since all of the other selection signals fed to other parallel AND gates 86, 88, and 90 are also low, all of the outputs from the AND gates will be low. Thus, when NOR gate 92 receives all low signals its output goes high to produce a high signal or ONE on the least significant bit line of BUS I.

Since the select signal $\bar{b}_0 \cdot \bar{b}_1 \cdot \bar{b}_2 \cdot b_3 \cdot b_4$ is also fed to an AND gate similar in function to AND gate 84 associated with each of the seven next most significant bits in the set of gate circuits associated with gate circuit 80, the seven next most significant bits NMSB from register 40 will be similarly fed on seven parallel lines associated with seven parallel NOR gates of the type operationally identical to NOR gate 92 to BUS I and then to the general logic character L1.

As previously stated, the gate circuit 82 of FIG. 7b that receives the least significant bit LSB from the four registers 40 through 46 has its output associated with the least significant bit line of the output BUS II. Thus, if the register 44 is selected to be read either simultaneously with register 40 or independently thereof, the least significant bit $LSB_3$ from register 44 is fed to AND gate 94 of gate circuit 82 along with the SELECT signal $\bar{b}_0 \cdot \bar{b}_1 \cdot \bar{b}_2 \cdot \bar{b}_3 \cdot b_4$ from the selection decoder II 66 whereupon the output of AND gate 94 will go high if a ZERO is received and low if a ONE is received. NOR gate 96 is coupled to receive the outputs from the parallel AND gates 94, 98, 100, and 102 so that its output goes high if all of the inputs from the four AND gates are low and its output goes low if any one or more of the inputs from an AND gate is high. As a result, a high output from AND gate 94 will cause the output of NOR gate 96 to go low to represent a binary ZERO for the least significant bit line on output BUS II. If, however, a low storage $LSB_3$ is received from register 44 by AND gate 94, the output of NOR gate 96 goes high in response to the output of AND gate 94 representing a ONE on the least significant bit line of output BUS II. Similarly, the other seven next most significant bits of register 44 are fed to the other seven parallel gate circuits associated with the set including gate circuit 82. As a result, all bits from register 44 are fed on output BUS II to a second general logic character L1.

From the above discussion can be seen that the G1 micromemory register storage character G1 is expandable.

As will be explained subsequently in more detail, several of the micromemory register storage characters G1 can be placed in parallel circuit relationship to provide registers of more than 8 bits in length. For example, four micromemory register storage characters G1(A), G1(B), G1(C), and G1(D) connected in parallel and fed to a bussing gate in the general logic character L1 will provide a 4 byte register 32 bits long. Thus, when four sets of the 32 bit register configuration are bussed together storage of 512 bits is provided. In other words, 16 registers, each 32 bits long, is a total of 512 bits. For this configuration, 16 micromemory register storage characters G1 would be required. It should, of course, be understood that other byte lengths other than 8 bits could be fabricated.

Referring back to the timing diagram of FIG. 4, at time $t_1$ the OPERATOR sub-field (FIG. 2*b*) is fed to the general logic character L1 receiving the data on the output bus, BUS I. If expanded, a second L1 receives data on output BUS II, and responds to an operator field received from a second micro-instruction register character M2. The bussed word can be operated upon by the general logic character L1. At a starting time $t_2$, reset signals, RESET I and RESET II, are received from up to two micro-instruction register characters M2 by a reset circuit 110 (FIG. 3) so that those registers of registers 40 through 46 that are to receive the operated upon word on input BUS I and input BUS II are cleared prior to writing.

More specifically, the reset circuit 110 includes four logic circuits 112 each of the type illustrated in FIG. 8 connected in parallel relationship. Each of the logic circuits 112 includes a first AND gate 114 that is coupled to receive the RESET I signal and the destination control signal DEST I from the destination decoder I 48 so that, upon coincidence, its output goes high. A NOR gate 116 is coupled to receive the output signal from AND gate 114 and an output signal from a second parallel AND gate 118 which is in turn coupled to receive the RESET II signal and the destination signal DEST II from destination decoder II circuit 50. When either or both of these signals are high, the output $\overline{\text{RESET}}$ of NOR gate 116 is low and is used to reset a selected one of the registers 40 through 46.

Normally, however, there is no coincidence between the RESET I and RESET II signals and the DEST I and DEST II signals respectively, whereupon the outputs of AND gates 114 and 118 are both low and the output $\overline{\text{RESET}}$ of NOR gate 116 is high. Thus, a high $\overline{\text{RESET}}$ signal from gate circuit 112 is the normal condition thereof whereupon the low $\overline{\text{RESET}}$ signal is used to reset the selected register 40 through 46. The outputs from four gate circuits of the type illustrated in FIG. 8 are fed to four individual ones of the four registers 40 through 46. All eight parallel storage flip-flops of the type illustrated in FIG. 5 in each register receive the $\overline{\text{RESET}}$ signal so that they can be cleared prior to writing the operated upon data received on input BUS I or input BUS II.

The destination decoder I circuit 48 and destination decoder II circuit 50 are each responsive to the DESTINATION sub-field bits $b_{11}$, $b^*_{12}$, $b^*_{13}$, $b_{14}$, and $b_{15}$ in each micromemory word received from the microinstruction register character M2 so that one of the register 40 through 46 is selected to store the word received on input BUS I while another one of the registers 40 through 46 is selected to store the word received on input BUS II. The destination decoder circuits 48 and 50 are substantially similar in structure to the selection decoder illustrated in FIG. 6 so that a destination signal DEST I or DEST II is produced on one of the four outputs in response to the destination subfield signal. Similarly, the bits $b^*_{12}$, and $b^*_{13}$ have four possible combinations of true $b_{12}$ and $b_{13}$ and false $\bar{b}_{12}$ and $\bar{b}_{13}$ states for selecting one out of four parallel micromemory register storage characters G1 for operation at one instant of time when up to four characters G1(A), G1(B), and G1(C), and G1(D) are connected in parallel.

Thus, if register 42 is selected to receive the data on input BUS I, the DEST I signal from destination decoder I circuit 48 is simultaneously received by all eight parallel storage flip-flops (FIG. 5) in that register so that the eight parallel bits of clocked data can be stored therein. Similarly, if register 46 is selected to receive the data on input BUS II, the DEST II signal from destination decoder II circuit 50 is fed to all eight storage flip-flops simultaneously so that the eight bits of clocked data can be stored therein any time after the time $t_3$.

At the time $t_4$ the OPERATOR sub-field fed to general logic characters L1 terminates and the operated upon data is fed back to the micromemory register storage character G1 on input busses, BUS I and BUS II. Then, at time $t_5$, the signals, RESET I and RESET II, terminate and the $\overline{\text{RESET}}$ signals fed to the selected registers 42 and 46 go to their normally high level. As a result, the data on BUS I can be stored in register 42 and the data on input BUS II can be stored on register 46 until the end of the micromemory half cycle at time $t_6$. During the second half of the micromemory cycle, the timing is substantially the same and the second INSTRUCTION field in each micromemory word can be operated upon in the above described manner.

It should, of course, be stated at this time that there is no need to use both busses and the dual operation capabilities of the micromemory register storage character G1 unless there is a suitable expansion on the digital system. For example, it would be fully possible to use the 50 bit micromemory word $b_0$–$b_{49}$, destination decoder I 48, selection decoder I 64, and RESET I circuit 110 so that input BUS I and output BUS I are the only busses used. As a result, only one of the registers 40 through 46 would be: loaded during any one instant of time on output BUS I, fed to a single general logic character L1, and fed back in the input BUS I.

TYPES OF MODULAR EXPANSION OF MICROMEMORY REGISTER STORAGE CHARACTER G1

Figure 9:
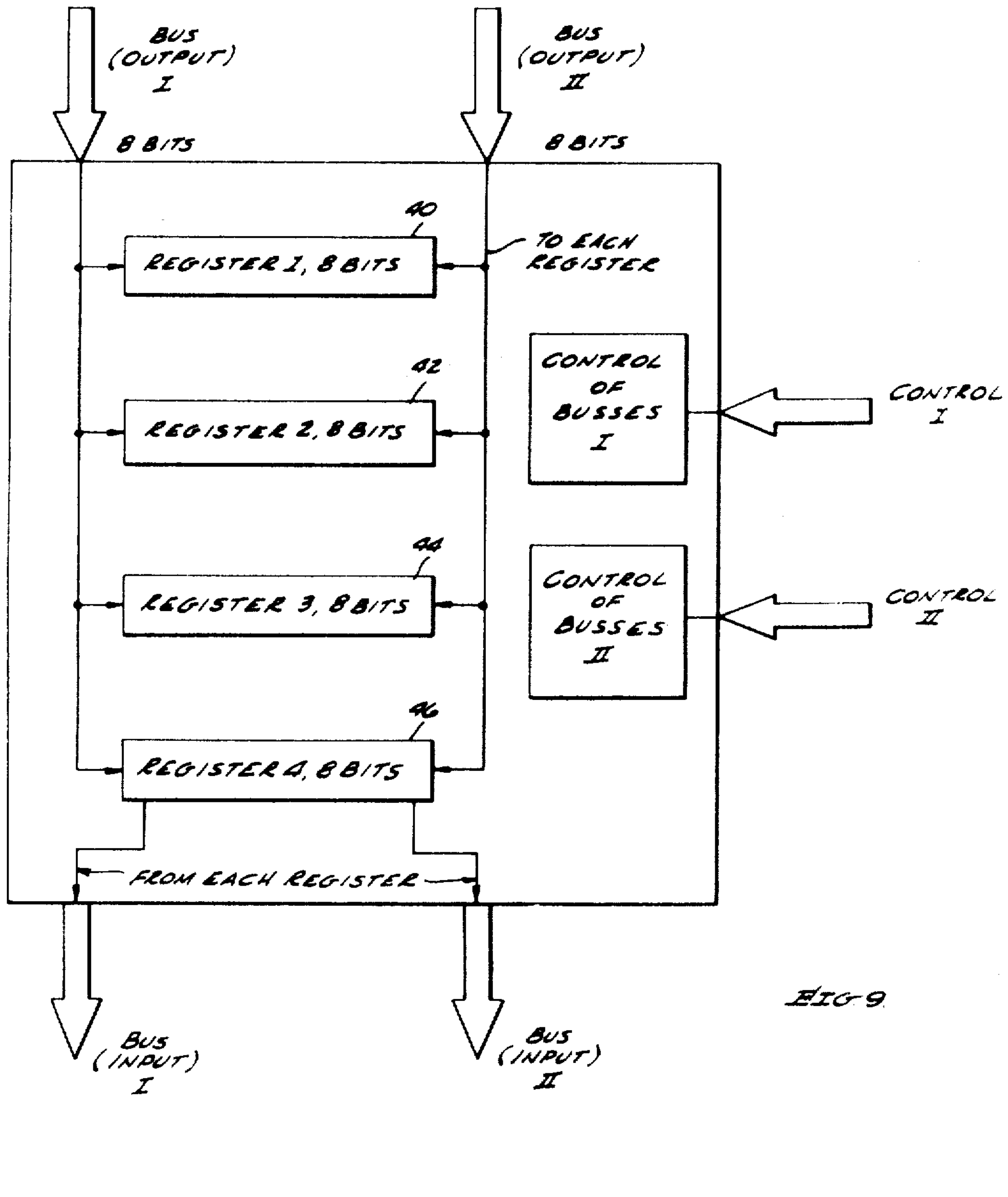
FIG. 9 is a functional block diagram of a micromemory register storage character G1 illustrated in a manner that will be subsequently utilized, to explain the types of logic expansion.

As the foregoing discussion shows, G1 may be represented in a simplified fashion by FIG. 9. The G1 character is basically a 32 bit storage element, arranged in four registers of 8 bits apiece, with data incoming to any register from either of two 8 bit busses and outgoing from any register on either or both of two 8 bit busses. The transfer of data from OUTPUT BUS I to the registers and back out again via INPUT BUS I is controlled by one control network. An identical but independent control network controls the flow of data from OUTPUT BUS II, through these same registers, and out again on INPUT BUS II. Control signals enter these control networks through two sets of separate but identical input pins, one set for each control network.

As will be explained in more detail subsequently, the principle source of all control signals for the non-control characters (G1, L1, L2, L3) is the micromemory. Control words from the micromemory character MM are stored and partially decoded in micro-instruction register character M2. The output of micro-instruction register character M2 forms the source of practically all the control signals for the mentioned non-control characters. Therefore, we will, for simplicity, define the output of character M2 as the CONTROL BUS.

As previously mentioned, the character set is capable of four degrees of expansion. It is possible to demonstrate all four by example of the G1 character.

G1 - Simple Connection

Figure 10:
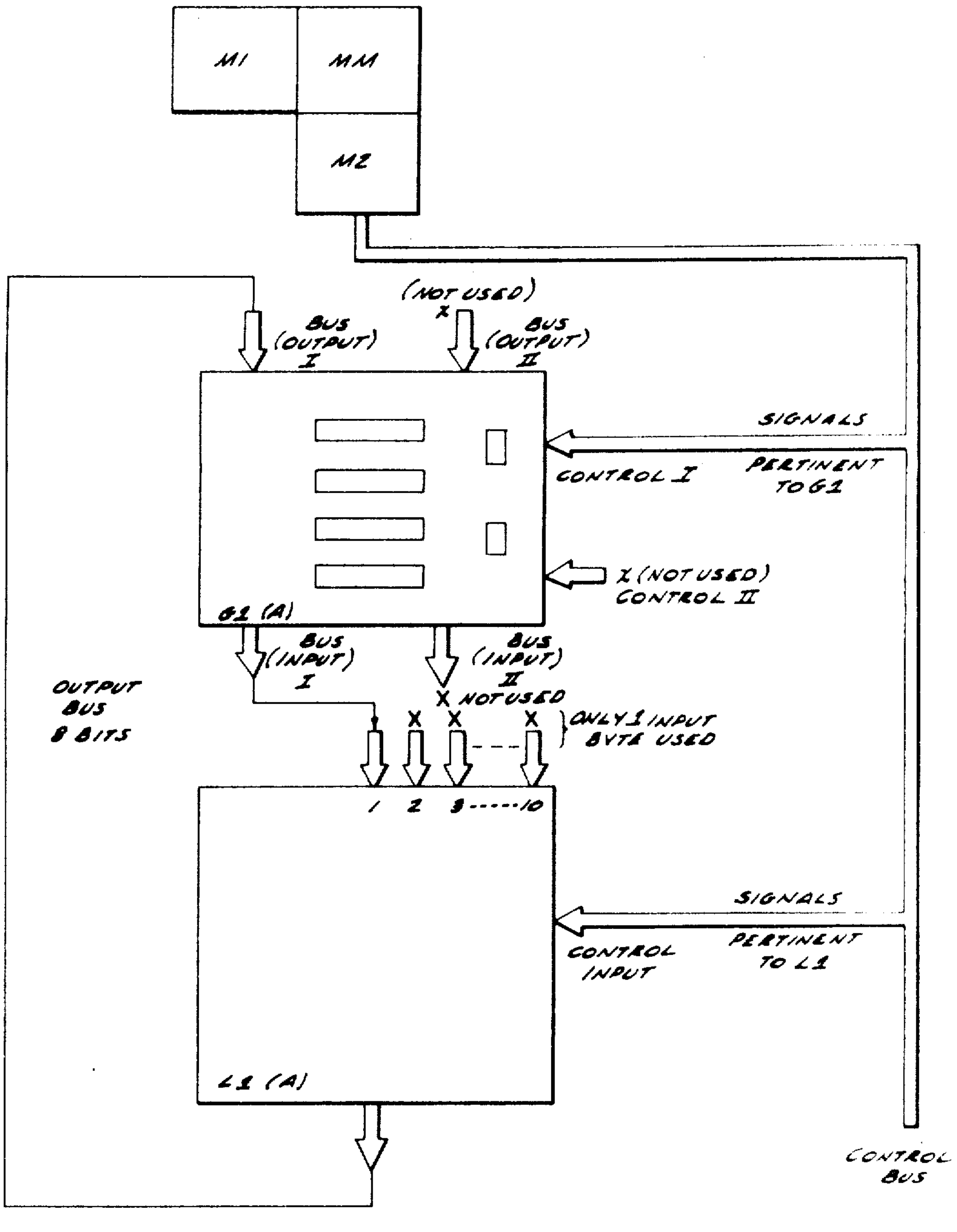
FIG. 10 illustrates a simple logic connection of a micromemory register storage character G1 connected in series with a general logic character L1 and controlled by a control unit.

FIG. 10 shows G1 in its most basic configuration. BUS-OUTPUT-I of G1 is connected to the OUTPUT BUS, which is in fact the output of a general logic character L1. BUS-INPUT-I of G1 goes to one set of general logic character L1 inputs, thus forming a data loop for 8 bits of data. Signals $b_0$ or $\bar{b}_0$, $b_1$ or $\bar{b}_1$, $b_2$ or $\bar{b}_2$, $b_3$, $b_4$, $b_{11}$ or $\bar{b}_{11}$, $b_{12}$ or $\bar{b}_{12}$, $b_{13}$ or $\bar{b}_{13}$, $b_{14}$, $b_{15}$ and RESET I are taken off the control bus and input to the control network which controls the BUS I path through G1. BUS-OUTPUT-II, BUS-INPUT-II, and CONTROL II pins on G1 are not used. The unit thus formed has simple logic capability for 8 bit data words by virtue of its coupling with a general logic character L1, and by virtue of its G1, four 8 bit wide storage registers 40 through 46.

G1 - Word Length Expansion

Suppose it is desired to construct a logic unit with registers 16 bits wide instead of eight bits wide. Two micromemory register storage characters G1 can be used to form 16 bit registers as demonstrated by FIG. 11.

In this figure, the general logic character L1 is shown expanded into a logic character 16 bits wide. How the general logic character L1 expands will be explained subsequently in the section pertaining to the general logic character L1. It is sufficient here to understand that two L1's can be used to make a 16 bit wide logic manipulator and, as such, the output of L1(A) defines the most significant 8 bits of a 16 bit output bus and the output of L1(B) defines the least significant 8 bits of this output bus. Also, the input to this L1 pair is a 16 bit wide data word.

Thus, a 16 bit wide register unit is desirable. Two 8 bit wide G1's can be used to make this unit as follows.

The output of general logic character L1(A) is connected to the BUS-OUTPUT-I terminals of micromemory register storage character G1(A). The output of micromemory register storage character G1(A) (BUS-INPUT-I) is connected to one of the input bytes of general logic character L1(A). Micromemory register storage character G1(B) connects in parallel to general logic character L1(B) in a similar manner. Thus, micromemory register storage character G1(A) provides storage for the most significant 8 bits of all data words and micromemory register storage character G1(B) provides storage for the least significant 8 bits of all data words.

The control connection is as follows. The same control bits which run from the CONTROL BUS to the micromemory register storage character G1 CONTROL I input of FIG. 10 now run to both micromemory register storage characters G1(A) and G1(B) of FIG. 11. It is of prime importance to realize that micromemory register storage characters G1(A) and G1(B) are logically identical units. The paranthetical subscripts are only to distinguish them in discussion. Actually, they are identical and totally indistinguishable blocks of logic when removed from the circuit. Only their usage and interconnection with other characters allow them to perform different functions.

Returning to the control problem, both micromemory register storage characters G1 receive the same signals through their CONTROL I inputs. Neither of the CONTROL II inputs are used. Since micromemory register storage characters G1(A) and G1(B) hereinafter also referred to as characters G1(A) and G1(B) have identical control networks I, and these networks receive identical signals, characters G1(A) and G1(B) respond identically to control signals issued by micro-instruction register character M2.

Operation is best described by an example. Suppose micro-instruction register character M2 outputs on the CONTROL BUS the code for register 42 to store data from the output bus. Both characters G1(A) and G1(B) receive this command. Thus, character G1(A) responds to store the 8 bits on its BUS-OUTPUT-I lines in its 8 bit register 42. Character G1(B) responds to store the 8 bits on its BUS-OUTPUT-I lines in its 8 bit register 42. However, the external general logic character L1 connection results in character G1(A) receiving the most significant 8 bits of a 16 bit word on its 8 BUS-OUTPUT-I lines and character G1(B) receiving the least significant 8 bits of this word on its 8 BUS-OUTPUT-I lines. Thus, a one single command results in all 16 bits of the word being stored. Likewise, if at a later time the code for register 42 contents to be placed on the BUS-INPUT-I lines should appear on the CONTROL BUS, both characters G1(A) and G1(B) will receive the command and output the contents of their respective registers 42. On the 8 BUS-INPUT-I lines of character G1(A) will appear the most significant byte of the word and on the 8 BUS-INPUT-I lines of character G1(B) will appear the least significant byte of the word. Thus, the 8 BUS-INPUT-I lines of characters G1(A) and G1(B) together form a 16 bit wide data bus for retrieving 16 bit wide information words from the register.

Thus, two identical G1 characters form an expanded register unit of four 16 bit registers. More G1 characters could be added in a similar fashion to form expanded four register units wider than 16 bits. It is only necessary that each character G1 receive the same set of command signals and that means exist for presenting and accepting data words to and from this unit in a parallel fashion. If a register unit of a word length not an integral multiple of 8 bits is desired, it is only necessary to use the number of G1 characters which provide the smallest multiple of 8 bits larger than the desired bit length. If, for example, an expanded register unit 20 bits wide is desired, three G1 characters are used. On the last G1 character, only four of the 8 BUS-OUTPUT-I lines and the four corresponding BUS-INPUT-I lines are used. The remainders are unconnected. Thus, this last character G1 stores and retrieves only 4 bits of each word.

Theoretically, the bit width of the register unit could thus expand indefinitely in increments of 8 bits.

G1 - Functional Expansion

Figure 12:
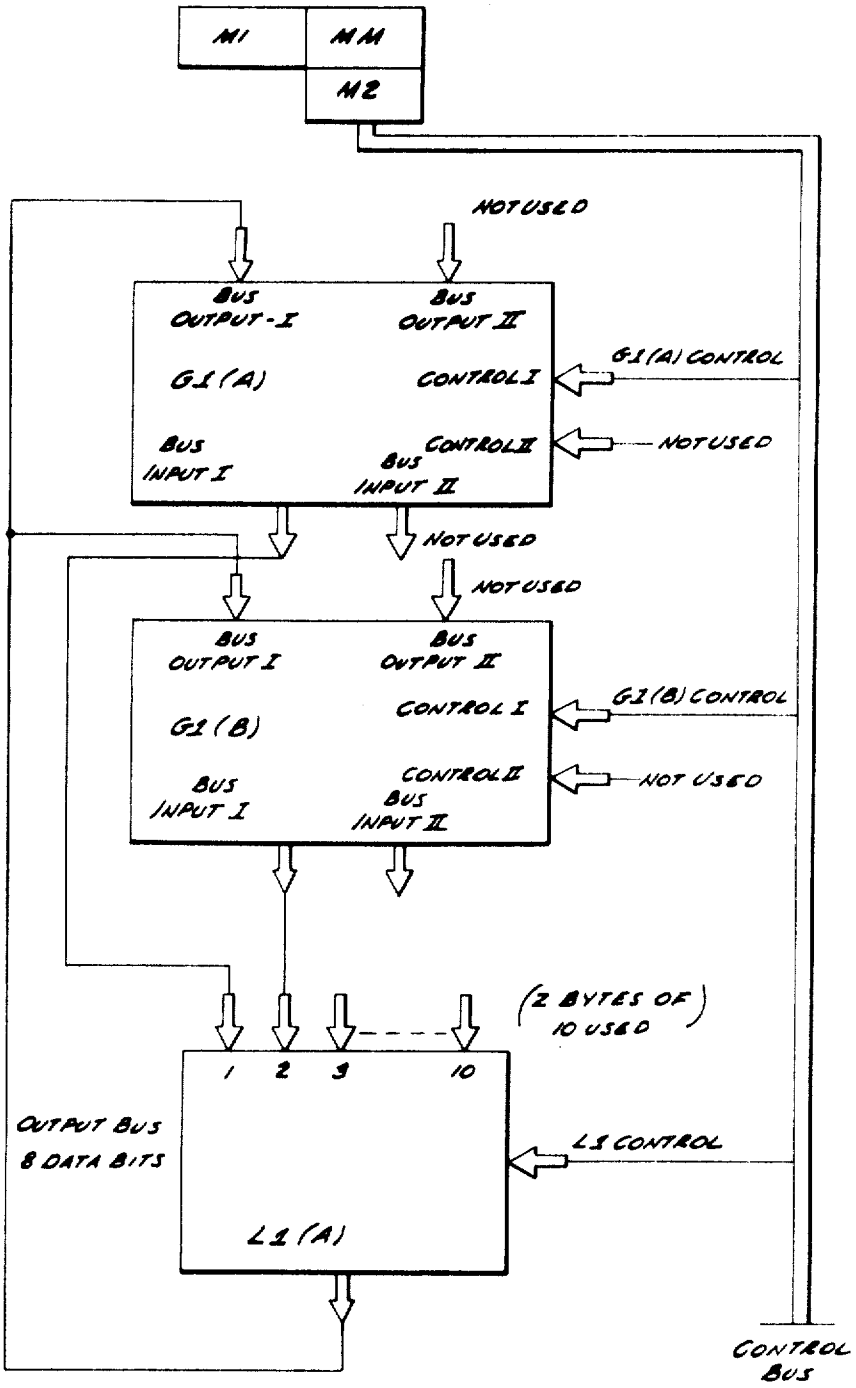
FIG. 12 is a functional block diagram illustrating functional expansion utilizing two parallel micromemory register storage characters G1 and a single general logic character L1.

Referring back to FIG. 10, suppose it is decided that the 8 bit word length of the logic unit is sufficient but that a total of eight individual registers instead of the four registers 40, 42, 44 and 46 shown are necessary. This can be accomplished as shown in FIG. 12 by the addition of a second character G1(B) logically identical to the first character G1(A) but connected in parallel to the circuit in the manner shown.

The 8 bit data word output of general logic character L1 is connected to the BUS-OUTPUT-I inputs of both characters G1(A) and G1(B) in an identical manner by means of a single 8 bit output bus. That is, bit $b_0$ of the output bus connects to bit $b_0$ of G1(A)'s BUS-OUTPUT-I byte and also to bit $b_0$ of G1(B)'s BUS-OUTPUT-I byte, and likewise for the other seven bits $b_1$–$b_7$. Thus, the data word appears simultaneously at the inputs of both characters G1(A) and G1(B). As before, the output byte BUS-INPUT-I of character G1(A) connects to one input byte of 10 input bytes available on general logic character L1. The output BUS-INPUT-I of character G1(B) connects to a second input byte on L1. Eight of the input bytes in general logic character L1 are not used. Thus, general logic character L1 is capable of receiving the outputs of both characters G1(A) and G1(B) and means therefore exist for general logic character L1 to send data to a total of eight 8 bit registers and retrieve it from any one desired. As before, on neither character are BUS-OUTPUT-II, BUS-INPUT-II, or CONTROL II pins used.

Control is received from the CONTROL BUS through the CONTROL I inputs on each of characters G1(A) and G1(B). However, the two characters G1(A) and G1(B) do not receive identical control signals as would be the case in the previously described word length expansion since in this case it is not desired to have the G1 characters operate simultaneously in an identical manner. (If this were the case, register $j$ [where $j$ is representative of any of registers 40 – 46] on each character would store and output the same data at the same time and the effect would be to have only four effective registers.) It is necessary that only one register out of eight respond during a data cycle (FIG. 4, micromemory half cycle), meaning that one of the characters G1(A) and G1(B) is active and the other inactive during a data cycle. Since both characters G1(A) and G1(B) are identical and therefore have identical control networks, this one-of-two G1 character selection is accomplished by external control signal connections as follows.

Refer back to FIG. 6, which is the logic circuit for the generation of source select signals for any micromemory register storage character G1. As explained before, the four source select signals are responsive to the codes:

| | | |
|---|---|---|
| $\bar{b}_0\ \bar{b}_1^*\ \bar{b}_2^*\ b_3\ b_4$ | for register 1 | (Reg. 40) |
| $\bar{b}_0\ \bar{b}_1^*\ \bar{b}_2^*\ b_3\ \bar{b}_4$ | for register 2 | (Reg. 42) |
| $\bar{b}_0\ \bar{b}_1^*\ \bar{b}_2^*\ \bar{b}_3\ b_4$ | for register 3 | (Reg. 44) |
| $\bar{b}_0\ \bar{b}_1^*\ \bar{b}_2^*\ \bar{b}_3\ \bar{b}_4$ | for register 4 | (Reg. 46) |

Consider also the structure of the micro-instruction register character M2 which will be described in more detail subsequently and the CONTROL BUS. A portion of character M2 contains five flip-flops for storing the source code $b_0$–$b_4$ received from a micro-array character MM which will also be described in more detail subsequently. The outputs of these flip-flops form part of the CONTROL BUS. However, the nature of these flip-flops is that they provide two outputs, the true and false states, $b_j$ and $\bar{b}_j$, respectively, of the input $b_j$. Included in the control bus are both states or "sides" of the flip-flops storing $b_0$, $b_1$, and $b_2$ and the true side only of the flip-flops storing $b_3$ and $b_4$, as illustrated in FIG. 13.

Each character G1 has five input pins making up the SOURCE code portion of its CONTROL I input pin set. We refer to these pins as $b_0$, $b_1^*$, $b_2^*$, $b_3$, and $b_4$ to match with the register source codes given previously.

Figure 13:
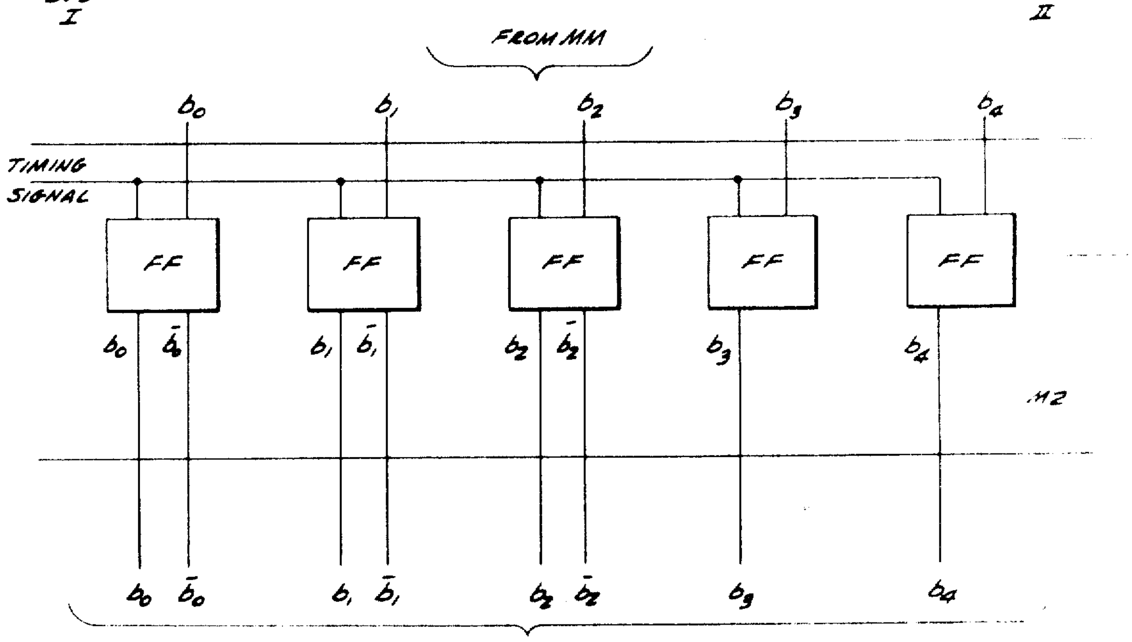
FIG. 13 is a logic diagram illustrating storage registers associated with the control bus for storing control signals received from a micro-array character MM.

For example, the $b_0$ input of the CONTROL I inputs of all G1 characters in the logic unit receive the $b_0$ signal of the control bus (FIG. 13). As the above four codes show, the control network will issue SOURCE commands only in response to $b_0 = 0$ on the CONTROL BUS.

The $b_3$ and $b_4$ inputs of the CONTROL I inputs of all G1 characters in the logic unit receive the signals $b_3$ and $b_4$ from the CONTROL BUS. As the four codes show, the states of $b_3$ and $b_4$ determine which one of the four registers 40 – 46 in the G1 character will receive the SOURCE command providing that bit $b_0 = 0$ and also that two low signals are received on the $b_1^*$ and $b_2^*$ inputs. If any one of the inputs signals $b_0$, $b_1^*$, or $b_2^*$ is high, or 1, no source command at all will be issued by this character.

Therefore, inputs signals $b_1^*$ and $b_2^*$ are used to provide character selection. For example, the inputs $b_1^*$ and $b_2^*$ of character G1(A) might be connected to CONTROL BUS lines $b_1$ and $b_2$, respectively. Therefore, character G1(A) will respond only to codes $b_0\ b_1\ b_2\ b_3\ b_4 = 000\ b_3\ b_4$; that is, character G1(A) responds only when bits $b_0$, $b_1$, and $b_2$ are all zero. If this occurs, the states of bits $b_3$ and $b_4$ determine which one of the four registers 40 – 46 in character G1(A) will be accessed. Then the $b_1^*$ and $b_2^*$ inputs of character G1(B) could, for example, be connected to the CONTROL BUS lines $b_1$ and $\bar{b}_2$, respectively. Therefore, character G1(B) will respond only to codes $b_0\ b_1\ b_2\ b_3\ b_4 = 001\ b_3\ b_4$. That is, character G1(B) responds only when bits $b_0$ and $b_1$ are zero and $b_2$ is 1. If this occurs, bits $b_3$ and $b_4$ states determine which one of the four registers 40

– 46 in character G1(B) will be accessed. Obviously, at any given time bit $b_2$ must be either 1 or 0. If it is 1, character G1(B) responds. If it is 0, character G1(A) responds. Thus, the control signals have the opportunity to select one out of the eight registers 40 – 46 of both characters G1(A) and G1(B) at a time, and an eight register logic unit is thus created out of two identical G1 characters.

The response of registers in characters G1(A) and G1(B) to source codes is therefore as follows:

| CODE $b_0\ b_1\ b_2\ b_3\ b_4$ | RESPONSE |
|---|---|
| 0 0 0 0 0 | Reg. 46 of G1(A) responds. No response from G1(B) |
| 0 0 0 0 1 | Reg. 44 of G1(A) responds. No response from G1(B) |
| 0 0 0 1 0 | Reg. 42 of G1(A) responds. No response from G1(B) |
| 0 0 0 1 1 | Reg. 40 of G1(A) responds. No response from G1(B) |
| 0 0 1 0 0 | Reg. 46 of G1(B) responds. No response from G1(A) |
| 0 0 1 0 1 | Reg. 44 of G1(B) responds. No response from G1(A) |
| 0 0 1 1 0 | Reg. 42 of G1(B) responds. No response from G1(A) |
| 0 0 1 1 1 | Reg. 40 of G1(B) responds. No response from G1(A) |
| 0 1 0 0 0 | No response from either G1(A) or G1(B). |
| | No response from either G1(A) or G1(B). |
| 1 1 1 1 1 | No response from either G1(A) or G1(B). |

Of course, more than two G1 characters can be used. Notice that only two of the possible four combinations of bits $b_1$ and $b_2$ have been used to select from two characters G1(A) and G1(B). The other two combinations of $b_1$ and $b_2$ may be used to select from a third and fourth G1 character G1(C) and G1(D). These G1 characters could be added to the circuit of FIG. 12 as follows. Connect BUS-OUTPUT-I pins of characters G1(C) and G1(D) to the output bus on a bit-by-bit basis as are connected characters G1(A) and G1(B). Thus, each line of the output bus connects to its corresponding BUS-OUTPUT-I pin on up to four different G1 characters. Connect the BUS-INPUT-I output of character G1(C) to a third input byte of general logic character L1; BUS-INPUT-I of character G1(D) connects to a fourth input byte of general logic character L1. Connect the CONTROL BUS as before making character G1(C) responsive to bits $b_1\ b_2 = 10$ and character G1(D) responsive to bits $b_1\ b_2 = 11$.

Thus, the control lines can select any one of 16 possible registers 40 – 46 of four G1 characters in this manner.

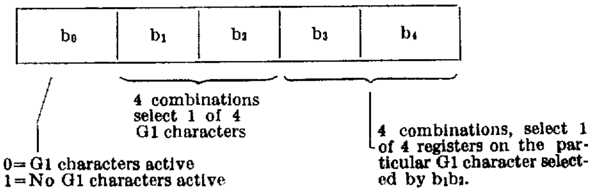

Notice that only 16 of 32 possible codes are used, specifically those codes where bit $b_0 = 0$. If desired, it would be possible to add as many as four more G1 characters to the circuit by connecting the $\bar{b}_0$ CONTROL BUS line to their $b_0$ inputs and repeating the $b_1$ – $b_4$ control scheme again. Thus, 16 more registers 40 – 46 responding to bit $b_0 = 1$ codes could be added, with all BUS-OUTPUT-I connections connected to the output bus and eight of 10 input bytes of general logic character L1 occupied. Practically, however, it is rarely necessary to use more than 16 registers before going to the next levels of expansion so the bit $b_0 = 1$ codes are usually reserved for registers contained in other character types, particularly input/output character L3 and also arithmetic logic character L2 and general logic character L1.

The above discussion was restricted to the SOURCE control connection of each character. DESTINATION control is handled by a control sub-network within Control Network I identical to that of FIG. 6 having inputs $b_{11}$, $b_{12}$*, $b_{13}$*, $b_{14}$, and $b_{15}$ which correspond substantially identically to inputs $b_0$, $b_1$*, $b_2$*, $b_3$, and $b_4$ respectively. For codes $b_{11}$ – $b_{15}$ there exists in micro-instruction register character M2 and the CONTROL BUS logic identical to that of FIG. 13 except that it handles coded bits $b_{11}$ – $b_{15}$ instead of coded bits $b_0$ – $b_4$. Thus, the entire discussion for destination control is identical to that just given for source control except that the reference signals $b_{11}$ through $b_{15}$ must be substituted for $b_0$ through $b_4$ respectively wherever the latter occurs in the discussion. The result is that only the one G1 character selected by coded bits $b_{12}$ and $b_{13}$ will respond to data on the output bus and set it into the one register within itself specified by bits $b_{14}$ and $b_{15}$.

Thus, it can be seen that use of coding combinations of control signal pairs $b_1$:$b_2$ and $b_{12}$:$b_{13}$ gives the option of using one, two, three, or four G1 characters in the digital machine in a manner which allows the modular construction of register units of four, eight, 12, or 16 registers using identical logic blocks such as character G1. In extreme cases, uses of control signals $b_0$ and $b_{11}$ may allow a fifth, sixth, seventh, and eighth G1 character to be used in a manner which allows modular construction of register units of 20, 24, 28, or 32 registers. This is what is meant by functional expansion.

Figure 14:
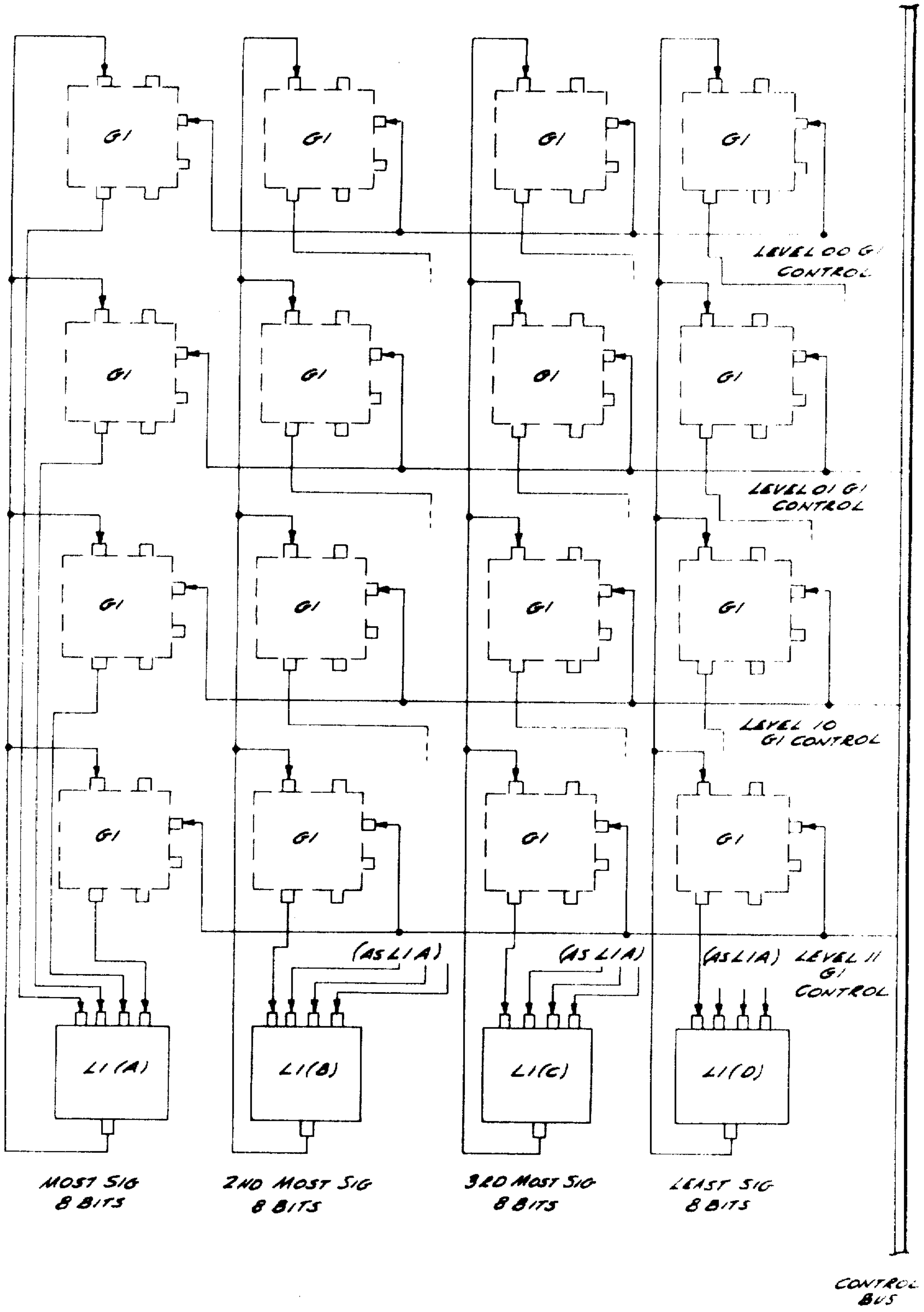
FIG. 14 is a functional block diagram illustrating the combination of functional expansion and word length expansion utilizing a plurality of micromemory register storage characters G1 and general logic characters L1.

Functional expansion and word length expansion may be used together to form register units of desired word and bit dimensions. FIG. 14 illustrates a possible register unit 16 registers deep by 32 bits long, constructed from 16 G1 characters. The characters are shown dashed since the usage of any one of the 16 G1 characters in the matrix is independent of the usage of any other G1 character. The fabricator is free to include or exclude any G1 character in the matrix, thus affording him a register unit of variable word lengths and register size. Even within the same unit it is not necessary that all included G1 registers have the same word length. Sixteen G1 characters is not the limiting size of the register unit.

G1 — Parallel Computational Expansion

As FIGS. 10 through 14 show, the logic units discussed to this point have used only one micro-array character MM and one micro-instruction register character M2 thus using only the first 50 bits of the 100 bit instruction word, illustrated in FIG. 2a. This is all the capability that is necessary to control one logic unit consisting of general logic character L1, arithmetic logic character L2, and input/output character L3 and one register unit consisting of micromemory register storage characters G1, connected in such a manner as to process one data word at a time of the desired bit length.

Figure 15:
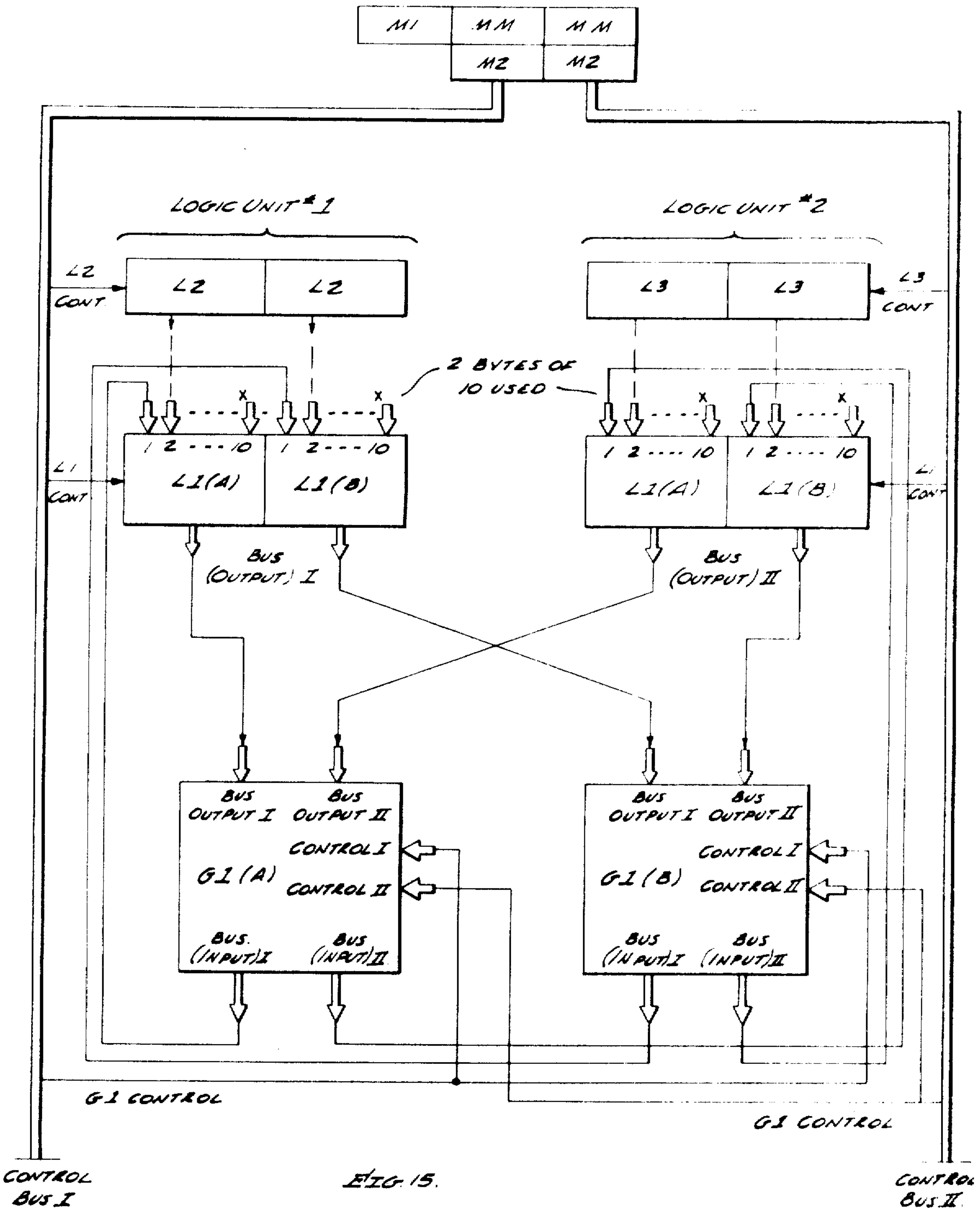
FIG. 15 is a functional block diagram illustrating parallel computation expansion utilizing two parallel logic units including cross-coupling through two parallel micromemory register storage characters G1.

If desired, the option exists, as illustrated generally in FIG. 15, for the fabricator to expand his instruction word to the full 100 bits by adding another micro-array character MM to store these next 50 bits and another micro-instruction register character M2 to hold and partially decode the output of this second micro-array character MM. Thus, the storage in the micro-array character MM block increases by 50 bits per word but no new words are added. There is still only one micromemory sequencer of micromemory counter character M1, connected to both micro-array characters MM, such that both micro-array characters MM simultaneously enter into their associated micro-instruction register characters M2 the instruction words they hold in the location addressed by the micromemory counter character M1. Thus, for any address $j$ called upon by the micromemory counter character M1, both micro-array characters MM output the contents of their respective address $j$ location to their respective micro-instruction register characters M2, creating the effect of a 256 word by 100 bit read-only-memory, as will be explained in more detail subsequently.

As stated before, the organization of the second 50 bits of the 100 bit word is identical to the first 50 bits, thus creating the ability to completely control a second logic unit similar to the first. Since the 100 bit word is read out of micro-array characters MM in parallel, action in the two logic units takes place simultaneously. The second logic unit is constructed from the same general logic characters L1, arithmetic logic character L2, and input/output characters L3 as the first logic unit is, and responds to its 50 bit instruction word in an identical manner. Of course, the contents of each 50 bits word need not be identical, as need not the data words operated on, so that each logic unit may simultaneously perform a different task. Addition of parallel logic units for the purpose of performing two or more different tasks is referred to as parallel computational expansion.

If desired, more micro-array character MM and micro-instruction register character M2 pairs may be added to the micromemory counter character M1 to create control ability for more than two parallel logic units. In fact, there is no theoretical limit to the number of parallel logic units that may be run together in this manner. However, a practical limit of two logic units per M1 sequence has been adhered to. Thus, the fabricator has an option of how many parallel logic units he would like to include in his machine, each unit being composed of one or more of standard general logic characters L1, arithmetic logic characters L2, and input/output characters L3.

The relationship of the micromemory register storage character G1 in this process is as follows. It would be of little use to connect parallel logic units in a machine if they could not communicate with each other very efficiently. Therefore, character G1 is equipped with a second byte of data input (BUS-OUTPUT-II), a second byte of data output (BUS-INPUT-II), and a second set of control inputs (CONTROL II) which control data flow in and out of character G1 through these second inputs and outputs independently of any action taken by the first control network, which in turn can act only through the first set of data inputs and outputs. Therefore, a second logic unit can use the register unit fabricated from G1 characters in an identical but independent manner as the first logic unit. Also, since both logic units No. 1 and No. 2 can read and write into the same registers, information flows between logic units. For example, logic unit No. 1 can place a control on data word in a register whereupon at a later cycle time logic unit No. 2 can access that register and operate on the word.

FIG. 15 shows the character G1 connection for such a case. Logic unit No. 1, consisting of two general logic characters L1 and two arithmetic logic characters L2 in a 16 bit arrangement, is controlled through CONTROL BUS I. Logic unit No. 2, consisting of two general logic characters L1 and two input/output characters L3, also arranged to handle 16 bit wide data words, is controlled through CONTROL BUS II. Thus, there are two 16 bit wide output busses, one from each logic unit, and there must also be a path from the register unit back to each logic unit. Characters G1(A) and G1(B) connect to OUTPUT BUS I, general logic characters L1(A) and L1(B) of logic unit No. 1, and CONTROL BUS I in a manner identical to that of FIG. 11. Also, characters G1(A) and G1(B) connect to CONTROL BUS II and general logic characters L1(A) and L1(B) of logic unit No. 2 in a substantially identical manner, except that now BUS-OUTPUT-II pins are used in place of BUS-OUTPUT-I, BUS-INPUT-II pins replace BUS-INPUT-I pins, and control from CONTROL BUS II enters the CONTROL II input rather than the CONTROL I input.

Figure 11:
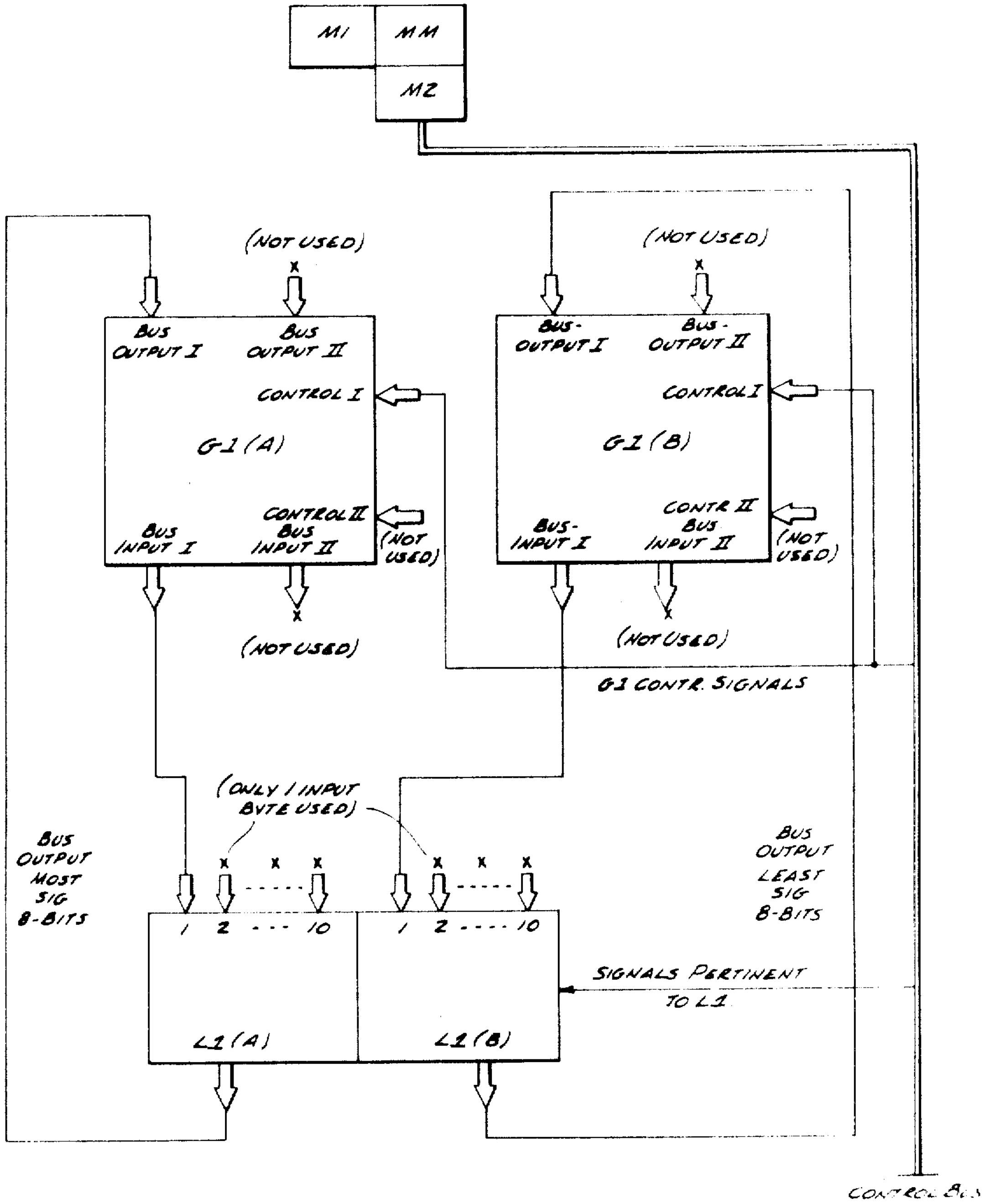
FIG. 11 is a functional block diagram illustrating word length expansion utilizing two parallel micromemory register storage characters G1 and two parallel logic storage characters L1.

Thus, either logic unit can use the G1 character in a manner identical to that described in reference to FIG. 11. During an access, both logic units can read any one register individually and simultaneously, and even the same register. During a store, both logic units can write into any one register individually and simultaneously. If it should occur that both logic units No. 1 and No. 2 choose to simultaneously write into the same register, the contents of that register will become the logical "OR" of the data on OUTPUT BUS I and OUTPUT BUS II. If it is desired to inhibit the register preclear as will be explained subsequently with reference to micro-instruction register character M2 during this simultaneous write into the same register, both M2 characters must refrain from issuing a RESET signal.

Character G1 has the capability, then, to act as a register unit for one or two logic units. If, for example, a third logic unit No. 3 were added one might proceed as follows. Add two more G1 characters G1(C) and G1(D) by the functional expansion technique and connect these to logic units No. 1 and No. 3. Again, add two G1 characters G1(E) and G1(F) by functional expansion and connect these to logic units No. 2 and No. 3. Thus, a register unit of 12 16 bit registers is formed; four registers are common to logic units 1 and 2, four common to units 1 and 3, and four common to units 2 and 3. Thus, every logic unit has a direct path to any other logic unit.

It should be noted that when parallel computational expansion is used the added logic units may be all different, that is, each may consist of any or all of the character types L1, L2, and L3 in any amount or mix. Usually, a general logic character L1 is required in each logic unit to establish data busses and loops. Use of arithmetic logic character L2 is optional, and its bit width may not necessarily match that of general logic character L1. Also if its bit width is less, it may appear between any bit position on the busses desired. Use of input/output character L3 is optional also, and the same comments apply as for arithmetic logic character L2.

In short, the contents of one logic unit in no way force specification of any other logic unit. The bit width of the data busses (L1 character width) also need not be the same in each logic unit. Also, word length and functional expansion may take place in the register unit independently of the number of logic units. Also, all logic units need not be connected to all G1 characters. In short, the three degrees of machine expansion mentioned and the last to be discussed next are essentially orthogonal, that is, the amount of expansion along any one of the four degrees or axes in no way restricts the amount of expansion possible along the other three. The designer is afforded four independent ways to increase (or decrease) the logic complexity of his machine.

G1 — Multi-Computation Expansion

FIG. 15 demonstrated a machine of more than one logic unit controlled by a common sequencer or micromemory counter character M1. Although the two logic units could perform different tasks, the control micro-program for each one was forced to follow the same sequence. That is, if the sequence of micro-instructions for the left-hand logic unit No. 1 were those obtained from its micro-array character MM locations *i, j, m,* ———, the right-hand logic unit No. 2 was also forced to execute the micro-instructions stored in its micro-array character MM locations *i, j, m,* ———.

Figure 16:
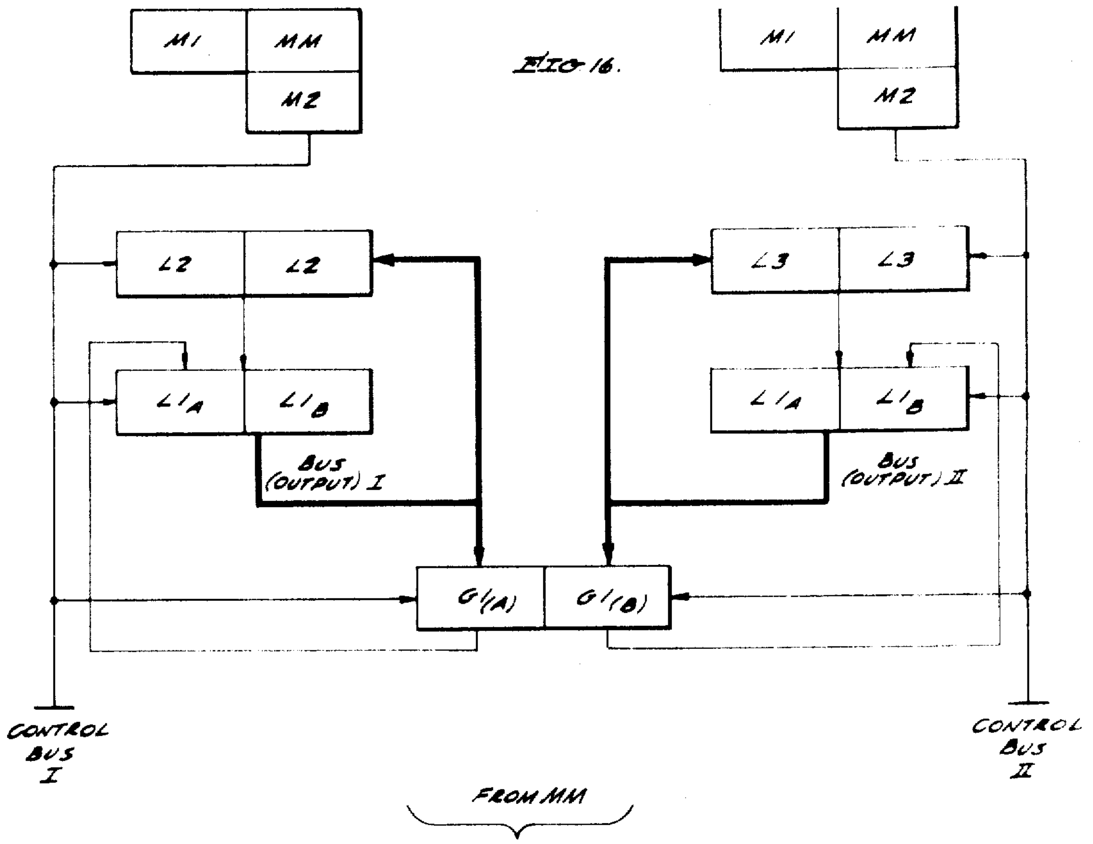
FIG. 16 is a functional block diagram illustrating multicomputation expansion with two independent logic units and two independent control units.

A fourth degree of freedom — multi-computation expansion illustrated in FIG. 16 — is attainable whereby a logic designer can construct a digital machine having two or more independently sequence micromemories, each consisting of a micromemory counter character M1 and as many micro-array character MM — micro-instruction register character M2 pairs as there are logic units under the influence of that sequencer or micromemory counter character M1.

The role of character G1 in this expansion procedure is identical to its role during parallel computational expansion. Again character G1 forms a register unit shared by two logic units. The difference now is that each of these logic units is independently sequenced through its own micromemory counter character M1 as well as independently controlled through its own micro-instruction register character M2. Thus, character G1 forms a communications link between the two sub-machines under control of different sequencers. The connection of character G1 into such a circuit is identical to its connection of FIG. 15. FIG. 16 shows how the machine of FIG. 15 would operationally be transformed from a parallel computation expanded machine into a multi-computation expanded machine. The connection to the G1 character register unit is the same. The only difference is that there are now independent sequencers or characters M1 which control the sequence of micro-commands which ultimately appear on the two control busses.

Practically speaking, the single micromemory counter character M1 of FIG. 15 was controlled by feedback from both logic units No. 1 and No. 2. If one logic unit fed back the proper conditions for a micro-program controlled micro-program jump the logic designer was forced to accept the fact that the micro-program for the other logic unit also made the same jump. However, in the circuit of FIG. 16 each logic unit has its own sequencer character M1 as well as its own micro-program. Thus, a micro-program jump for one logic unit, initiated by conditions in that logic unit, need not affect the sequence of the micro-program for the other logic unit.

Of course, one could easily cross-connect feedback paths and make one logic unit a "slave" of the other, and the opportunities offered to the logic designer by this invention to take advantage of innovations such as this are numerous.

Figure 17:
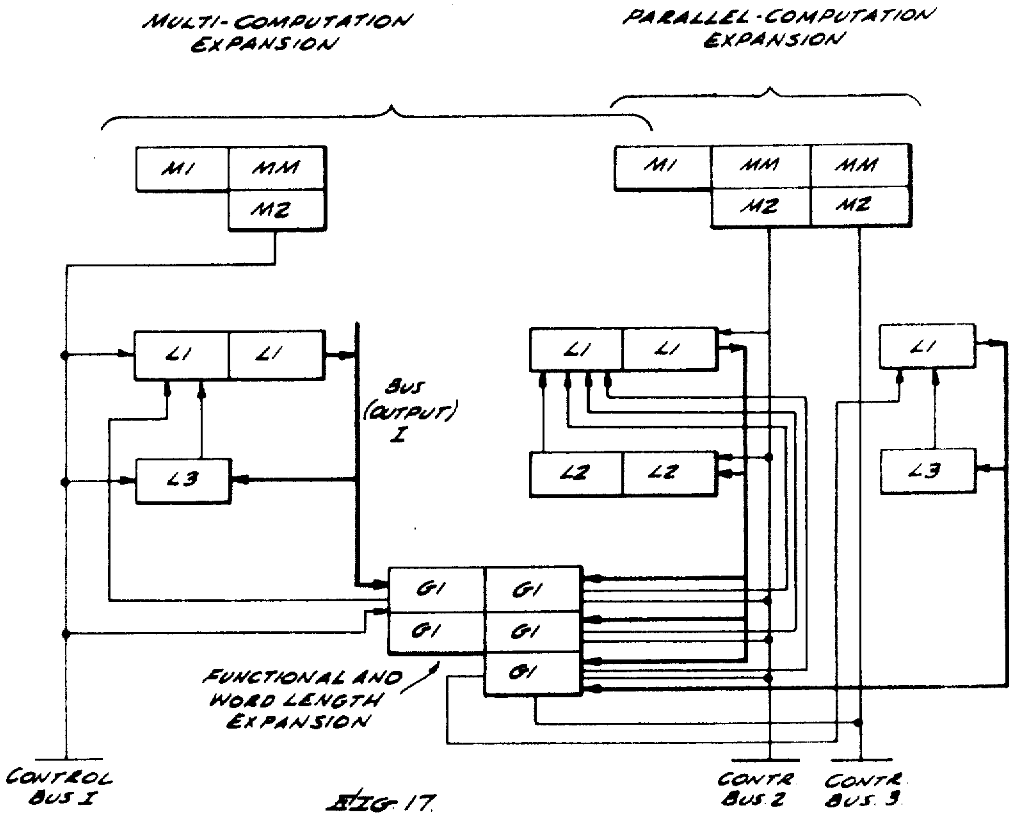
FIG. 17 is a block diagram of a digital machine constructed with word length expansion, functional expansion, parallel computation expansion, and multicomputation expansion.

As an example of the "orthogonality" or independence of the four types of expansion, FIG. 17 shows a machine that exemplifies expansion of all four types.

As illustrated by some of the example digital machines, of FIGS. 10 through 17, four independent means of expansion enable this standard set of logic blocks to form a practically limitless set of digital machines of varying word lengths and functional complexity, from the most simple to highly complex data processors.

GENERAL LOGIC CHARACTER — L1

Figure 18:
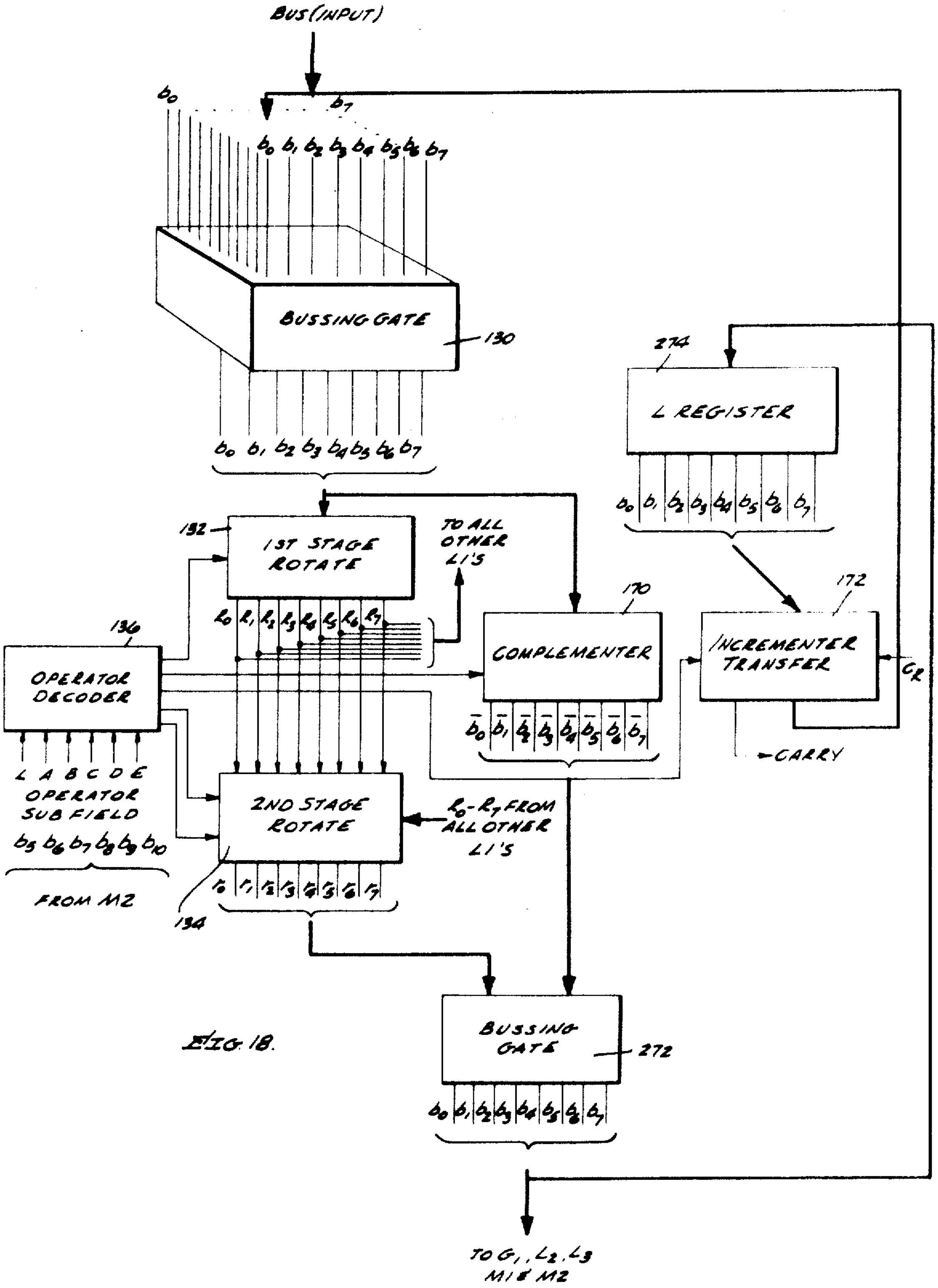
FIG. 18 is a block diagram illustrating a general logic character of the type utilized in the logic unit of FIG. 1.

The general logic character L1 illustrated in FIG. 18 receives the data from the micromemory register storage characters G1, arithmetic logic characters L2 and input/output characters L3 and performs the basic logic functions of rotate, shift (logical), transfer, complement, and increment in response to the operator sub-field and machine control commands received from the control unit. In addition to performing the logical operations mentioned above, the general logic character L1 provides a main path for transport of data through the system. The output signals on the BUS (output) of the general logic character L1 can be fed to the micromemory counter character M1, the arithmetic logic character L2, the input/output character L3, and the micro-memory register storage character G1.

Referring now to the general logic character L1 in more detail, a bussing gate 130 having 88 input terminals or 10 input and one feedback bytes of 8 bits each is coupled to receive data from the other characters. For example, 32 of the inputs can be coupled to recieve the 4 bytes of data including bits $b_0$ through $b_7$ from the outputs BUS I or BUS II of up to four parallel micromemory register storage characters G1. Others of the input terminals can be coupled to receive bits of data from the arithmetic logic character L2, and bits of data from the input-output character L3. Another eight input pins are coupled to receive incremented data fed back from the general logic character itself.

Considering first the logic function of ROTATE, a first stage rotate circuit 132 and a second stage rotate circuit 134 rotate the bits $b_0$ through $b_{31}$ to the left up to 31 bit positions in response to the operator sub-field signals R1 through R31 for left rotate of the operator from 1 to 31 places respectively.

For convenience in explaining the operation in the general logic character L1, the bits $b_0$ through $b_{31}$ are divided into four bytes of eight bits each wherein bits $b_0$ through $b_7$ are in byte 0, bits $b_8$ through $b_{15}$ are in byte 1, bits $b_{16}$ through $b_{23}$ are in byte 2, and bits $b_{24}$ through $b_{31}$ are in byte 3. Hereinafter the bits $b_0$–$b_{31}$ and the bits of all other bytes will also be referred to as bits $b_0$–$b_7$ within the byte. It should, of course, be understood that an 8 bit byte is arbitrarily selected and that the invention is not limited to an 8 bit byte but can be configured including other size bytes of *n* bits and other word lengths and other numbers of bits.

The bussing gate 130 is coupled to receive bytes from one or more micromemory register storage characters G1, bytes from one or more arithmetic logic characters L2, and bytes from one or more input/output characters L3 and a feedback byte of incremented information. As illustrated in FIG. 18 the bussing gate 130 has been arbitrarily selected to receive the four bytes from four micromemory register storage characters G1(A), G1(B), G1(C), and G1(D). In addition, the bussing gate 130 receives three bytes from three input/output characters L3(A), L3(B), L3(C). Furthermore, the bussing gate 130 is coupled to receive the bits $b_0$ through $b_7$ of a byte from an arithmetic logic character L2. Two bytes of input are reserved as spares. All of the $b_0$ bits are NANDed to a single $b_0$ output terminal. Similarly, all of the $b_1$ bits are NANDed to a single $b_1$ output terminal and so forth through the MSB $b_7$ inputs.

Figure 19:
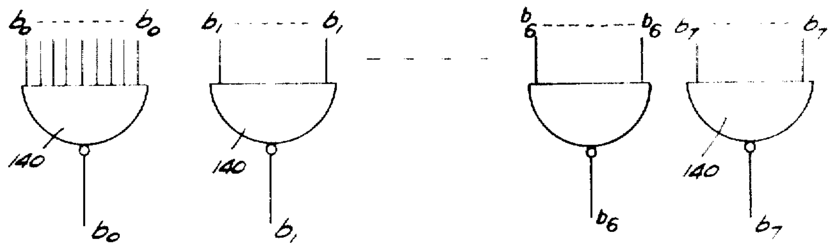
FIG. 19 is a logic diagram illustrating the bussing gate utilized in the general logic character of FIG. 18.

One type of NANDing circuit that could be used is illustrated in FIG. 19 wherein eight parallel NAND gates (three of which are shown) are each coupled to receive 11 input signals and produce one output signal. For example, the first NAND gate 140 receives all of the bits $b_0$ and produces a single output signal $b_0$ when any $b_0$ bit is received. A second NAND gate 140 receives all of the $b_1$ bits and similarly produces a single $b_1$ output signal when any $b_1$ bit is received. The next five NAND gates (not shown) are similarly responsive to the eight bits of $b_2$ through $b_6$ respectively to produce single output signals $b_2$ through $b_6$ corresponding to each of the bit inputs. An eighth NAND gate 140 receives all $b_7$ bits to produce a single output signal $b_7$ when any $b_7$ input signal is received. It should, of course, be understood then when more than one $b_0$ signal or any of the other bits $b_1$ through $b_7$ are received in coincidence the bussing gate 130 operates as an ANDing circuit. The bits $b_0$ through $b_7$ from the bussing gate 130 are fed to a first stage rotate circuit 132.

Figure 20:
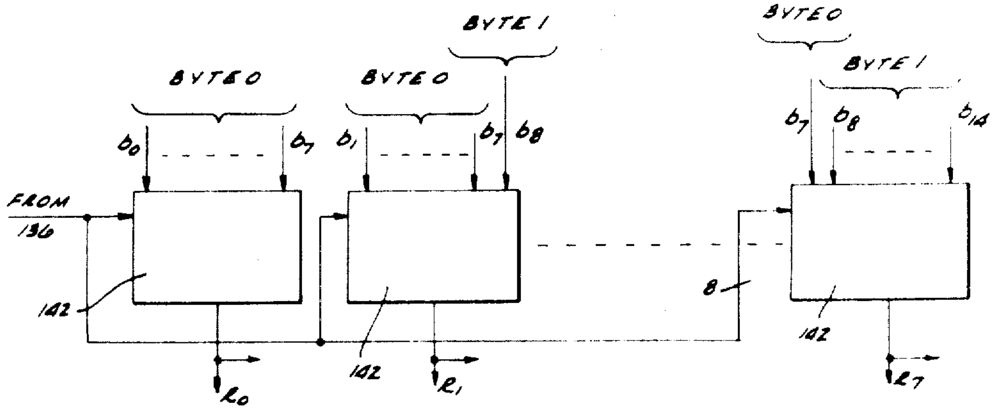
FIG. 20 is a block diagram illustrating the first stage rotate circuit utilized in the general logic character of FIG. 18.

The first stage rotate circuit 132 receives the eight bit byte $b_0$ through $b_7$ from the bussing gate 130 and left rotates it from 0 to 7 places or bit positions to the left in response to command signals received from an operator decoder 136 under command of the OPERATOR sub-field signals received from micro-instruction register character M2. More specifically, the first stage rotate circuit 132, as illustrated in FIG. 20, includes eight logic circuits 142, of the type illustrated in detail in FIG. 21, connected in parallel circuit relationship. Each of the logic blocks 142 has eight input terminals for receiving eight consecutive bits from one or two bytes and a one out of eight command signal from the operator decoder 136.

For example, the left most logic block 142 receives the bits $b_0$ through $b_7$ of byte 0 and produces a first stage rotate output signal $R_0$ corresponding to one of these inputs in response to the one out of eight command signals received from the operator decoder 136.

The next logic block 142 to the right receives the bits $b_1$ through $b_7$ of byte 0 and the bit $b_8$ of byte 1 (corresponding to bit $b_0$ in FIG. 19) to produce a single output signal $R_1$ in response to a command signal. This pattern of dropping the next least significant bit of byte 0 and adding the next most significant bit of byte 1 is continued for the next five logic blocks (not shown) so that the first stage rotated output signal $R_2$ through $R_6$ can be selected in response to the one out of eight control signals. Finally, the right most logic block 142 receives the bit $b_7$ of byte 0 and the bits $b_8$ through $b_{14}$ (corresponding to bit $b_6$ in FIG. 19) of byte 1 to produce the output signal $R_7$ of the first stage rotate signals in response to one of the control signals.

Figure 21:
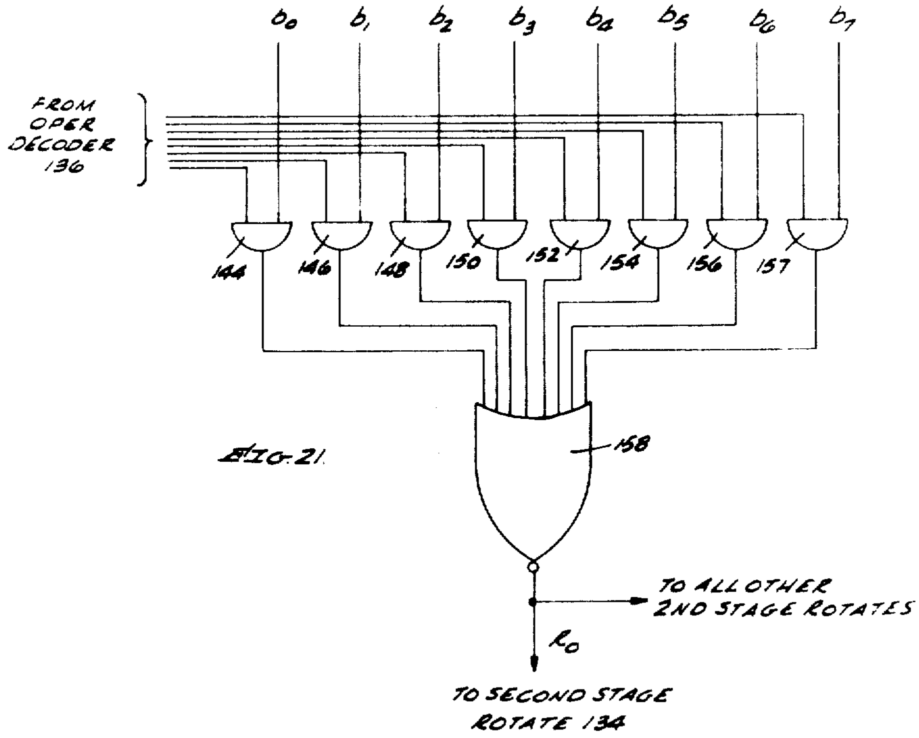
FIG. 21 is a logic diagram illustrating a single bit stage of the first stage rotate circuit illustrated in FIG. 20.

Referring now to the details of an exemplary one of the logic blocks 142, reference is made to FIG. 21 in which the eight input signals $b_0$ through $b_7$ $_{of\ byte}$ 0 are fed in parallel to eight parallel AND gates 144 through 157, respectively. In addition, each of the AND gates 144 through 157 is coupled to receive an individual one of the one out of eight command signals from the operator decoder 136. The outputs of the AND gates are connected to a common NOR gate 158. Thus, for a left rotate of 4 + 8*n* (where *n* is an integer equal to the number of whole bytes of the rotate), the AND gate 152 receives the command signal from operator decoder 136 so that its output signal corresponds to the state of the $b_4$ bit wherein a ONE will cause the output to go high and a ZERO will cause the output to go low. This $b_4$ output of AND gate 152 received by the NOR gate 158 will cause its output to go low or high respectively to correspond to an inverted selected bit $b_4$.

The other seven stages of logic blocks 142 are constructed similar to the logic block illustrated in FIG. 12 with the exception that the input bits thereto are different as explained above with reference to FIG. 11. The same relative AND gate 152 would also be selected in the other logic blocks 142 so that the output for the above described example would be:

| $R_0$ | $R_1$ | $R_2$ | $R_3$ | $R_4$ | $R_5$ | $R_6$ | $R_7$ |
|---|---|---|---|---|---|---|---|
| $b_4$ | $b_5$ | $b_6$ | $b_7$ | $b_8$ | $b_9$ | $b_{10}$ | $b_{11}$ |
| Byte 0 | | | | Byte 1 | | | |

Thus, the first stage LEFT ROTATE can vary from a minimum of zero bit positions to a maximum of seven bit positions depending upon the selected bit.

The outputs $R_0$ through $R_7$ from the first stage rotator 132 are fed to the second stage rotate circuits 134 of all of the general logic characters L1 which perform a byte transfer of 0, 8, 16, or 24 bits. For example, assuming that there are four general logic characters L1(A), L1(B), L1(C), and L1(D), then the outputs of all four first stage rotate circuits are fed to all four second stage rotate circuits 134 associated with each of these characters.

Figure 22:
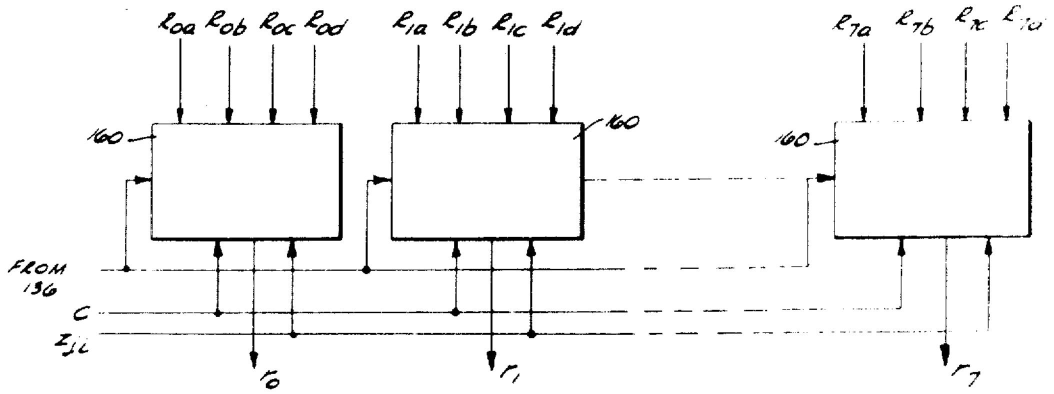
FIG. 22 is a block diagram illustrating the second stage rotate circuit utilized in the general logic character of FIG. 18.
Figures 23, 25A, 25B:
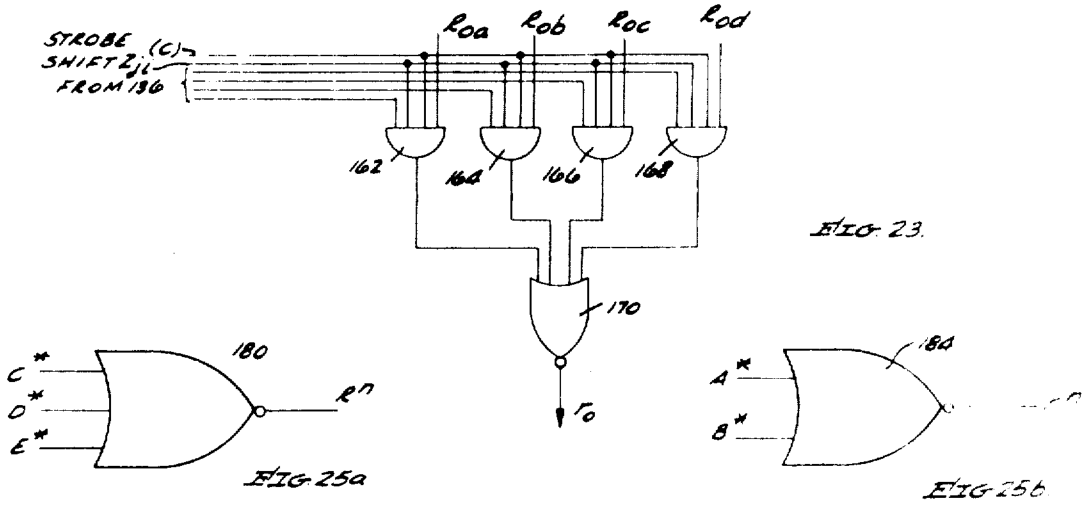
FIG. 23 is a logic diagram illustrating a single bit stage of the second stage rotate circuit illustrated in FIG. 22.
FIGS. 25a and 25b are decoding logic stages utilized in the operator decoder of FIG. 24.

More specifically, each of the second stage rotate circuits 134 include eight parallel logic blocks 160 as illustrated in FIG. 22. The first logic block (FIG. 23) receives the four $R_{0a}$, $R_{0b}$, $R_{0c}$, and $R_{0d}$ signals from the first stage rotate circuits 132 from the four general logic characters L1(A), L1(B), L1(C), and L1(D), respectively, to produce a first rotated bit $r_0$ corresponding to one of the LSB rotated signals in response to a one out of four command signals received from the operator decoder 136 when a strobe pulse *c* is received.

Similarly, the other seven logic blocks 160 receive four first stage rotated bits $R_{1a}$ through $R_{1d}$ through $R_{7a}$ through $R_{7d}$ respectively, to produce the other seven left rotated output signals $r_1$ through $r_7$ respectively, in response to the command signal and strobe pulse *c*.

Since all of the logic blocks 160 are structurally identical reference is made to the details of the left most logic block 160 (FIG. 23) that receives the input signal $R_0a$ through $R_0d$. These inputs are fed in parallel to individual AND gates 162, 164, 166, and 168 respectively, which are connected in parallel circuit relationship. In addition, a strobe pulse $c$ is received at another input of all four AND gates 162 through 168 so that when the one out of four command signals from the operator decoder 136 is received at one of the AND gates, such as AND gate 166, the input signal thereto $R_0c$ causes the output of the AND gate to go high or low depending upon the level of the input signal. Since the outputs of all four AND gates 162 through 168 are connected in parallel to the inputs of a common NOR gate 170 the output thereof stays high when all of the outputs from the AND gates are low and goes low when any one of the outputs from the AND gates goes high, to produce the rotated output signal $r_0$.

In addition, the four AND gates 162 through 168 receive a masking bit $Z_{fi_j}$ for the LOGICAL SHIFT operation as will be explained in more detail subsequently with reference to the operator decoder circuit 136.

Thus, all eight of the logic blocks 160 produce the 8 bit rotated byte $r_0$ through $r_n$ that is fed to the bussing gate 272. For example, the rotated bits $r_0$ through $r_7$ will have been rotated left 20 bit positions to produce the output signal:

| | Byte 2 | | | | Byte 3 | | | |
|---|---|---|---|---|---|---|---|---|
| Corresponding nonrotated bits of 32 bit word | $b_{20}$ | $b_{21}$ | $b_{22}$ | $b_{23}$ | $b_{24}$ | $b_{25}$ | $b_{26}$ | $b_{27}$ |
| Corresponding nonrotated bits of single 8 bit byte | $b_4$ | $b_5$ | $b_6$ | $b_7$ | $b_8$ | $b_9$ | $b_{10}$ | $b_{11}$ |
| Most significant byte of rotated bits | $r_0$ | $r_1$ | $r_2$ | $r_3$ | $r_4$ | $r_5$ | $r_6$ | $r_7$ |

Thus, for the example given the first stage rotate circuit 132 left rotates the bits 4 bit positions. Thereafter, the second stage rotate circuit 134 of general logic character L1(A) receives the rotated bits $R_0$–$R_7$ from general logic character L1(C) on its outputs $r_0$–$r_7$ to perform a byte transfer of 16 bits. This 16 bit transfer plus the 4 bit first stage rotate gives a 20 bit left rotate. The correlation between the 32 bit word of bits $b_0$–$b_{31}$ and the 4 bytes each of bits $b_0$–$b_7$ is as follows:

| $b_0$ ............ $b_{31}$ | | | |
|---|---|---|---|
| Byte 0 $b_0$–$b_7$ | Byte 1 $b_0$–$b_7$ | Byte 2 $b_0$–$b_7$ | Byte 3 $b_0$–$b_7$ |
| L1(A) | L1(B) | L1 (C) | L1 (D) |
| $r_0$–$r_7$ | $r_8$–$r_{15}$ | $r_{16}$–$r_{23}$ | $r_{24}$–$r_{31}$ |

Thus, it can be seen that the left rotate circuit is capable of performing a left rotate of up to 31 bits by a combination of a first stage rotate of up to 7 bits to the left and a second stage byte transfer of up to 24 bits.

The operator decoder 136 (FIG. 18) is responsive to the operator sub-field bits $b_5$ through $b_{10}$ received from the micro-instruction character M2 to produce: the ROTATE LEFT command signals $R^0$ through $R^8$ fed to the first state rotate circuit 132, the ROTATE LEFT command signals $r^0$ through $r^3$ fed to the second stage rotate circuit 134; mask bits $Z_{f0}$ through $Z_{f7}$ for LOGICAL LEFT or LOGICAL RIGHT shift; command signals for complementor circuit 170. Command signals for incrementer and transfer circuit 172 are decoded from source sub-field bits $b_0 - b_4$ and dest. sub-field bits $b_{11} - b_{15}$. This decoding operation is performed in the modular characters wherein the decoding network for each character is identical.

Referring to the operator decoder 136 in more detail, references are made to FIG. 24 wherein the control sub-field bits $b_5$ through $b_{10}$, hereinafter identified by the reference characters L, A, B, C, D, and E, respectively, in order to avoid confusion, are fed to a logic circuit 176 so that the bits L through E are produced in true and false signal form for each bit.

The one out of eight left rotate command signals $R^0$ through $R^7$ that are fed to the first stage rotate circuit 132 are produced by a decoder network 178 having eight parallel independent stages, each responsive to a unique combination of the bits C, $\bar{C}$, D, $\bar{D}$, and E, $\bar{E}$. As illustrated in FIG. 25$a$, each of the stages can include a NOR gate 180 having three inputs coupled to receive the three input signals C*, D*, and E* wherein the * denotes that the state of the input signal can be either true or false to produce the output signal $R^n$ where $n$ is a number representative of any of the superscripts 0 through 7.

The LEFT ROTATE command signals $r^0$ through $r^3$ that are fed to the second stage rotate circuit 134 are produced by a decoder circuit 182 having four parallel NOR gates 184 of the type illustrated in FIG. 25$b$. Each NOR gate 184 is responsive to the unique combination of bits A*, B* to produce the one out of four rotate command signals $R^n$ where n is equal to any number of 0 through 3 for byte transfer commands.

In addition, the operator decoder 136 produces the mask bits $Z_{f0}$ through $Z_{f7}$ that are fed to the second stage rotate circuit 134 during a right shift operation or a left shift operation in accordance with the logic equations: $\overline{L}(\overline{f_i}Y_j + X'_j)$ "or" $L(f_iY_j + X_j)$, respectively, by means of decoding circuits 186, 188, and 190. As will be explained in more detail subsequently, with reference to FIGS. 27 and 28, the component $fi$ corresponds to the particular bit to be masked and the components $Y_j$, $X_j$, and $X'_j$ correspond to the particular byte to be masked. More specifically, for a left shift the logic equation for the components is $(fiYj + Xj)$ with indicator L. For a right shift the logical equations for the components are $(\overline{fi}Yj + X'j)$ with indicator $\overline{L}$. $f_i$ specifies the shift mask for the 8 bits of L1 under conditions of low order shifts from zero to seven and is decoded from signals C, D, and E in this manner on each L1 (each byte).

$f_0 = 1$ = low order mask for MSB
$f_1 = \bar{C} + \bar{D} + \bar{E}$ = low order mask for NMSB
$f_2 = \bar{C} + \bar{D}$ = low order mask for MSB-2
$f_3 = \bar{C} + \bar{D}\,\bar{E}$ = low order mask for MSB-3
$f_4 = \bar{C}$ = low order mask for MSB-4
$f_5 = \bar{C}\,\bar{D} + \bar{C}\,\bar{E}$ = low order mask for MSB-5
$f_6 = \bar{C}\,\bar{D}$ = low order mask for MSB-6
$f_7 = \bar{C}\,\bar{D}\,\bar{E}$ = low order mask for LSB $X_j$, $X'_j$, and $Y_j$ specify the upper order shifts of 0, 8, 16, or 24 bits and are uniform over each byte (L1) but different for different bytes, thus also having the purpose of distinguishing which byte the L1 is acting as. These functions are decoded as follows:

For the most significant byte (most significant L1):

$X_j = X_0 = \overline{A} + \overline{B} + M$ $X'_j = X_0' = Z$ $Y_j = Y_0 = AB$ For the next most significant byte (next most significant L1):

$X_j = X_1 = \overline{A} + M$ $X'_j = X_1' = A B + Z$ $Y_j = Y_1 = A \overline{B}$ For byte 3:

$X_j = X_2 = \overline{A}\ \overline{B} + M$ $X'_j = X'_2 = A + Z$ $Y_j = Y_2 = \overline{A} B$ And for the least significant byte:

$X_j = X_3 = M$ $X'_j = X'_3 = A + B + Z$ $Y_j = Y_3 = \overline{A}\ \overline{B}$ Where M is a signal from M2 and $Z \triangleq \overline{A}\ \overline{B}\ \overline{C}\ \overline{D}\ \overline{E}$ Uniformity of L1 logic is accomplished as follows. Since all eight of the $f_i$ are identical for each byte, there are eight standard $f_i$ decoders on an L1 which generate the same $f_i$ regardless of which byte the L1 is to be used as. Each L1 also has one $X_j$, one $X'_j$, and one $Y_j$ decoder capable of decoding any one of the four possible functions assigned to it. Inputs to these decoders are unique character pins. Once it has been decided which byte this L1 is to be used as, the appropriate signals are connected to these unique pins so that the decoders operate according to the appropriate one of the four sets of equations given previously.

Figure 26:
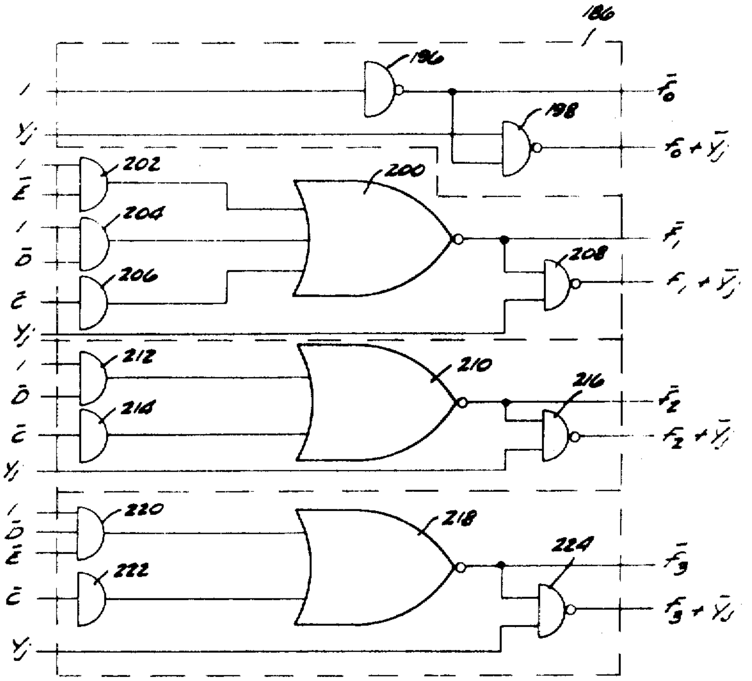
FIG. 26 is a logic diagram illustrating in detail a portion of the decoding logic utilized in the operator decoder of FIG. 24.

Referring now to the circuits in more detail, the decoder circuit 186 includes a plurality of parallel logic circuits of the type illustrated in FIG. 26. More specifically, in order to generate the signal $\overline{f_0}$ and $f_0 + \overline{Y}$ a 1 signal is fed to the input of NAND gate 196 whose output is fed to one input of NAND gate 198. The input signal Y produced by the decoder circuit 188 is also fed to NAND gate 198. The NAND gate 196 produces the output signal $\overline{f_0}$ while the NAND gate 198 produces the output signal $f_0 + \overline{Y}$.

The signals $\overline{f_1}$ and $f_1 + \overline{Y}$ are produced in response to input signals 1, $\overline{E}$, $\overline{D}$, $\overline{C}$, and Y. More specifically, a common NOR gate 200 receives the output signals from three parallel AND gates 202, 204, and 206 to produce the output signal $\overline{f_1}$ in accordance with the equation given previously. The first AND gate 202 receives the input signals 1 and $\overline{E}$ to produce an output signal. The second AND gate 204 receives the input signals 1 and $\overline{D}$, and the third AND gate 206 receives the input signal $\overline{C}$. NAND gate 208 produces the output signal $f_1 + \overline{Y}$ in response to the output signal from NOR gate 200 and input signal Y.

The signals $\overline{f_2}$ and $f_2 + \overline{Y}$ are produced in response to input signals 1, $\overline{D}$, $\overline{C}$, and Y. More specifically, the output signal $\overline{f_2}$ is produced by a NOR gate 210 in response to inputs from two parallel AND gates 212 and 214. The first AND gate 212 receives the input signal 1 and $\overline{D}$ to produce a first signal for the NOR gate 210 while the second AND gate 214 receives the input signal $\overline{C}$ to produce the second input to NOR gate 210. The output signal $f_2 + \overline{Y}$ is produced by a NAND gate 216 in response to the output signal $\overline{f_2}$ received from NOR gate 210 and the input signal Y.

The output signal $\overline{f_3}$ and $f_3 + \overline{Y}$ are produced by a logic circuit in response to the input signals 1, $\overline{D}$, $\overline{E}$, $\overline{C}$, and Y. More specifically, the signal $\overline{f_3}$ is produced by NOR gate 218 in response to output signals from two parallel AND gates 220 and 222. The first AND gate 220 receives the input signals 1, $\overline{D}$, and $\overline{E}$ to produce a first signal fed to the NOR gate 218. The second AND gate 222 receives the input signal $\overline{C}$ to produce the second signal fed to NOR gate 218. The signal $f_3 + \overline{Y}$ is produced by the output of a NAND gate 224 in response to the output signal $\overline{f_3}$ received from NOR gate 218 and the input signal Y.

The signal $\overline{f_4}$ and $f_4 + \overline{Y}$ are produced by a circuit structurally identical to the circuit for producing the output signals $\overline{f_0}$ and $f_0 + \overline{Y}$ with the exception that the input signal $\overline{C}$ is substituted for the input signal 1.

Similarly, the output signals $\overline{f_5}$ and $f_5 + \overline{Y}$ are produced by a logic block substantially identical to the logic block for producing the output signals $\overline{f_1}$ and $f_1 + \overline{Y}$. The only difference is that the input signals $\overline{C}$, $\overline{E}$, $\overline{C}$, $\overline{D}$, and 0 are substituted for the input signals 1, $\overline{E}$, 1, $\overline{D}$, and $\overline{C}$ respectively.

Similarly, the signals $\overline{f_6}$ and $f_6 + \overline{Y}$ are produced by a logic circuit similar to that one producing the output signals $\overline{f_2}$ and $f_2 + \overline{Y}$. The difference is that the input signals $\overline{C}$, $\overline{D}$, and 0 are substituted for the input signals 1, $\overline{D}$, and $\overline{C}$ respectively.

Finally, the output signals $\overline{f_7}$ and $f_7 + \overline{Y}$ are produced by a logic circuit structurally identical to the logic circuit for producing the output signal $\overline{f_3}$ and $f_3 + \overline{Y}$. The only difference is that the input signals $\overline{C}$, $\overline{D}$, $\overline{E}$, and 0 are substituted for the input signals 1, $\overline{D}$, $\overline{E}$, and $\overline{C}$ respectively.

Figure 27:
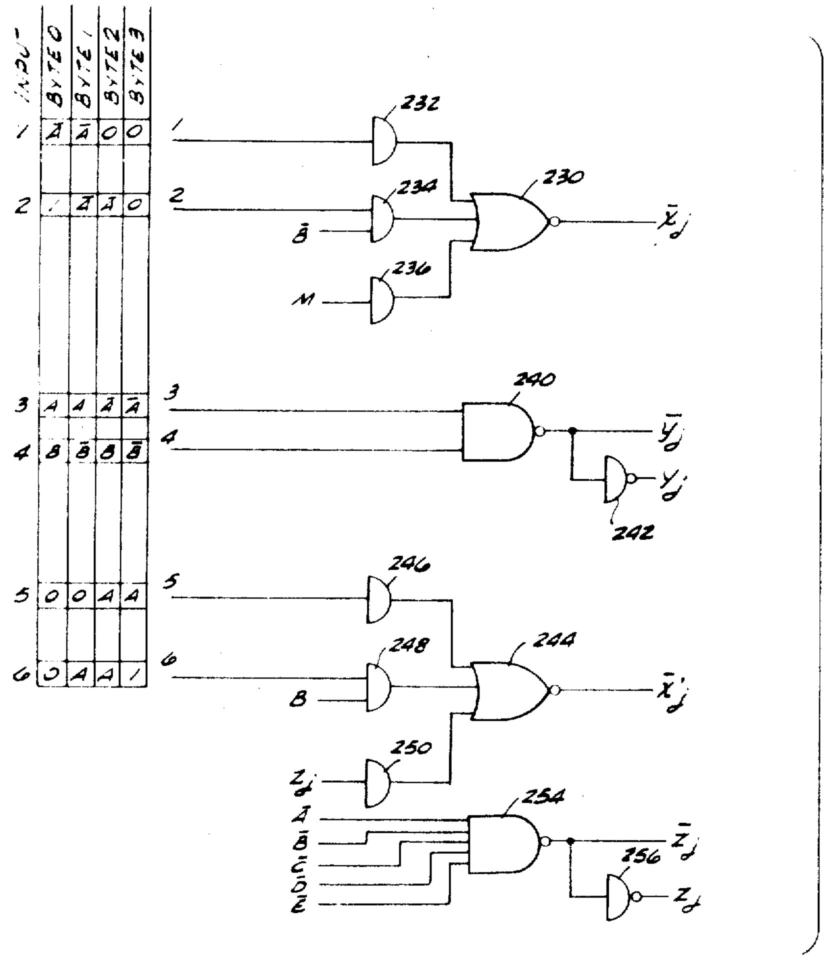
FIG. 27 is a logic diagram illustrating a detailed portion of the decoding logic of the type utilized in the operator decoder of FIG. 24.

The decoder circuit 188 for producing the logic signals $\overline{X}_j$, $\overline{Y}_j$, $Y_j$, $\overline{X}'_j$, $\overline{Z}_j$ and $Z_j$ includes four logic circuits of the type illustrated in FIG. 27 wherein there is produced for each individual general logic character $L1_j$ associated with each byte $j$, where $j$ can be representative of any of byte 0 through byte 3, a logic signal component $\overline{X}_j$, $\overline{Y}_j$, $Y_j$, $\overline{X}'_j$, $\overline{Z}_j$, $Z_j$ corresponding to each byte.

More specifically, the component $\overline{X}_j$ is produced by a NOR gate 230 having three inputs thereto from the outputs of three parallel AND gates 232, 234, and 236. Input terminals 1 and 2 are selectively connected to the two parallel AND gates 232 and 234. Input $\overline{B}$ to gate 234 and M to gate 236 are the same for all bytes.

The logic component $\overline{Y}_j$ is produced on the output terminal of NAND gate 240 in response to two input signals fed into two parallel input terminals 3 and 4. The output signal $\overline{Y}_j$ from NAND gate 240 is fed to NAND gate 242 which operates an inverter to produce the output signal $Y_j$ on the output thereof.

Similarly, the logic signal $\overline{X}'j$ is produced on the output terminal of NOR gate 244 in response to 3 inputs thereto from 3 parallel AND gates 246, 248, and 250. The input terminals to these AND gates are the parallel input terminals 5 and 6 plus signals B and $Z_j$ which are common to all bytes.

The logic signal $\overline{Z}_j$ is produced on the output terminal of NAND gate 254 in response to five parallel inputs on the five input terminals. The five inputs are $\overline{A}$, $\overline{B}$, $\overline{C}$, $\overline{D}$, and $\overline{E}$ on all bytes. The output signal $Z_j$ is produced by applying the output signal $\overline{Z}_j$ on the output of NAND gate 254 to the input terminal of NAND gate 256.

Thus, for the byte 0 associated with general logic character $(L1)_0$ the inputs to the logic circuits of FIG.

18 would be those input signals in the column labeled byte 0. Similarly, for the other 3 bytes of a 32 bit word, the input to the logic circuit would be those next three columns of inputs labeled byte 1, byte 2, and byte 3, respectively. Those input signals drawn on the figure but not listed in the table are the same on all bytes.

Figure 28:
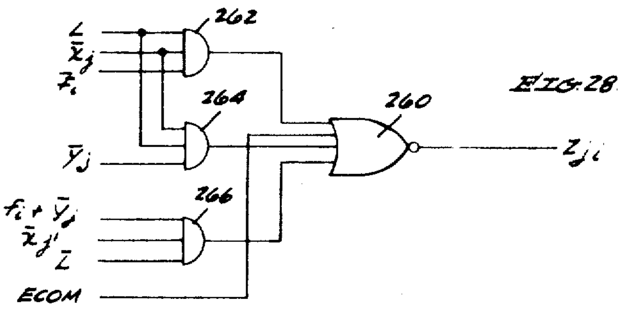
FIG. 28 is a logic diagram illustrating a detailed portion of the decoding logic utilized in the operator decoder of FIG. 24.

The 8 bit mask word $Z_{j0}$ through $Z_{j7}$ are produced by a decoder circuit 190 that includes eight parallel stages of the type illustrated in FIG. 28.

Referring to FIG. 28 in more detail, in the general case, NOR gate 260 produces an output signal $Z_{ji}$ ($j$ is the byte, 0, 1, 2, or 3; $i$ is the bit, 0, 1, 2, — or 7) on its output terminal in response to the four inputs received from three parallel AND gates 262, 264, and 266 and an input signal called "ECOM." Because of operating character of the NOR gate 260, the AND gates 262 through 266 receive the bits L, $\bar{X}_j$, $\bar{f}_i$, $\bar{Y}_j$ and $f_i + \bar{Y}_j$,$\bar{X}_j'$ and $\bar{L}$ and operate on them as previously described in the logic equation for $Z_{ji}$.

The full logic equation for $Z_{ji}$ is: $Z_{ji} = [L(f_iY_j + X_j) + \bar{L}(\bar{f}_iY_j + X'_j)]\ \overline{ECOM}$, where ECOM is the enable signal for the complementor, which must act here to force all $Z_{ji}$ to 0 so that the shifter will not be active when the complementor is.

Gates 262, 264, 266, and 260 form this equation as follows:

gate 262 output $= L\ \bar{X}_j\ \bar{f}_i$ gate 264 output $= L\ \bar{X}_j\ \bar{Y}_j$ gate 266 output $= \bar{L}\ \bar{X}'_j(f_i + \bar{Y}_j)$ gate 260 output $= \overline{262\text{ out.} + 264\text{ out.} + 266\text{ out.} + ECOM}$ gate 260 output $= \overline{L\ \bar{X}\ \bar{f} + L\ \bar{X}\ \bar{Y} + \bar{L}\ \bar{X}'(f + \bar{Y}) + ECOM}$ $= \overline{L\ \bar{X}(\bar{f} + \bar{Y}) \cdot \bar{L}\ \bar{X}'\ (f + \bar{Y}) \cdot ECOM}$ $= (\bar{L} + X + fY) \cdot (L + X' + \bar{f}Y) \cdot \overline{ECOM}$ $= (\bar{L}X' + \bar{L}\ \bar{f}Y + LX + XX' + X\bar{f}Y + LfY + X'fY)\ \overline{ECOM}$ $= [\bar{L}(X' + \bar{f}Y + XX' + X\bar{f}Y + X'fY) + L(X + XX' + XfY + fY + X'fY)]\ \overline{ECOM}$ $= [\bar{L}(X' + \bar{f}Y) + L(X + \bar{f}Y)]\ \overline{ECOM}$ More simply, refer to FIG. 28 and realize that L and $\bar{L}$ are mutually exclusive (only one may be logically high at a time). Assume ECOM is 0.

If $L = 1$, $\bar{L} = 0$, so gate 266 is off. Gates 262 and 264 output according to their other inputs since $L = 1$. In this case $Z_{ji} = \overline{\bar{X}_j\bar{f}_i + \bar{X}_j\bar{Y}_j} = (X_j + f_i)(X_j + Y_j)$ $= X_j + f_i\ Y_j$ If $L = 0$, then $L = 1$. Gates 262 and 264 are off since $L = 0$. Gate 266 is controlled by its other inputs since $\bar{L} = 1$. In this case $Z_{ji} = \overline{\bar{X}'_j(f_i + \bar{Y}_j)} = X'_j + \bar{f}_i\ Y_j$ L is a variable indicating shift direction.

$L = 1$ is a left shift; $L = 0$ is a right shift. These mask bits ($Z_{ji}$) are fed to the second stage rotate circuit 134 illustrated in FIG. 23 wherein the selected bits $i$ of the selected bytes $j$ are masked for the logical shift.

Figure 24:
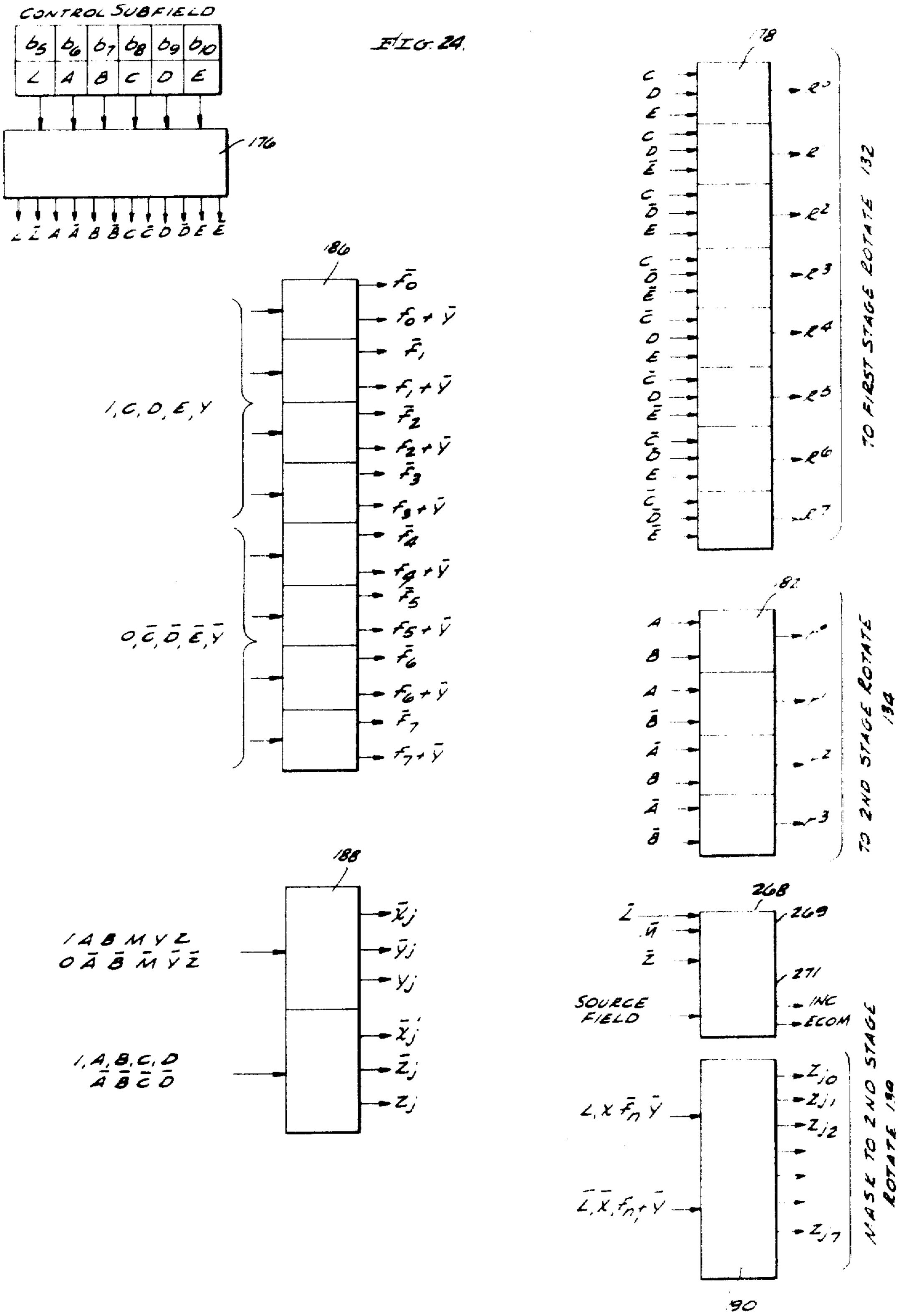
FIG. 24 is a logic diagram illustrating the operator decoder utilized in the general logic character of FIG. 18.
Figure 29:
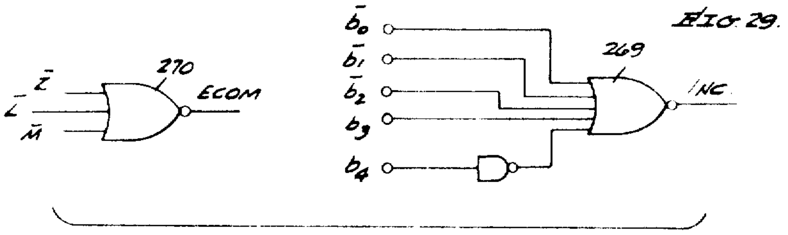
FIG. 29 is a logic diagram illustrating a detailed portion of the decoding logic utilized in the operator decoder of FIG. 24.

The operator decoder illustrated in FIG. 24 also produces command signals that are fed to the complementor circuit 170 and to the incrementer/transfer circuit 172. These command signals C can be produced by two parallel NOR circuits 269 and 270 (FIG. 29). Gate 269 produces the commands for increment (INC) by decoding select bits of the M2 source field ($b_i$ variable on FIG. 29). Gate 270 produces the ECOM signal previously discussed from variables $\bar{Z}$, $\bar{L}$, and $\bar{M}$.

Figure 30:
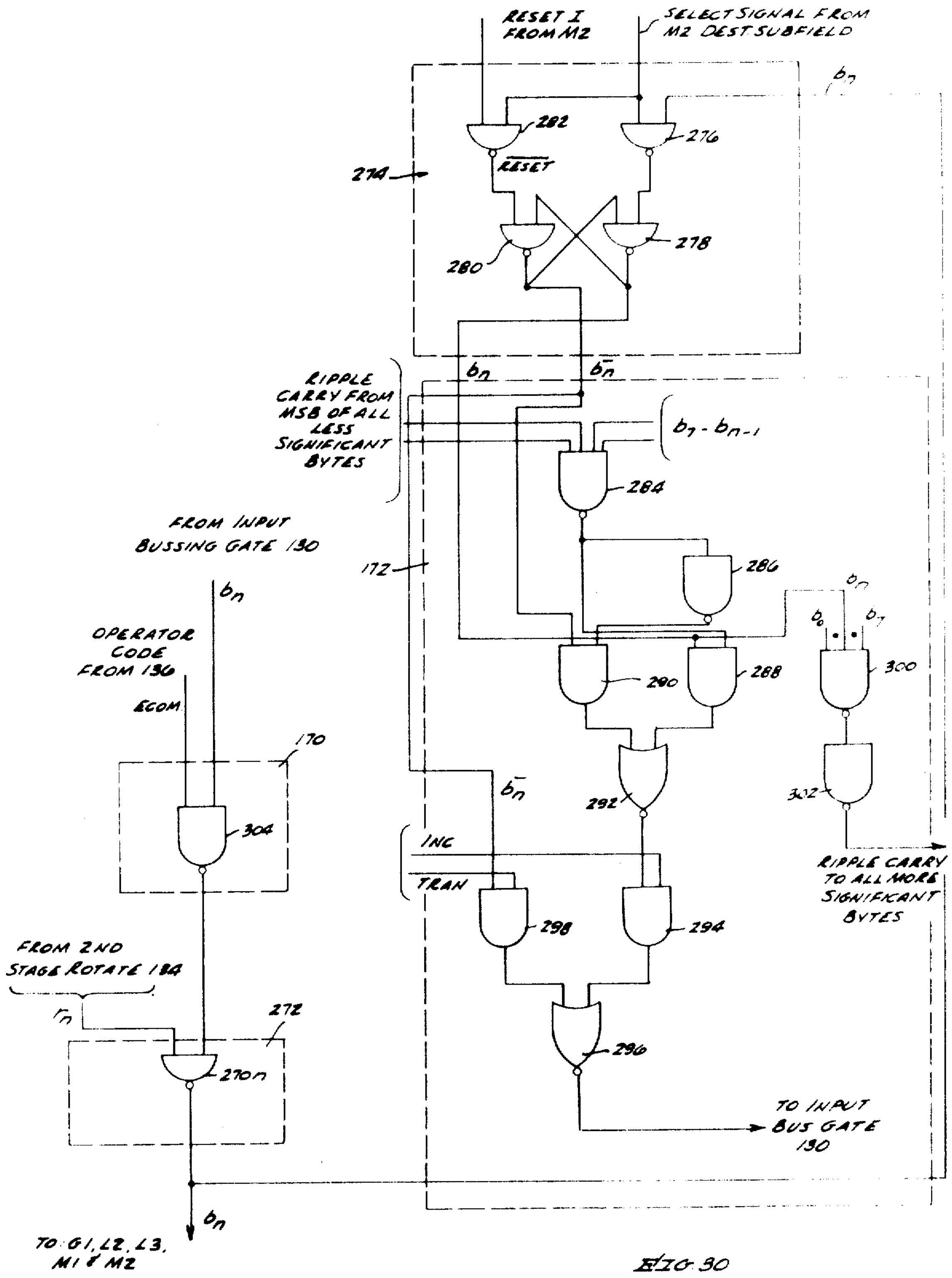
FIG. 30 is a block diagram illustrating a single bit path within the general logic character of FIG. 18 and includes one stage of the logic register, output bussing gates, the incrementer and transfer circuit, and the complementor.

Referring now to the details of one of the eight parallel data paths in the general logic character L1 for arbitrarily selected bit $b_n$ where $n$ can be any number from 0 through 7. Reference is made to FIG. 30 wherein the bit $b_n$ (corresponding to bit $r_n$ where $n$ is an integer representative of any of 0–7), from the output of the second stage rotate circuit 134 is fed to one input of a NAND gate $270_n$ within the output bussing gate 272. The output signal $b_n$ from the NAND gate $270_n$ is fed off of the character along one data path BUS (output) and is fed back on another data path to an L register 274, or latch register, on the same general logic character L1.

The L register 274 includes eight parallel storage stages of the type illustrated in FIG. 30. More specifically, the bit $b_n$ is fed to a NAND gate 276. A second input of NAND gate 276 receives a SELECT signal that is decoded from the destination sub-field (FIG. 2a) in the micro-instruction register character M2 as will be explained in more detail subsequently. The output from NAND gate 276 is fed to one input of a NAND gate 278 in the storage stage. The storage stage is initially reset to 0 in response to the RESET I signal received from the micro-instruction register character M2. Thus, assuming that the bit $b_n$ is a 1 and the output of NAND gate 276 is low, the output from NAND gate 278 goes high. This output forms the bit signal $b_n$ and is fed back to one input of a NAND gate 280. The output of NAND gate 280 is low since $\overline{RESET}$ is also high, so NAND gate 280 forms the bit complement signal $\bar{b}_n$. In addition, this output from NAND gate 280 is fed back to the NAND gate 278 thereby maintaining the output of NAND gate 278 high until reset.

Conversely, if the bit $b_n$ is a ZERO the output from NAND gate 276 is high whereupon the output of NAND gate 278 goes low since the output of 280 has been maintained high by the preclear signal. Similarly, the cross-coupling to NAND gate 280 causes its output $\bar{b}_n$ to go high to provide the complement output bit and to latch the NAND gate 278. The true bit signal $b_n$ and the false bit signal $\bar{b}_n$ are fed to the increment and transfer circuit 172. NAND gate 282 provides the $\overline{RESET}$ signal to the L register This signal performs the same function as the $\overline{RESET}$ signal in micromemory register storage character G1.

The increment/transfer circuit 172 receives the bits $b_0$ through the least significant bit $b_7$ thereof and the ripple carry outputs from the most significant bits of all less significant bytes to perform the logical operation of INCREMENT. More specifically, the increment/transfer circuit 172 includes eight parallel data paths wherein in one data path illustrated in FIG. 30, the bits $b_{n+1}$ through $b_7$ which are less significant than the bit $b_n$, and ripple carry signals from the most significant bits of all less significant bytes are fed to the inputs of a NAND gate 284. When all of the inputs to NAND gate 284 are high or all ONES the output thereof goes low. As a result, when the less significant bits are all ONES they are changed in state when the first significant ZERO bit is reached. The output from NAND gate 284 is fed along a first data path to a NAND gate 286 that inverts the output signal. The output from NAND gate 286 and the false latched bit $\bar{b}_n$ are fed to an AND gate 290 wherein if there is coincidence the output thereof goes high. In addition, the output of NAND gate 284 and the bit signal $b_n$ are fed to an AND gate 288 wherein if there is coincidence the output thereof goes high. The outputs of AND gates 288 and 290 are fed to a common NOR gate 292 wherein only if both inputs are low the output thereof goes high. If, however, either one or both inputs to NOR gate 292 are high, the outputs thereof go low. Thus, if the bit $b_n$ is a ZERO and all less significant bits $b_{n+1}$ through $B_7$ are ONES, the output of NOR gate 292 fed to AND gate 294 is low. Thus, when the increment signal (INC) decoded from the SOURCE sub-field and received from the SOURCE decode portion of decoder 136 is received at the other input of AND gate 294, its output fed to NOR gate 296 remains low. In addition, the other input to NOR gate 296 is received from an AND gate 298 which in turn is enabled only when a TRANSFER signal (logically INC·MLS, where MSL is sent from micro-instruction register character M2) is received from the operator decoder 136. Thus, since both inputs to NOR gate 296 are low, its output goes high to signify a binary ONE for the incremented byte.

Conversely, if the bit $b_n$ is also a ONE, the output from NOR gate 292 fed to AND gate 294 is high. As a result, the output of AND gate 294 goes high and the output of NOR gate 296 goes low.

The most significant bit has a ripple carry circuit including a NAND gate 300 coupled to receive all of the bits $b_0$ through $b_7$ so the output thereof goes low when all of the bits are ONE. The output from NAND gate 300 is fed through a second NAND gate 302 whereat it is inverted to produce a ripple carry signal that is fed to all more significant bytes in other general logic characters $L_1$.

In order to transfer the latched data bit $b_n$ back to the input bussing gate 130, a TRANSFER signal decoded from the SOURCE sub-field in the micro-instruction register character M2 and received from the source decode portion of decoder 136 is fed to the AND gate 298. The output of AND gate 298 goes high if there is coincidence between the TRANSFER signal and the complemented bit $\overline{b_n}$; and since there is no INCREMENT signal received by AND gate 294 its output remains low during the transfer operation. As a result, when one input to NOR gate 296 is high the output thereof goes low and is fed back to the input bussing gate 130. If, however, the output of AND gate 298 goes low, as occurs when $\overline{b_n} = 0$, the output of NOR gate 296 goes high. Thus, the data stored on the L register or its increment may be fed back to input bussing gate 130 (FIG. 18) whereupon it may be operated upon in accordance with an operator field given with the source field code which activates gates 298 or 294.

In addition, the output signals $b_0$ through $b_n$ of the input bussing gate 130 are complemented in a complementor circuit 170 that includes eight parallel NAND gates 304 of the type illustrated in FIG. 30. The NAND gates each receive at one input one of the bits $b_0$ through $b_7$ where bit $b_n$ is representative thereof from the input bussing gate 130 and a COMPLEMENT command signal (ECOM) decoded from the operator subfield by a decoder as discussed in FIG. 29. If the bit $b_n$ is high, the output of NAND gate 304 goes low and if the bit $b_n$ is low, the output of NAND gate 304 goes high. The output of NAND gate 304 is fed to one input in the *n*th stage NAND gate **270*n* of the output bussing gate 272**.

MODULAR EXPANSION OF GENERAL LOGIC CHARACTER L1

Figure 31:
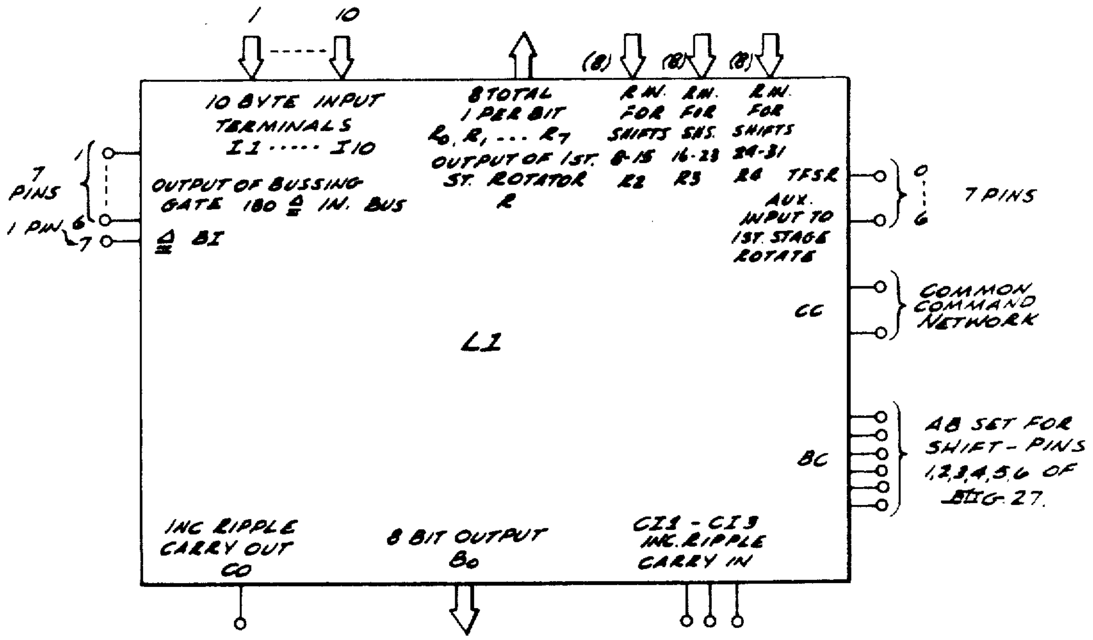
FIG. 31 is a functional block diagram utilized to explain modular expansion of the general logic character L1.

As can be seen by the foregoing discussion, the general logic character L1 can be represented in functional block diagram form by FIG. 31. Elements of this figure are:

Inputs I1 through I10: 80 pin input (8 bits by 10 bytes) to bussing gate 130 (FIG. 18) designed to accept bytes of data from any 10 of arithmetic logic characters L2, input/output characters L3, and/or micromemory register storage characters G1.

The first stage rotate outputs R include 8 pin total outputs from first stage rotator 132 (FIG. 18) — specifically the bit output from each of 8 first stage rotator blocks 142 (FIG. 20). These 8 pins are designed to be output on a bit-by-bit basis to 8 second-stage rotator blocks of a neighboring L1 character. These can enter the neighboring character on any one of three sets of 8 input pins each labeled R2, R3, and R4.

Input R2 includes 8 input pins designed to accept the eight first stage rotate output R− signals of the next rightmost general logic character L1 character for shifts or rotates of from 8 to 15 bit positions. R2 is an input to block 134 of FIG. 18.

Input R3 includes 8 input pins designed to accept the eight first stage rotate output R− signals of the second rightmost general logic character L1 shifts or rotates of from 16 to 23 bit positions. R3 is an input to block 134 of FIG. 18.

Input R4 includes 8 input pins designed to accept the eight first stage rotate output R− signals of the third rightmost general logic character L1 for shifts or rotates of from 24 to 31 bit positions. R4 is an input to block 134 of FIG. 18. Within block 134 are eight logic blocks 160 as in FIG. 22, one for each bit *j*. For each block 160 such as the one in position *j*, one bit each of R2, R3, and R4 are inputs.

Input TFSR includes seven input pins operable to accept the outputs of the seven most significant gates 140 (FIG. 19) of the next rightmost L1 character TFSR signals go to the first stage rotate blocks 142 as described with reference to FIG. 20.

Input bussing gate 130 output signals BI include eight output pins operable to output from the general logic character L1 the output of all eight gates 140 of FIG. 19. Only the seven most significant gates output to the next leftmost general logic character L1 via its TFSR inputs; the eight BI signal (the least significant bit of the input bus) is necessary to expose this bit of the input bus to the micromemory counter character M1 as feedback for microprogram control as will be described in more detail with reference to the micromemory counter character M1.

Common network input CC includes control signals input from micro-instruction register character M2 which are common to all general logic characters L1 regardless of byte position of the L1.

Control input BC includes six control signal inputs which are connected in a manner determined by which byte position the L1 acts in. These are the signals labeled 1 through 6 of FIG. 27. The table with FIG. 27 shows how the six pins are to be connected with the outside logic for each of the four byte positions the general logic character L1 might occupy. The pattern appropriate to a general logic character L1 in the most significant byte of 32 bits (called BYTE 0 on the table of FIG. 27) will be referred to as CODE 0. The pattern of BYTE 1 of FIG. 27's table will be referred to as CODE 1, that of BYTE 2 as CODE 2, and that of BYTE 3 as CODE 3.

Incrementer ripple carry inputs CI1, CI2, and CI3 include incrementer carry inputs from three lower order bytes (FIG. 30). Only three pins are used.

Bus output Bo includes eight output pins making up the eight bit byte output of the general logic character L1, forming eight bits of the output bus. These are outputs from the eight bussing gates of block 272 of FIG. 18.

Incrementer ripple carry output Co includes one pin which is the incrementer ripple carry output to all higher order bytes. This is the output of gate 302 of FIG. 30.

General logic character L1's part in functional, parallel-computation and multi-computational expansion is less complex than character G1's. General logic character L1 forms the core of a logic unit as it establishes the input bus and output bus and closes the data loop between G1, L2, and L3 characters. As such, there is usually a general logic character L1 in each logic unit. Furthermore, there usually is not more than one level of word-length-expanded L1 characters in any logic unit. Thus, since parallel and multi-computation expansion involves manipulations at the logic-unit level, the L1 character contributes to this stage of expansion merely by its presence or absence. If, another logic unit is desired, another level of L1 character is added. The same philosophy holds for functional expansion; if L1's character operations are desired, it is added to the unit. If one feels it is not needed, it is not included in the logic unit.

WORD LENGTH EXPANSION

General logic character L1 is capable of wordlength expansion much as is character G1. Since most character L1 logic is dedicated to rotating and shifting, this will be discussed first. L1's rotate and shift logic is controlled by signals from micro-instruction register M2 including L, A, B, C, D, E, and M, amongst others. The significance of these signals is as follows:

| M | L | ABCDE |
|---|---|---|
| M=0=shift<br>M=1=rotate | L=1=left direction<br>L=0=right direction | a five bit field signifying the number of bit positions of the shift or rotate |

} from M2

Figure 32:
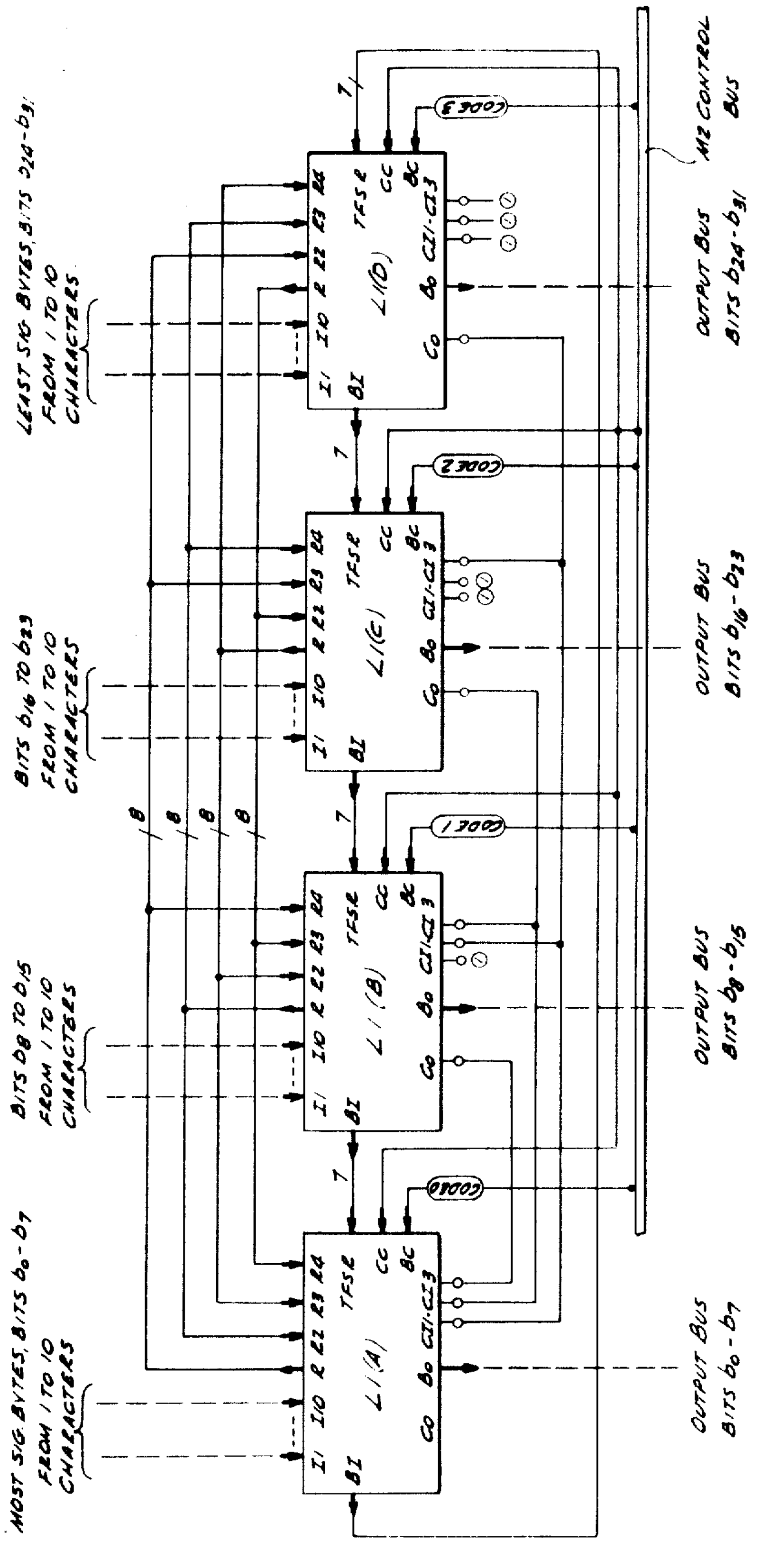
FIG. 32 is a block diagram illustrating 4 byte modular word expansion utilizing four general logic characters L1.

It is easier to consider first a fully word expanded character L1 setup; such as that of FIG. 32. Four L1 characters establish a logic block capable of handling inputs of 32 bit wide data words from characters G1, L2, L3 as discussed with respect to character G1. This logic block outputs a 32 bit wide data word back to these characters as discussed with respect to character G1. Bit $b_0$ is the most significant bit.

Although all character L1's in FIG. 32 are logically identical, subscripts (A), (B), (C), and (D) are added for distinguishing them for purpose of discussion.

An example of the difference between shifts and rotates are given.

| | |
|---|---|
| 11101101 | data X |
| 10111101 | X left rotated 5 bits |
| 10100000 | X left shifted 5 bits |

Left rotate is the most basic operation and will be discussed first. For this operation ML = 11, and ABCDE determines the number of bits to be shifted. Reference can be made back to the discussion of L1 where necessary to understand the following.

The register unit accessed by the source code from micro-instruction register character M2 will present its 32 bit data word to one set of inputs I1 to I10. This same word is present at the output of the bussing gate, whose sole purpose is to channel all 10 inputs together to one data path. As such, the 32 bit data word appears on the BI outputs of all L1 characters. At this time, rotation begins. By virtue of the BI-TFSR connections shown, each bit $j$ of the first stage rotate circuit (there is one sub-circuit per bit) has access to the input BI or bussing gate output $BI_j$ of its own bit position plus the BI of the seven next rightmost bit positions, regardless of whether one or more of the next seven rightmost inputs BI are on the same character L1 or on the next rightmost character L1.

Rotate is a circular operation, so for the purposes of rotates, L1(A) is the next rightmost L1 of L1(D), L1(B) is the second rightmost L1 of L1(D), L1(A) is the second rightmost L1 of L1(C), etc.

It is now necessary to consider the rotate/shift bit field ABCDE. Bits ABCDE are a simple binary encoded field giving the bit amount of the left rotate from 0 to 31 bits.

| ABCDE | |
|---|---|
| 00000 | rotate 0 |
| 00001 | rotate 1 |
| 00010 | rotate 2 |
| . | . |
| . | . |
| . | . |
| . | . |
| . | . |
| 11111 | rotate 31 |

It is possible to look at this another way:

Bits CDE encode a number from 0 to 7.

Bits AB, having four states, 00, 01, 10, 11, encode a number that is either 0, 8, 16, 24, respectively.

The total of the shift is the sum of the number encoded by CDE and the number encoded by AB.

This is how the character L1 rotator logic operates. The first stage rotate performs the number of shifts specified by CDE. The output of the first stage rotator circuit goes to the second stage rotator which performs the number of shifts specified by AB.

Thus, each bit of the first stage rotate circuit has an output either the output BI of its own bit position for a CDE of 000, or an output of one of the next seven rightmost outputs BI as specified by the binary value of CDE, accomplishing a left rotate of from zero to seven positions. There are 32 of these first stage rotate circuits (FIG. 20) — eight in each of the four characters L1(A), L1(B), L1(C), and L1(D), and the output of each rotate circuit appears at one of the eight output pins R, on each character L1 which are in turn connected on a byte basis to the sets of input pins R2, R3, and R4 of the other characters L1 as shown in FIG. 32.

Inputs R2, R3, R4, and the output R of each particular L1 character from the four inputs, on a byte basis, to the second stage rotate circuits 134 (FIG. 18) of each L1 character. The second stage rotate circuit 134 is a one-of-four selection on the basis of the code of AB. If AB = 00, the output of the second stage rotate circuit of each character is the output of the first stage rotate circuit 132 of that L1 character. If AB = 01, the output of each second stage rotate circuit 134 on each general logic character L1 is the appropriate R2 input to that character. Since each input R2 is the output of the first stage rotate circuit 132 exactly 8 bits or 1 byte to the right, a left shift of 8 bits can be added to the shift accomplished by each first stage rotate circuit 132. If AB = 10, the output of each second stage rotate circuit on each L1 is the appropriate R3 input to that L2 and since these are in turn the outputs of first stage rotate circuits exactly 16 bits or 2 bytes to the right, a shift of 16 can be added to the shift of the first stage rotate circuit 132. If AB = 11, the output of the second stage rotator on each L1 is that L1's appropriate R4 input and a left shift of 24 bits is added to each first stage rotate shift.

Since the second stage rotate circuits output directly to the output bus $b_0$, rotates of 0 to 31 bits are accomplished on the data appearing on any $I_j$ input. The result appears on the output bus where it is returned to a register specified by the destination field of microinstruction register character M2 as described previously with respect to micromemory register storage character G1.

Since rotate is a circular operation, concepts such as least and most significant bits have little meaning except in how the answer is interpreted. Thus, each general logic character L1, being identical, receives identical commands and reacts identically.

Shifting is a slightly different operation. In this case, bit position does matter, since in right shifts of X bits the X most significant bits of the output are made zero and in left shifts of Y bits the Y least significant bits of the output are made zero.

In a left shift operation the rotate circuits operate exactly as it would in a left rotate of the same bit length. The difference (as shown by the example given) is that now a certain number of the least significant bits (equal to the length of the shift) must be masked or made zero. This is the responsibility of the previously discussed shift network which produces a mask bit $Z_H$ for each bit of the second stage rotate circuit, effectively masking or making zero selected outputs of the rotate circuit, thus accomplishing a shift rather than a rotate.

In this case, each general logic character L1 must operate differently, depending on its position. For instance, in a left shift of 10 bits, all second stage rotate outputs of character L1(D) are masked. No outputs of character L1(A) or L1(B) are masked. For character L1(C), the least significant 2 bits are masked but the other six are not. Thus, for each shift, a general logic character L1 will either mask all bits, none, or a select few of its eight, depending on how it connects in a circuit.

The information to each character L1 regarding which byte it is and how it must react to shifts is imparted to it by means of the particular input code as specified by FIG. 27. For example, character L1(A) operates on the most significant byte and receives CODE 0 on its BC input, and so forth for the other parallel characters L1(B), L1(C), L1(D), and codes 1, 2, and 3 respectively, as FIG. 32 shows.

Observe the equation for mask bits $Z_H$:

$$Z_H = [L(f_i\ Y_j + X_j) + \bar{L}(\bar{f_i}\ Y_j + X_j')]\ \overline{ECOM}$$

For left shift L = 1 and $\bar{L}$ = 0. Basically, unless some term in $Z_H$ is 1, a mask will occur. Terms X and Y, also X' for right shifts, are byte dependent; that is, determined by which CODE is applied to BC. Term X guarantees $Z_H = 1$ for the whole byte if the mask doesn't extend to that byte. Term Y is 1 for the byte only when the shift is such that some bits in the byte are masked and some are not. If Y = 1, then $f_i$ determines exactly which bits are masked in the byte and which are not.

For example: $f_6 = \bar{C}\ \bar{D}$. This is for the next least most significant bit. On the least significant byte, $f_6$ = 1 only for codes CDE = 000 and 001; that is, for shift zero or shifts of one. For any higher shift $f_6$ = 0 and the bit is masked. Similarly, $f_0$ through $f_7$ respond to equations as previously indicated with regard to the operation of decoder 136.

If both X = 0 and Y = 0 for the byte, all eight bits in that byte are masked.

Thus, left shifts of 0 to 31 bits are accomplished by the left rotator operation rotating the data the proper amount of bits and the mask network generating mask bits $Z_H$ which force the proper bits to become zero.

Right rotates or shifts are accomplished as follows. In a rotate circuit $n$ bits wide, a right rotate of $x$ bits is identical to a left rotate of $(n-x)$ bits. In this case $n$ = 32. When a right rotate of $x$ bits is desired, one enters into coded inputs ABCDE the value $(32-x)$ in binary code and orders a left rotate. The exception to the rule is right rotate zero, which is effectively a no operation command as is coded as left rotate zero.

For right shifts, codes $M = 0$ and $L = 0$. The left rotator rotates the data $(32-x)$ bits to the left accomplishing the proper data orientation. Mask bits $Z_H$ accomplishes the masking using terms $\bar{f_i}$ instead of $f_i$ and $X'_j$ instead of $X_j$. The operation is similar to the left shift mask described before except that now the proper number of most significant bits are masked rather than least significant bits.

General logic character L1 also contains a complementer 170, incrementer 172, and L register 274 (FIG. 18).

Complementer expansion is straightforward since it is simply a bit-by-bit inversion of data entering the $I_j$ inputs and output on BUS (output) $B_0$. The L register 274 is similar to previously discussed micromemory storage registers of character G1 and expands in word length as do the character G1 registers. Bytes added to the register unit in added general logic characters L1 simply receive identical commands and operate together.

Each general logic character L1 contains an 8 bit incrementer 172 with carry inputs from up to 3 lower-order bytes and a carry output for any higher order byte. Incrementers of any length up to 4 bytes (32 bits) can be made from these identical blocks of logic on each general logic character L1. It is only necessary that the character L1 in byte position $j$ receive at its input pins CI1, CI2, and CI3 the incrementer ripple carry output Co from all lower order bytes. The incrementer ripple carry output Co from the character L1 in byte position $j$ must go to one of the incrementer ripple carry inputs $CI_j$ on each higher order byte. Unused incrementer ripple carry inputs $CI_j$ must be hardwired to logical 1. The incrementer ripple carry output Co of the most significant character L1 is not used (FIG. 32).

Discussion of general logic character L1 expansion is easier if one first describes L1 in fully expanded configuration (as has just been done) and then describes what is not needed in smaller configurations. Notice that in theory there is no limit to the bit length of a structure similar to the described character L1. However, size of the second stage rotate logic 124 and the limit imposed by the necessary length of the field to encode shift length command leads us to arbitrarily specify a rotator/shifter size of 32 bits contained in four identical 8 bit general logic characters L1 for which rotate and shift lengths up to 31 bits are commanded by a 5 bit field ABCDE. This is the "fully expanded configuration" just described.

Figure 33:
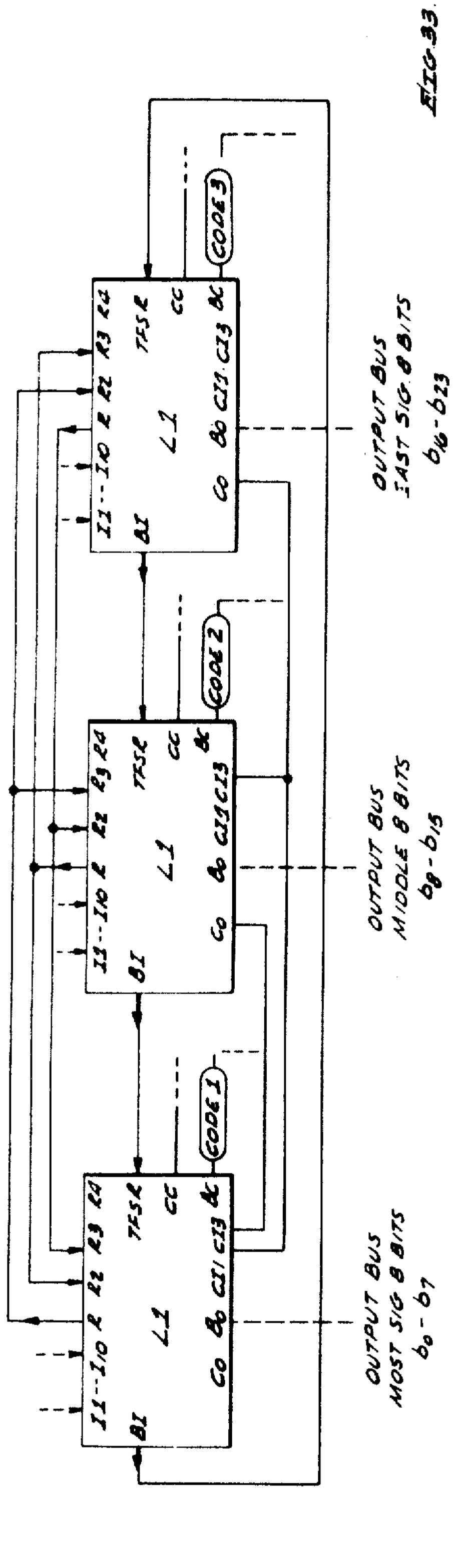

The 8 bit length of general logic character L1 enables choices of 32, 24, 16, or 8 bit expanded logic units by use of 4, 3, 2, or 1 general logic characters L1 respectively. The 32 bit arrangement has been described relative to FIG. 32. FIG. 33 shows necessary intercharacter wiring changes from the configuration of FIG. 32 when three general logic characters L1 are constructed as an expanded 24 bit logic unit. Notice that inputs R4 and CODE 0 are not used. Output terminals R, and input terminals R2 and R3 are connected as shown to make a 24 bit rotator in the same manner as previously described. Logic responding to codes AB = 11 is thus not connected but in this case it is not necessary, since codes AB = 11 are used only for rotates and shifts from 24 to 31 which are not needed or used in this case.

Figure 34:
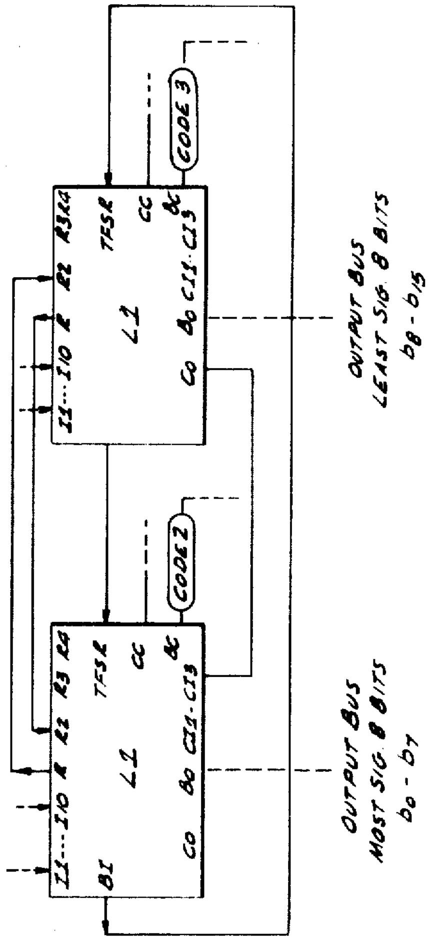
FIG. 34 is a block diagram illustrating 2 byte modular expansion using two general logic characters L1.

FIG. 34 shows two general logic character L1 configured as a 16 bit unit with 16 bit rotator shifter. In this case, input terminals R3 and R4 and CODE 0 and CODE 1 are not used. These terminals and codes are used only for rotates and shifts in excess of 15 bits which are not needed or used in this case.

Figure 35:
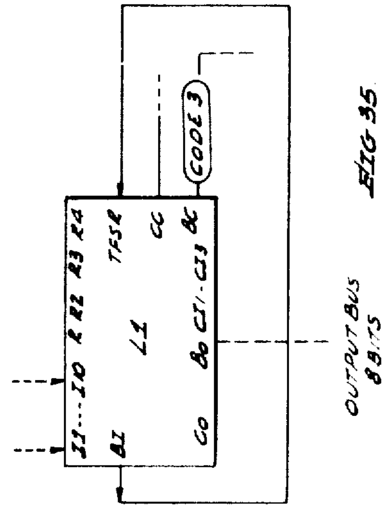
FIG. 35 is a block diagram illustrating the circuit connection for a modular 1 byte general logic character L1.

FIG. 35 shows one general logic character L1 used as an 8 bit logic block. Only CODE 3 is used since higher order codes are only necessary for shifts and rotates in excess of 7 bits which are not used here. Since there is only one general logic character L1 the connection of first and second stage rotors is internal so none of output and input terminals R, R2, R3, or R4 are necessary. Outputs of the bussing gate BI must connect back to input pins TFSR to close circuit the first stage rotator loop.

ARITHMETIC LOGIC CHARACTER — L2

Figure 36:
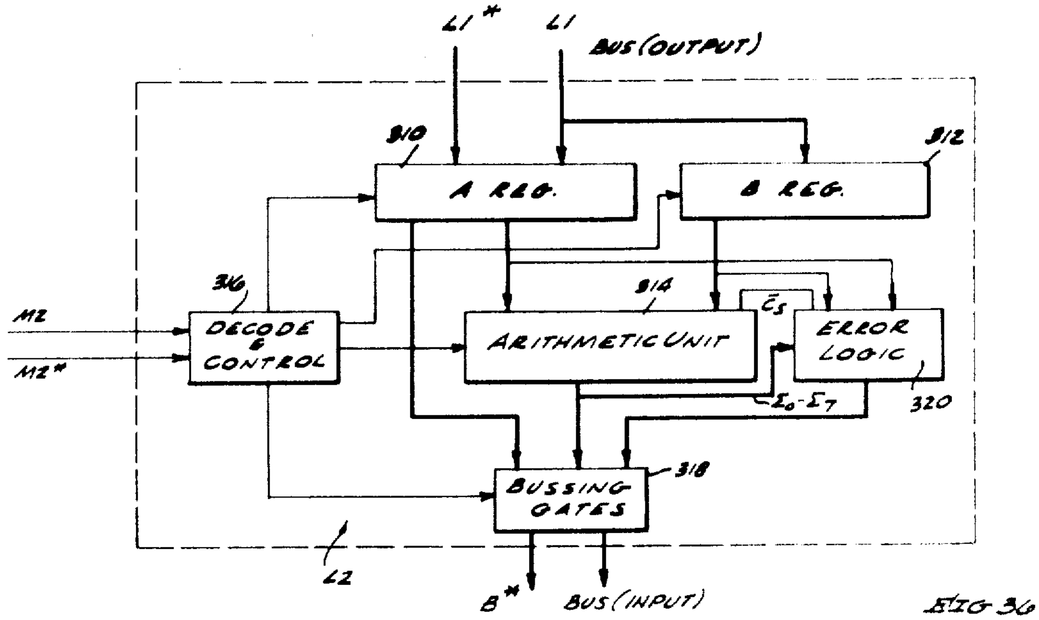
FIG. 36 is a block diagram illustrating the arithmetic logic character L2.

The arithmetic logic character L2 receives bytes of data from the output bus of the general logic character L1 and performs major arithmetic functions for use by the micro-program. The arithmetic logic character L2, as illustrated in FIG. 36, includes an A register 310 and a B register 312 connected to the BUS (output) of the general logic character L1 for receiving operands in digital signal form. An arithmetic unit 314 is a full adder capable of performing EXCLUSIVE OR functions wherein addition is performed with look ahead byte parallel operation. Control signals from a decode and control circuit 316, produced in response to signals from the micromemory control unit, condition the arithmetic unit 314 to alternately provide either a MOD TWO addition instead of full addition or an input carry to the lowest order bit during full addition. A bussing gate 318 is coupled to receive the 8 bit outputs from: the A register 310, the arithmetic unit 314, and an error logic circuit 320 to produce an 8 bit byte output signal that is fed via the BUS (input) to the bussing gate 130 (FIG. 18) of general logic character L1.

In operation during a first time period a first operand is fed to the B register 312 from the BUS (output) of the general logic character L1 and stored therein. Thereafter a second operand is fed to the A register 310 from the BUS (output) of the general logic character L1 and stored therein. During the next time period the operands are operated upon by the arithmetic unit 314 and after an appropriate time delay fed to the bussing gate 318. The error logic 320 provides an overflow and carry-out information as will be explained in more detail subsequently. The operated upon word in the output bussing gate 318 is then fed on the BUS (input) to the general logic character L1.

Figures 37, 40A, 40B:
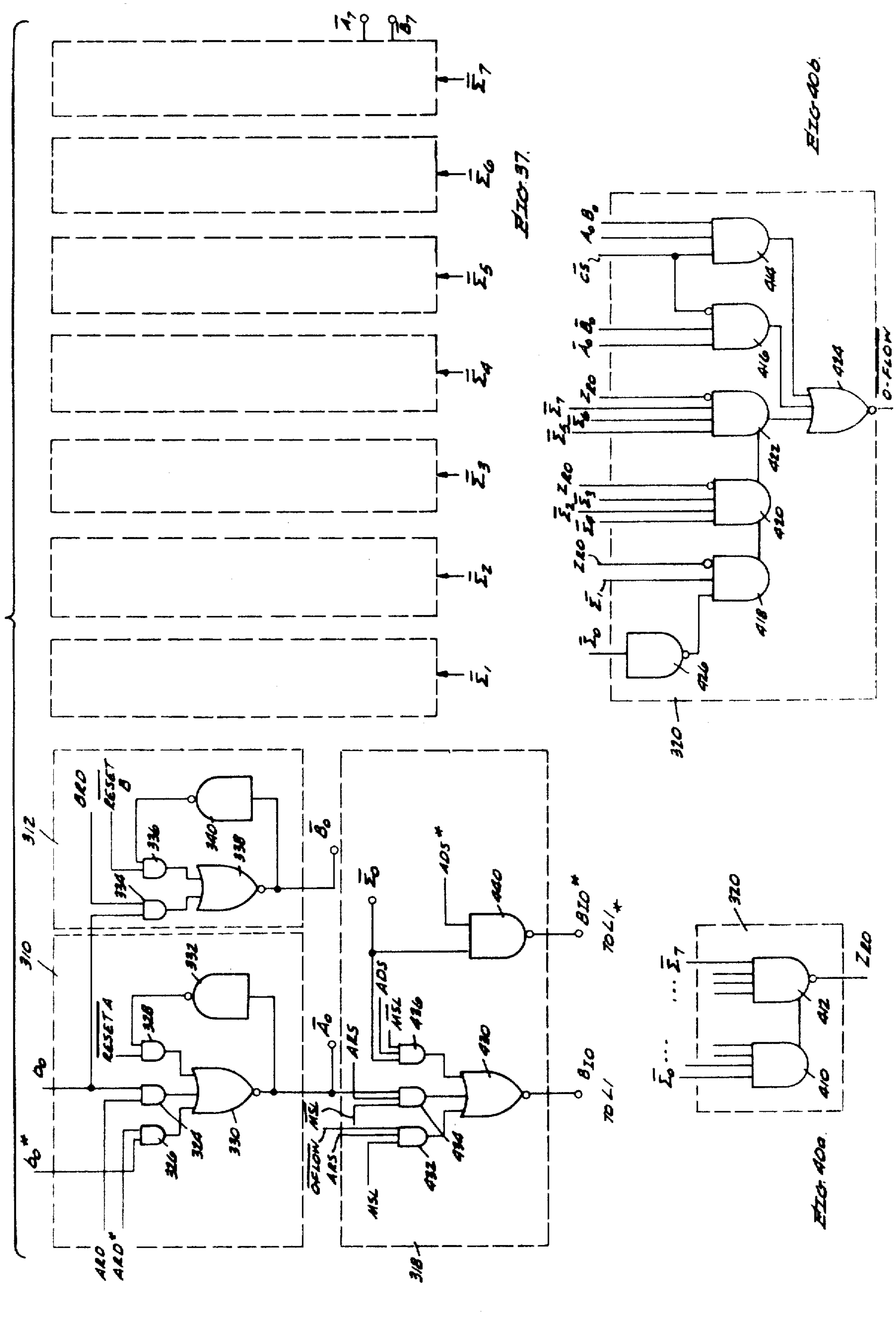
FIG. 37 is a schematic and block diagram of 8 stages of A and B registers and bussing gates illustrating in detail one stage of the A register and one stage of the B register, their relationship and a detail logic of one stage of the bussing gate of the arithmetic logic character of FIG. 36.
FIGS. 40*a* and 40*b* are logic diagrams illustrating the logic error circuit for the most significant byte and for the less significant bytes utilized in the arithmetic logic character of FIG. 36.

Referring now to the arithmetic logic character L2 in more detail, the A register 310 is an eight stage parallel input, parallel output, register of the type utilized in the micromemory register storage character G1. As illustrated in FIG. 37, for one data path, the arbitrarily selected most significant bit $b_0$ from the BUS (output) of one general logic character L1 or the most significant bit $b^*_0$ from an alternate general logic character L1* is stored in one stage of the A register 310 in response to A register destination command signals ARD or ARD* respectively. As will be explained in more detail subsequently, the command signals ARD and ARD* are decoded in the decode and control circuit 316 (FIG. 36) in response to the destination sub-field received from a micro-instruction character M2 or M2* in the alternate control unit.

The storage portion of the A register 310 includes eight parallel flip-flops any one of which may be illustrated by the three parallel AND gates 324, 326, and 328 having their outputs connected to a common NOR gate 330 of FIG. 37. One of the AND gates 324 is coupled to receive the A register destination command signal ARD and the bit $b_0$ from one of the general logic characters L1 corresponding to one of the bytes. If both of the inputs to AND gate 324 are high, its output goes high. Alternatively, AND gate 326 has its inputs coupled to receive the bit $b_0$* from an alternative general logic character L1* and an A register destination command signal ARD*. The third AND gate 328 has its inputs coupled to receive a $\overline{RESET_A}$ signal similar to those of the character G1 and character L1 and an inverted output signal from NOR gate 330 fed through inverting NAND gate 332. In essence, the output $\bar{A}_0$ of NOR gate 330 goes high only if all of the inputs thereto are low, thereby signifying that the input signal $b_0$ or $b^*_0$ is a ZERO. If, however, any of the inputs to NOR gate 330 are high, its output $\bar{A}_0$ goes low. This output signal $\bar{A}_0$ from the storage stage of the A register 310 is fed along one circuit path to the arithmetic unit 314 and along another circuit path to one gate stage of the bussing gate 318. Thus, in one mode of operation the A register 310 stores one operand for the arithmetic unit 314.

The B register 312 includes eight parallel storage stages of the type illustrated in FIG. 37. The storage stage for the most significant bit $b_0$ includes two parallel AND gates 334 and 336 which have their outputs connected to a common NOR gate 338. One of the AND gates 334 has one input coupled to receive the data bit $b_0$ from the general logic character L1 and a B register destination command signal BRD from the decode and control circuit 316. The other AND gate 336 receives the output signal $\bar{B}_0$ of NOR gate 338 fed through inverting NAND gate 340 and receives a reset signal $\overline{RESET}_B$ from decode and control circuit 316. The output signal $\overline{B}_0$ of NOR gate 338 goes high only when all of the inputs thereto are low. This output signal $\overline{B}_0$ from the illustrated most significant stage of the B register 312 is fed to the arithmetic unit 314.

The arithmetic unit 314 FIG. 36) can include two 4 bit 8260 ARITHMETIC LOGIC ELEMENTS manufactured by Signetics Corporation and illustrated in their applications memo No. 85, dated Mar. 21, 1968, connected in parallel as a ripple adder illustrated on page 5 thereof. In essence, the arithmetic unit 314 is responsive to command signals from the decode and control circuit 316 so that it can perform as a full adder, a MOD two addition, a forced carry, a conditional carry, or an exclusive OR function.

Figure 38:
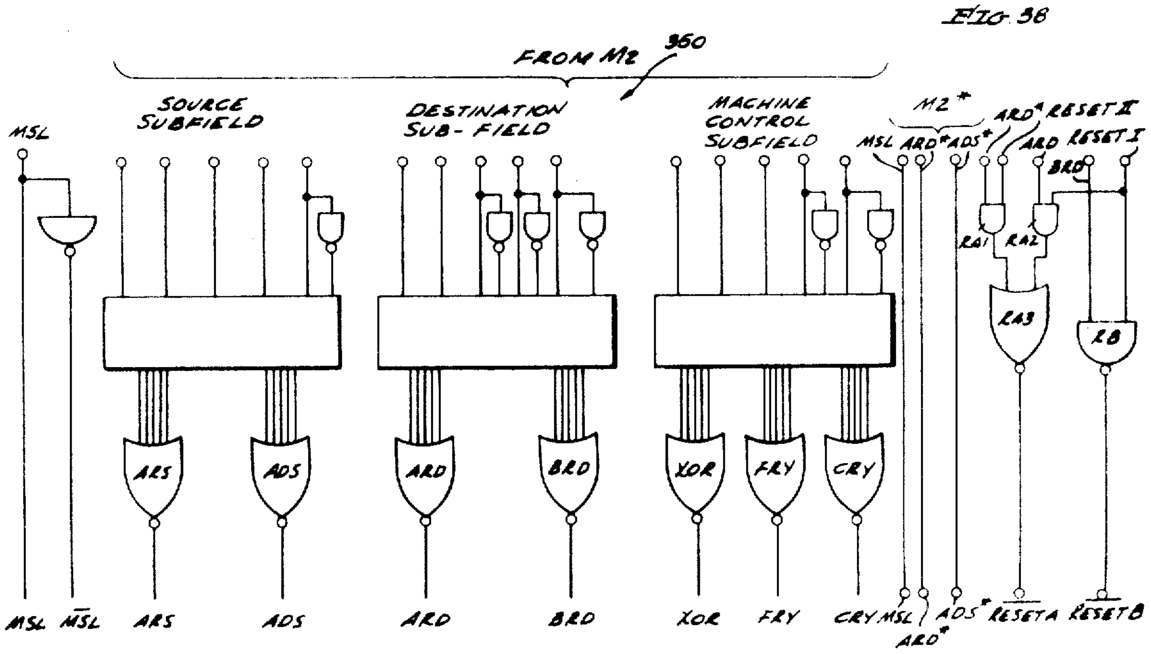
FIG. 38 is a logic diagram illustrating the decode and control logic utilized in the arithmetic logic character of FIG. 36.

Referring now to the details of the decode and control circuit 316, reference is made to FIG. 38 wherein command signals are produced in response to the source subfield, the destination sub-field, and machine control sub-field received from a micro-instruction register M2. The decode and control circuit 316 includes a decoding network such as a plurality of parallel NOR gates that are selectively responsive to sub-field input signals to produce the command output signals. For example, two NOR gates ARS and ADS could be selectively responsive to the bits in the source sub-field to produce the A register source command signal ARS and the add source signal ADS, respectively, as will be explained in more detail subsequently with reference to the bussing gate 318. The A register source signal ARS accesses the content of the A register. The add source signal ADS accesses the output of the arithmetic unit 314. Usually, the output from the arithmetic unit 314 is the full sum of the contents of the A and B registers. However, the output may be modified by the machine control sub-field control signal as will be explained in more detail subsequently.

The decoder network 350 further includes parallel NOR gates ARD and BRD responsive to the destination sub-field bits for producing an A register destination command signal ARD and a B register destination command signal BRD. As was previously explained with reference to the A register 310 and the B register 312 in FIG. 37, these command signals allow the signals received on the BUS (output) from a general logic character L1 to be loaded into the A register and B register respectively.

The decoder network 350 further includes a plurality of parallel NOR gates XOR, FRY, and CRY responsive to the machine controls sub-field bits for producing an EXCLUSIVE OR control command signal XOR, a forced carry command signal FRY and a conditional carry command signal CRY, respectively. These controls signals are used for generating command signals $\alpha\beta$ and $\gamma$ for controlling the operation of the arithmetic unit.

In addition, the decoder network 350 receives a modificed source local control signal MSL to produce control signals MSL and $\overline{MSL}$ which control the source of data as will be explained with reference to the bussing gate 318. Furthermore, the decoding network 350 receives the alternate A register destination signal ARD* and an ADDER source command signal ADS* from the second micro-instruction register character M2*. These alternate command signals ARD* and ADS* are fed directly through the decoder network 350 to the A register 310 and the bussing gate 318 respectively.

Decoding network 350 also contains logic for the generation of reset signals $\overline{RESET}_A$ and $\overline{RESET}_B$ for A register 310 and B register 312.

Signal $\overline{RESET}_A$ is generated by AND gates RA1 and RA2 and NOR gate RA3. Timing signal RESET I from micro-instruction register character M2 is input to gate RA2. Timing signal RESET II from a second micro-instruction register character M2 is input to gate RA1. A second input to gate RA2 receives A register destination command signal ARD. A second input to gate RA 1 receives signal A register destination command signal ARD*. The outputs of gates RA1 and RA2 are the inputs to NOR gate RA3, whose output is the desired signal $\overline{RESET}_A$. The signal $\overline{RESET}_A$ is thus formed in accordance with the equation $\overline{RESET}_A = \overline{(RESET\ I \cdot ARD) + (RESET\ II \cdot ARD^*)}$ RESET I signal also forms one input of NAND gate RB. The second input to NAND gate RB is B register destination command signal BRD. The output of NAND gate RB is the desired signal $\overline{RESET}_B$, thus formed in accordance with the equation $\overline{RESET}_B = \overline{(RESET\ I \cdot BRD)}$.

The reset scheme thus described is similar to the scheme previously discussed for micromemory register storage character G1.

Figure 39:
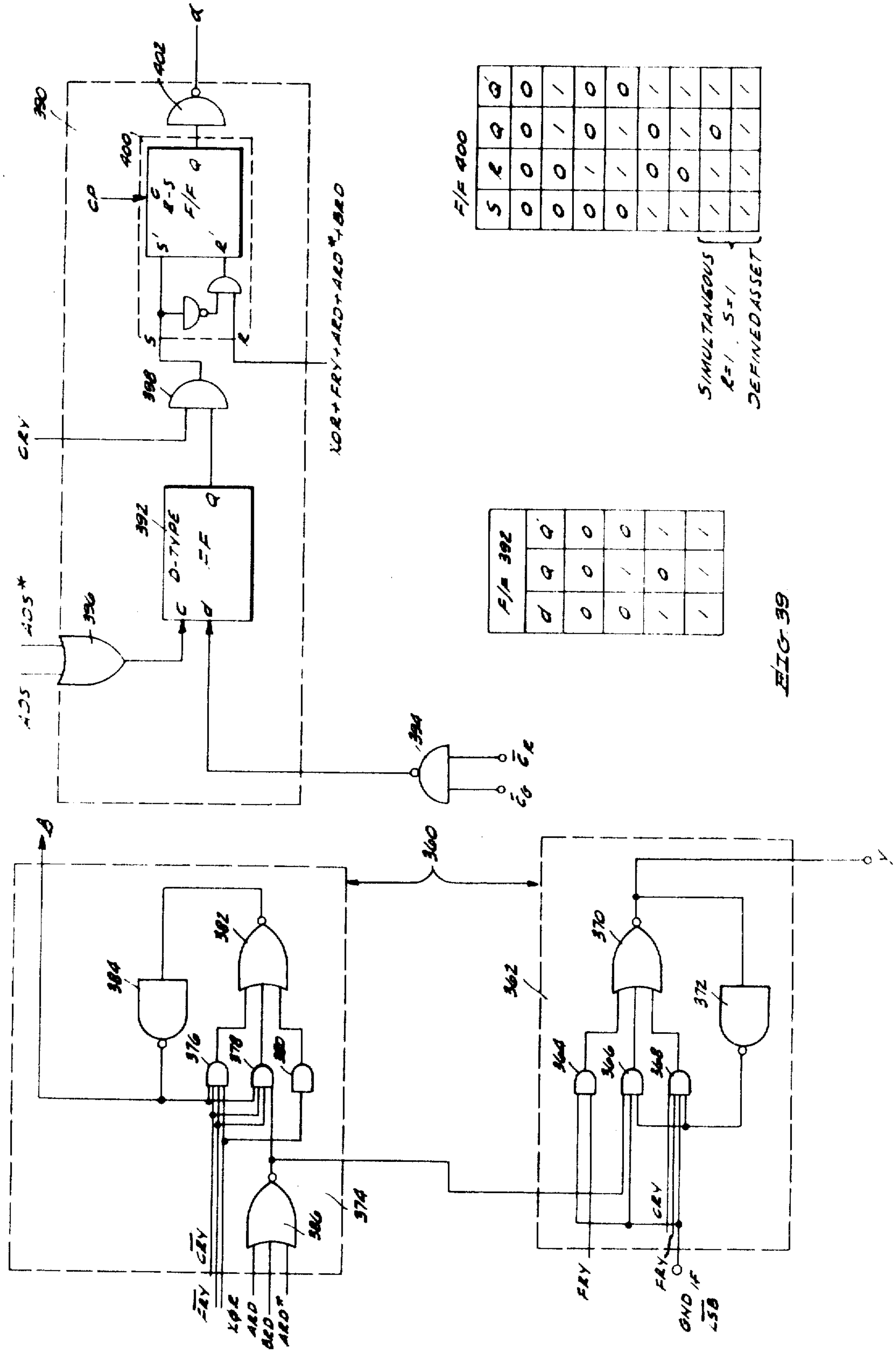
FIG. 39 is a logic diagram illustrating a portion of the decode and control circuit utilized in the arithmetic logic character of FIG. 36.

Decoder logic circuits 360 and 390 of FIG. 39 produce command signals $\alpha$, $\beta$ and $\gamma$ in response to the above referenced control signals. These command signals $\alpha$, $\beta$ and $\gamma$ are fed to command inputs of the arithmetic unit 314 for switching the arithmetic unit between its different modes of operation. More specifically, the command signals $\alpha$ and $\gamma$ are fed to carry inputs illustrated in the above referenced application memo of the Signetics Corporation while the other carry inputs are connected to a ONE on the least significant byte while the $\beta$ command signal is applied to a carry inhibit command input.

Referring now to the decoding logic circuit 360 in more detail, the command signal $\gamma$ is produced in response to the forced carry control signal FRY, the conditional carry control signal CRY, and the control signal $\overline{ARD} \cdot \overline{BRD} \cdot \overline{ARD^*}$ by a multiple input storage flip-flop 362. The storage flip-flop 362 includes three parallel AND gates 364, 366, and 368 which have their outputs connected to a common NOR gate 370. The output of NOR gate 370 goes high only when all of the inputs thereto are low to produce the command signal $\gamma$. The output $\gamma$ of NOR gate 370 is fed back to an input of NAND gate 372 whereat it is inverted and fed to one input of AND gates 366 and 368, respectively. The other inputs of AND gate 368 receive the conditional carry control signal CRY and the forced carry control signal FRY, and if the arithmetic logic character L2 is not associated with the least significant byte, a ground signal. The inputs of AND gate 366 also receive the ground signal GND, and the logic signal $\overline{ARD} \cdot \overline{BRD} \cdot \overline{ARD^*}$. The AND gate 364 receives the ground signal and the carry control signal FRY.

The command signal $\beta$ is produced by the logic storage circuit 374 in response to the decoded control signals ARD, BRD, ARD*, $\overline{FRY}$, $\overline{CRY}$ and an EXCLUSIVE OR control signal XOR from the machine-control sub-field. More specifically, the logic circuit 374 includes three parallel AND gates 376, 378, and 380 having their outputs coupled to a common NOR gate 382. The output $\bar{\beta}$ of NOR gate 382 is fed to a NAND gate 384 whereat it is inverted to produce the command signal $\beta$ on one branch and is fed back to one input of AND gate 376 and AND gate 378. The other inputs of AND gate 376 receive the conditional carry control signal $\overline{CRY}$, the forced carry control signal $\overline{FRY}$, and the EXCLUSIVE or control signal XOR. The inputs of AND gate 378 receive the carry control signals $\overline{CRY}$, $\overline{FRY}$ and a control signal $\overline{ARD} \cdot \overline{BRD} \cdot \overline{ARD^*}$ from the output terminal of a NOR gate 386. In operation, when any one or all of the inputs to NOR gate 382 are high, its output goes low and is fed to NAND gate 384. NAND gate 384 inverts this signal to produce the command signal $\beta$ that is high to command an EXCLUSIVE OR operation by the arithmetic unit 314.

The command signal $\alpha$ is produced by a logic circuit 390 in response to carry-outs from the above identified arithmetic unit 314 and the conditional carry control signal CRY. More specifically, the logic circuit 390 includes a first *d*-type flip-flop 392 having a set input terminal d coupled to receive the logic signal $[C_G + G_R]$ produced by a NAND gate 394 that is, in turn, coupled to receive the carry out signals $\bar{C}_G$ and $\bar{C}_R$ from the arithmetic unit 314 in the most significant byte position, which may not be on the same L2. The logic signal [ADS + ADS*] is produced by OR gate 396 in response to signals ADS and ADS* from decoder 316. The output of gate 396 is coupled to the "clock" input of flip-flop 392. When the leading edge of a 1 logic signal is received at the input terminal "clock" of the *d*-type flip-flop 392 its state becomes that of its *d* input.

The output of *d*-type flip-flop 392 is anded with the conditional carry control signal CRY at an AND gate 398 and is fed to the set input terminal S of a modified RS-type flip-flop 400. When the next leading edge of a clock pulse is received at the clock input terminal "CLOCK" of the modified RS-type flip-flop 400, its output changes as a function of its R and S inputs as defined by the table with FIG. 39. This output is fed to a NAND gate 402. The NAND gate 402 inverts the signal to produce a command signal $\alpha$ which goes low if, and only if, the carry control signal $\overline{CRY}$ is received and there is a carry out signal of $\bar{C}_G$ and $\bar{C}_R$ from the most significant bit of the last previous add operation.

The R− input to modified R-S flip-flop 400 is the logic signal (XOR + FRY + ARD + ARD* + BRD) which may be formed by applying each of those individual signals to a common OR gate.

The difference between flip-flop 400 and a regular R-S flip-flop is as follows. A regular R-S flip-flop responds in a random manner to the condition R = 1, S = 1, with clock present. Flip-flop 400 is "modified" in that its response to this special condition is specified in the transition table accompanying FIG. 39. Flip-flop 400 must respond to this special case always as a "set" or exactly as it responds to S = 1, R = 0, clock present.

A transition table is also included for *d*-type flip-flop 392.

The error logic 320 is an overflow detector of the types illustrated in FIG. 40*a* or 40*b*. For example, for the lower order bytes, the overflow detector of FIG. 40*a* is used. In essence, the outputs $\bar{\epsilon}_0$ through $\bar{\epsilon}_7$ from the arithmetic unit 314 are NANDed in expanded NAND gates 410 and 412 to produce an error signal output ZRO = 0 if all the input signals $\bar{\epsilon}_0$ through $\bar{\epsilon}_7$ are true.

For the most significant byte the overflow detector of FIG. 40*b* is used. The overflow detector includes five parallel AND gates 414, 416, 418, 420, and 422 having their outputs connected to a common NOR gate 424. One of the AND gates 414 receives the output signals $A_0$ and $B_0$ from the A register 310 and B register 312, respectively, and a carry into the sign bit CS from the arithmetic unit 314. A second AND gate 416 receives the complemented outputs $\bar{A}_0$ and $\bar{B}_0$ from the A register 310 and the B register 312, respectively, and receives and inverts the carry into the sign bit $\bar{C}_S$ at an inverting input terminal. The most significant sum bit $\bar{\epsilon}_0$ from the arithmetic unit 314 is fed to a NAND gate 426 whereat it is inverted and fed to one input of AND gate 418. The other input of AND gate 418 receives the next less significant bit $\bar{\epsilon}_1$ and the overflow output $Z_{RO}$ from the next lower-order byte at an inverting input. The next sum bit $\bar{\epsilon}_2$, $\bar{\epsilon}_3$, and $\bar{\epsilon}_4$ are received at three input terminals of AND gate 420 while the overflow output $Z_{RO}$ from the second next lower byte is received at an inverting input terminal. The remaining sum bits $\bar{\epsilon}_5$, $\bar{\epsilon}_6$, and $\bar{\epsilon}_7$ are received at three input terminals of AND gate 422 while the overflow output $Z_{RO}$ from the third next lower order byte is received at its inverting input terminal. AND gates 418, 420, and 422 are wired together to form a single AND function. Thus, any time that all of the inputs to NOR gate 424 from the AND gates 414, 416, and the 418, 420, and 422 combination are low, the output of NOR gate 424 is high to produce an error signal $\overline{O\text{-}FLOW}$ error condition that is fed to the output bussing gate 318.

Referring back to FIG. 37, the bussing gate 318 includes eight parallel stages of the type illustrated. The data output bus $B_{IO}$ to one of the two alternate general logic characters L1 is provided on the output terminal of a NOR gate 430. The inputs to NOR gate 430 include three parallel AND gates 432, 434, and 436. In essence, any time that the output signal of two of the AND gates, including AND gate 432, are held low in response to control signals, the input signal $\bar{A}_0$ from the A register or the input signal $\bar{\epsilon}_0$ from the arithmetic unit will control the output signal of NOR gate 430.

For example, if there are no error conditions and the A register source is to be accessed, the outputs of AND gates 432 and 436 will be held low in response to control signals while the output of AND gate 434 will switch between high and low in response to the data bit signal $\bar{A}_0$ received from the A register 310. More specifically, the AND gate 432 receives the error signal $\overline{O\text{-}FLOW}$ which is high if there is no error signal. The A register source access control signal ARS is also high but the modified source local control signal MSL is low whereupon the output signal of AND gate 432 is maintained low. The AND gate 436 receives the add source access control signal ADS which is low and the inverted modified source local control signal $\overline{MSL}$ which is high and the sum bit $\bar{\epsilon}_0$ whereupon the output of AND gate 436 is held low. The AND 434 receives the inverted modified source local signal $\overline{MSL}$, which is high, the A register source command signal ARS, which is high, and the data bit signal $\bar{A}_0$ from the A register. Since two of the inputs to AND gate 434 are high, the output of AND gate 434 will go high when the input signal $\bar{A}_0$ from the A register 310 goes high and will go low whenever the input $\bar{A}_0$ goes low. The NOR gate 430 is responsive to this input so that its output goes high whenever the $\bar{A}_0$ input is low and goes low whenever the $\bar{A}_0$ input goes high.

The arithmetic unit source 314 is accessed in response to the add source access control signal ADS. Specifically, the modified source local control signal MSL and signal ARS go low whereupon the output of AND gate 432 remains low. The A register source access control signal ARS to AND gate 434 is also low whereupon the output of AND gate 434 is held low. Since the input inverted modified source local control signal $\overline{MSL}$ is high and the add source access signal ADS is high, the output level of AND gate 436 is responsive to the two level sum bit $\epsilon_0$. As a result, whenever the sum bit $\epsilon_0$ is high the output of AND gate 436 is high, and whenever its level is low the output of AND gate 436 is low. Consequently, the level of the output signal of NOR gate 430 goes high whenever all of the inputs from the AND gates 432 through 436 are low and goes low when any one of the inputs is high.

When the alternate general logic character L1* is to receive data from the arithmetic logic character L2, the add source access control signal ADS* is received from the other micro-instruction register M2* by a NAND gate 440. The other input to NAND gate 440 receives the sum bit $\epsilon_0$ from arithmetic unit 314 whereupon its output signal is low only if both of the inputs are high and goes high if either one or both of the inputs are low.

To output error information, signals A register source command ARS and modified source local control signal MSL are high and signals add source access control signal ADS and signal $\overline{MSL}$ are low. Thus, gates 434 and 436 are held low and the output of gate 432 is controlled by $\overline{\text{O-FLOW}}$. Since gate 430 is thus controlled by gate 432, the complement of $\overline{\text{O-FLOW}}$ appears on output BIO, of gate 430.

EXPANSION OF ARITHMETIC LOGIC CHARACTER - L2

The arithmetic logic character L2 forms an optional feature of each logic unit for the purpose of providing addition and higher order logic. As such, the arithmetic logic character L2 is not a defining element of parallel or multi-computational expansion.

Figure 41:
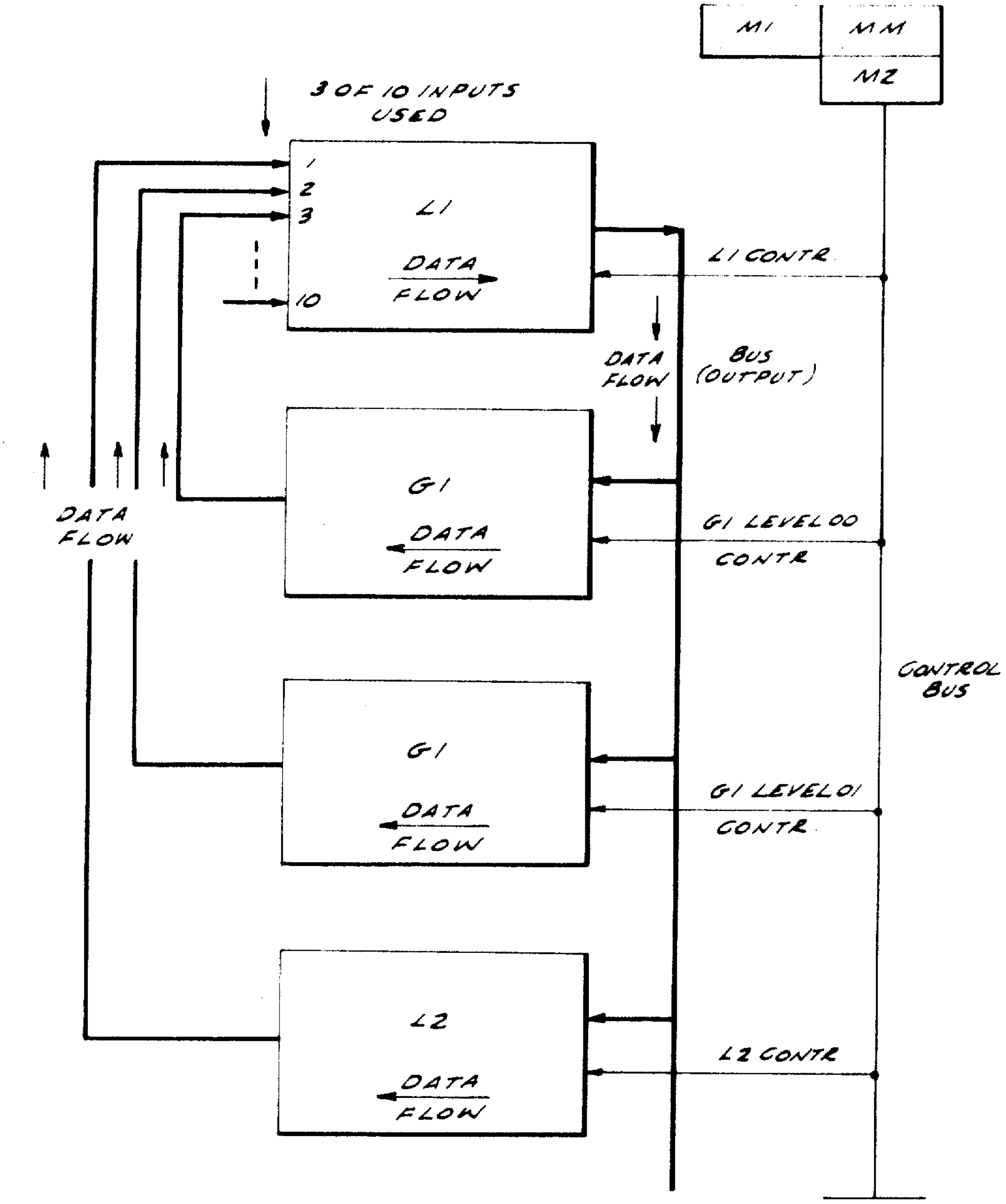
FIG. 41 is a functional block diagram illustrating the functional expansion relationship of the arithmetic logic character L2.

The arithmetic logic character L2 participates in functional expansion by providing the designer with an adder unit which he is free to include or not include in each logic unit of the machine. This optionality is provided by the relationship of the characters to the bussing structure of the invention and to the general logic character L1 as illustrated in FIG. 41. By redrawing the logic unit of the functionally expanded exmaple of the micromemory storage register character G1 section, it is illustrated that each character G1 added in the functional expansion mode fits between the BUS (output) and general logic character L1 inputs in a parallel manner. General logic character L1 also is a member of this parallel alignment but is the only member whose direction of data flow is left to right in FIG. 41. All added characters G1 are added in a parallel fashion and all have data flow from right to left in FIG. 41. Thus, the use of all micromemory storage register characters G1 is optional and independent of the presence of any other G1 character.

In a similar fashion, if it is decided to functionally expand the logic unit of FIG. 41 by the addition of an arithmetic logic character L2, the added arithmetic logic character L2 fits in parallel between the BUS (output) and the general logic character L1 as do added G1 characters. Its use is thus not dependent on the number of micromemory register storage characters G1, nor is the addition of G1 characters dependent on the presence or absence of the arithmetic logic character L2. Thus, use of the arithmetic logic character L2 is a choice independent of how many other characters G1 (or input/output characters L3) are present and the arithmetic logic character L2 thus adds or detracts from the processing power and logic complexity of the unit simply by its presence or absence.

Arithmetic logic character L2 is also capable of word length expansion similar to micromemory register storage character G1 and general logic character L1. Although the limit of arithmetic logic character L2 word length expansion is theoretically infinite, complexity of the arithmetic unit 314 is a problem when handling much over 64 bits as illustrated by the Signetics memo No. 85 referenced previously. Also, an adder larger in word length than its associated general logic character L1 is not of much use, so a limit of 32 bits is usually adhered to.

Thus, 8 bit arithmetic logic characters L2 can be used to make modularly expanded adder blocks of 8, 16, 24, and 32 bits.

Word length expansion of the A register 310, the B register 312, and the bussing gate 318, and the relationship of these blocks in the modularly expanded form to the associated general logic characters L1 and busses for the transfer of 8, 16, 24, and 32 bit data words proceeds in a manner identical to word length expansion of similar registers and bussing gates in micromemory register storage character G1 and general logic character L1. Since this has been discussed in detail in the discussion of expansion of the micromemory register storage character G1 it will not be taken up again.

Arithmetic unit 314 can expand in word length to provide adder units of 8, 16, 24, or 32 bits capacity as illustrated in the previously mentioned Signetics Corporation Memo No. 85 on pages 5, 6, and 7.

Source and destination code decoders in block 316 of FIG. 36 act as do equivalent decoders in character G1 for word length expansion. Reset logic is active on each added arithmetic logic character L2 as it would be if the character L2 were used as a single 8 bit adder.

Control signal logic block 374 (FIG. 39) of each added arithmetic logic character L2 operates as if the character L2 were standing alone; that is, word length expansion has no effect on the operation of this block.

Control logic block 362 (FIG. 39) has a pin which is hardwired to logical 1 for the arithmetic logic character L2 in the least significant byte position and hardwired to logical 0 for all more significant L2 characters. Thus, the previously described action of logic block 362 only occurs on the least significant byte. On all more significant bytes, signal $\gamma$ is thus permanently locked to logical 1, thus insuring that in case of a forced carry only the arithmetic logic character L2 carrying the least significant bit will have a carry forced to it.

Control signal $\alpha$ is selectively applied to logic block 314 as necessary in reference to the Signetics Memo referenced previously. The inputs $\overline{C_G}$ and $\overline{C_R}$ to blocks 390 on all characters L2 must be the $\overline{C_G}$ and $\overline{C_R}$ signals output from the logic block 314 of the most significant L2 only.

When more than one arithmetic logic character L2 is used as a word length expanded adder, overflow error logic 320 is used as follows. Only the logic including gate 424 (FIG. 40*b*) on the most significant arithmetic logic character L2 is used. On this most significant byte the expanded gates 410–412 are not used. On all less significant bytes only the gate 410–412 is used; no gates 424 on these less significant bytes are used. The output of expanded gate 410–412 from each less significant byte arithmetic logic character (L2) is input to gates 418, 420, or 422 on the most significant byte. The output of gate 424 on the most significant byte is the $\overline{\text{O-FLOW}}$ signal for the entire adder.

INPUT/OUTPUT CHARACTER — L3

Figure 42:
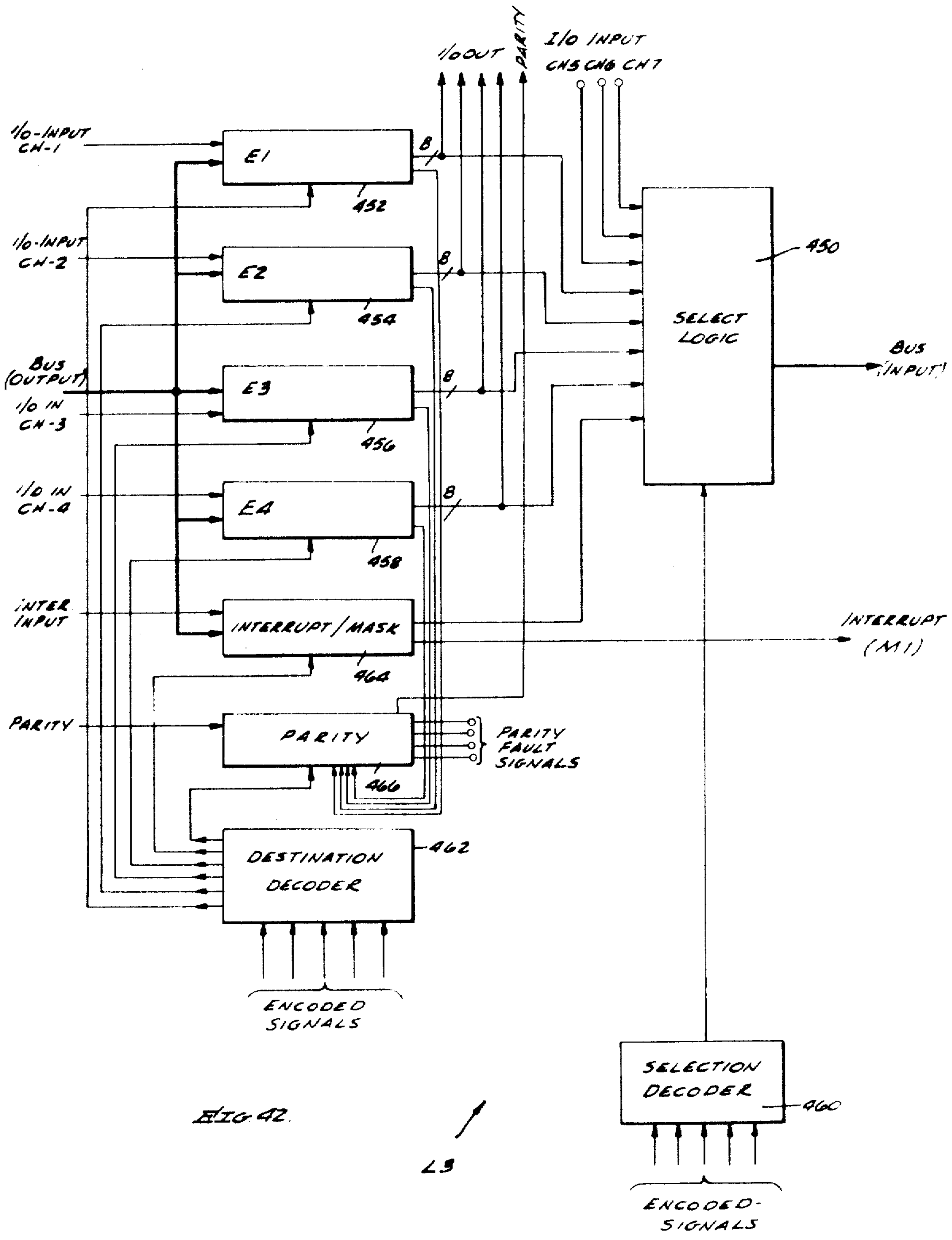
FIG. 42 is a block diagram illustrating an input/output character L3 of the type utilized in the logic unit of FIG. 1.

The input/output character L3 illustrated in FIG. 42 provides the input/output capability for the microprogram machine system. In essence, the input/output capabilities include not only the usual communication with peripheral equipment but also includes communications with a main memory, scratch pad memories, real-time clocks, and all other elements of the computer not directly controlled by micro-program.

More specifically, select logic 450 provides input gating for up to seven external devices to a BUS (input). In this particular embodiment three of the external device inputs to select logic 450 are received directly while four of the external device inputs are received from four parallel storage registers 452, 454, 456, and 458. The select logic 450 is responsive to select control signals produced by a selection decoder 460 in response to the source sub-field bits received from the micro-instruction character M2 for gating the selected byte wide input to the BUS (input). The storage registers 452 through 458 are responsive to destination control signals produced by a destination decoder 462 in response to the destination sub-field bits received from the micro-instructions register character M2 to apply the digital signals received from the BUS (output) by one of the registers to the select logic 450. The destination decoder 462 also produces interim control signals and parity check control signals in response to machine control field or destination sub-field signals that are fed to an interrupt/mask register 464 and to a parity check register 466.

Figure 43:
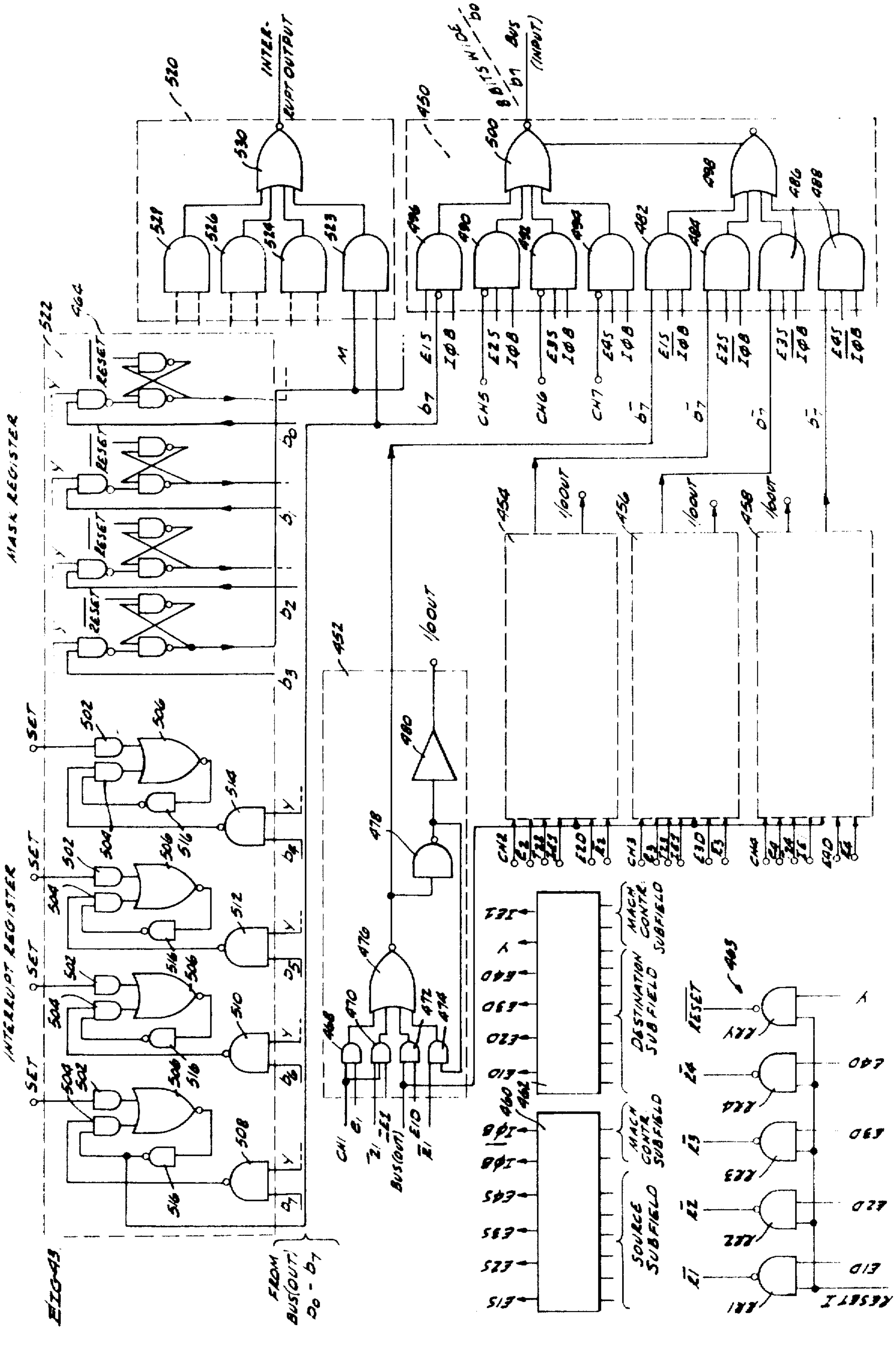
FIG. 43 is a logic diagram illustrating the details of the input/output character of FIG. 3 and includes one stage of a register destination and selection decoding logic, one stage of the select logic, and the interrupt/mask register.

Referring now to the input/output character L3 in more detail, FIG. 43 illustrates a portion of four of the I/O channels CH1, CH2, CH3, and CH4 which are fed to the four storage registers 452, 454, 456, and 458 respectively. It should be noted that only one of the significant bits and one of the eight parallel stages of each register is illustrated for each storage register such as 452. For purposes of description, this significant bit is assumed to be the least significant bit. In addition, the four storage registers 452 through 458 all receive the eight bit byte of data on the BUS (output) from the general logic character L1 by means of control signals decoded from the destination sub-field of M2.

In operation, input data from CH1, CH2, CH3, or CH4 can be loaded into the storage registers in response to two control signals. For example, the storage registers can be made responsive to the transfer bits $b_{37}$ through $b_{48}$ (FIG. 2*c*) and especially the $T_1$ sub-field bits $b_{41}$ through $b_{44}$ or the $T_2$ sub-field bits $b_{45}$ through $b_{48}$. The second manner of loading data into the storage registers is by an externally applied signal $e_1$ through $e_4$ which can be received from a peripheral unit itself or from some other selected source.

The previously referenced destination decoder 462 is generally the same as the destination decoder utilized in the micromemory register storage character G1 in that it includes a plurality of parallel NOR gates which are selectively responsive to the destination sub-field bits to produce one of four destination control signals E1D, E2D, E3D, or E4D to enable one of the four storage registers 452 through 458, respectively, to store the input data received on BUS (output). In addition, the destination decoder produces a control signal IE1 and a control signal Y in response to the destination sub-field bits and machine control field bits. The IE1 control signal is fed to all four storage registers enabling one of the bits $b_{37}$ through $b_{48}$ to set the register according to data presented through a set of input pins. Each register has an independent set of input pins.

Control signal "Y" is the set signal which enables the interrupt mask register to be controlled according to data presented to input/output character L3 on the BUS (output). Also illustrated in FIG. 43 is reset signal generator 463. Signals $\overline{R}1$, $\overline{R}2$, $\overline{R}3$, $\overline{R}4$, and $\overline{\text{RESET}}$ are generated for the purpose of resetting registers 452, 454, 456, 458, and 464, respectively.

The signal RESET I from micro-instruction register character M2 forms an input to each one of the parallel NAND gates RR1, RR2, RR3, RR4, and RRY. All five of these NAND gates are two-input NAND gates whose second input is as follows:

| Gate | RR1 | RR2 | RR3 | RR4 | RRY |
|---|---|---|---|---|---|
| 2nd input | E1D | E2D | E3D | E4D | Y |

Thus, the five necessary reset signals are formed according to the equations:

$\overline{R1} = \overline{(\text{RESET I} \cdot \text{E1D})}$ $\overline{R2} = \overline{(\text{RESET I} \cdot \text{E2D})}$ $\overline{R3} = \overline{(\text{RESET I} \cdot \text{E3D})}$ $\overline{R4} = \overline{(\text{RESET I} \cdot \text{E4D})}$ $\overline{\text{RESET}} = (\text{RESET I} \cdot \text{Y})$ The usage of these reset signals with the appropriate registers is substantially the same as previously described for micromemory register storage character G1.

Structurally, each stage in the storage register includes four parallel AND gates 468, 470, 472, and 474 having their outputs connected to a common NOR gate 476. The output signal of NOR gate 476 goes high only when all of the inputs thereto are low and goes low when any one or all of the inputs are high. Thus, the data on I/O channel CH1 can be loaded into the storage register 452 when input signals $T_{21}$ or IE1 fed to AND gate 470 are low, destination command signal $\overline{\text{E1D}}$ fed to AND gate 472 is low, reset signal $\overline{R}_1$ received from the reset signal generator 463 is high, and the external control input $e_1$ fed to AND gate 468 is high when the input/output character L3 is controlled by external signals from the peripheral unit associated with channel CH1. Alternatively, the information on channel CH1 can be loaded into the storage register 452 in response to the $T_{21}$ bit from the T2 field which goes high with the $e_1$ input low.

Alternatively, the data on the BUS (output) from the general logic character L1 is fed to all four storage registers 452 through 458 and is selectively loaded into one of these storage registers in response to the destination control signal E1D through E4D produced by the destination decoder 462. As illustrated for the least significant bit $b_7$, the digital signal on the BUS (output) is applied to one input of AND gate 472 while the other input receives the destination decode control signal E1D which is high. Since the outputs of the other AND gates 468, 470, and 474 are low in the reset condition, the output of AND gate 472 controls the level of the output signal of NOR gate 476.

In general, the output from NOR gate 476 is inverted at a NAND gate 478 and fed back to an input of the AND gate 474 causing the output of AND gate 474 to go high if the output of NOR gate 476 is low. If the output of NOR gate 476 is high, the inverted input signal to AND gate 474 is low whereupon the output of AND gate 474 goes low. As a result, the state of the stage is stored therein. The output signal from NAND gate 478 is fed through an amplifier 480 to an output terminal associated with that particular bit forming an output channel to external devices. In addition, the output from NOR gate 476 is fed on one channel to select logic 450. The other eight parallel stages of the storage register 452 are substantially identical to the logic circuit illustrated and are thus not described in detail.

The storage registers 454 through 458 are substantially identical to the above described storage register and differ only in that the input signals $e_2$, $e_3$, and $e_4$ are substituted for the input signal $e_1$. The input signals $T_{22}$, $T_{23}$, and $T_{24}$ from the $T_2$ field are substituted for the signal $T_{21}$ and the destination control signals E2D, E3D, and E4D are substituted for the destination control signal E1D, respectively. Reset signals $\bar{R}2$, $\bar{R}3$, and $\bar{R}4$ are substituted for reset signal $\bar{R}1$, respectively.

The select logic 450 selectively gates one of the four outputs from the storage registers 452 through 458 or the three unbuffered input channels CH5, CH6, or CH7 in response to the selection control signals E1S, E2S, E3S, E4S, IφB, and $\overline{I\phi B}$ received from the selection decoder 460. The select logic 450 as illustrated in FIG. 43 only shows the least significant bit stage of each of the eight bit wide select logic gates for each of the seven I/O channels plus an interrupt logic gate. For example, the parallel AND gates 482, 484, 486, and 488 each have one input terminal coupled to receive the inverted least significant bit output signal from a separate one of the four parallel storage registers 452 through 458, respectively. Another input of these AND gates is coupled to receive the selection control signal E1S, E2S, E3S, and E4S, respectively, and a third input terminal of these AND gates is coupled to receive the selection control signal $\overline{I\phi B}$. It should of course be noted that each of these AND gates can be considered to be the least significant bit stage of eight separate eight bit wide gates.

The least significant bit $b_7$ of the unbuffered I/O channels CH5, CH6, and CH7 are applied to an inverting input terminal of AND gates 490, 492, and 494, respectively. Another input terminal of each of these AND gates receives the selection control signal E2S, E3S, and E4S, respectively, from the selection decoder 460. A third input terminal of these AND gates receives the selection control signal IφB produced by the selection decoder circuit 460.

As will be explained in more detail subsequently, an interrupt gate including a first stage AND gate 496 has an inverting input coupled to receive an INTERRUPT control signal from the interrupt/mask register 464.

The outputs of AND gate 482 through 496 are connected in parallel to a common expanded NOR gate 498 and 500. In operation, the outputs of all the AND gates are held low by the select control signals except for that AND gate associated with the selected I/O channel. For example, if the output from storage register 452 is to be gated to the BUS (input) then the select control signals E1S and $\overline{I\phi B}$ applied to AND gate 482 are high whereupon the level of the inverted bit signal $\bar{b}_7$ received by AND gate 482 determines the level of the output of the AND gate. Thus, any time that the output signal level of selected AND gate 482 is high, the level of the output of NOR gate 498 is low. Conversely, when the output level of AND gate 482 is low, the output level of NOR gate 498 is high. AND gate 482 is coupled to receive the false side of register 452 in anticipation of this logical inversion, thus enabling the data to appear on the input bus in true form.

The interrupt/mask register 464 is an eight stage wide parallel input register having one input coupled to receive a byte of digital signals from the general logic character L1 on the BUS (output) at one input of each stage. Those four stages associated with the interrupt register portion of interrupt/mask register 464 are each responsive to externally applied signals associated with an interrupt condition from four external sources. Structurally, the four interrupt stages each include a flip-flop having two parallel AND gates 502 and 504 with outputs connected to a common NOR gate 506. Initially, the flip-flops are reset when a control signal Y, produced by the destination decoder 462, is applied to one input of each NAND gate 508, 510, 512, and 514 in coincidence with bits $b_7$, $b_6$, $b_5$, and $b_4$, respectively, received at the other input terminal. With both inputs high, the output of NAND gate 508, for example, goes low and it is fed to one input of AND gate 504. If no interrupt signal is received by AND gate 502, the output of NOR gate 506 goes high. When, however, an interrupt signal (set "1") is received by AND gate 502 its output goes high and is supplied to NOR gate 506. As a result, the output of NOR gate 506 goes low. This signal is fed to a NAND gate 516, inverted, and fed back to a second input of AND gate 504 to set the flip-flop in its state. The output of NAND gate 516 is also fed to an interrupt gate 523. The other three stages of an interrupt register operate in substantially the same manner except that they are responsive to other externally applied interrupt signals and the next least significant bit $b_6$, $b_5$, and $b_4$, respectively.

The micro-program can override the interrupt by means of the four stage mask register portion of interrupt/mask register 464. Each stage of the mask register is responsive to the control signal Y from the destination decoder 462 and the next most significant bits $b_3$, $b_2$, $b_1$, and $b_0$, respectively. In general, the mask register 522 is responsive to the micro-program whereupon four output signals are fed to a mask register 522 to selectively honor or ignore certain interrupts. For example, if any stage in the mask register 522 is set, the interrupt register stage associated with that mask register stage will be honored. If, however, any mask register stage 522 is reset, the interrupt condition of the interrupt register stage associated therewith is ignored and overridden.

The reset signal for the mask stages is formed by a NAND gate in circuit 463 whose inputs are $y$ and RESET I (from micromemory counter character M1). Thus, $\overline{RESET} = \overline{RESET\ I} \cdot y$. Set for the mask stages is accomplished by the coincidence of signal $y$ and bits $b_0$ through $b_3$, depending on the stage.

For the interrupt stages, set is accomplished by externally applied signals. Reset is provided by NAND gates 508, 510, 512, and 514 as explained.

In essence, the bits $b_3$ through $b_0$ set the stages of the mask register while the reset signal $\overline{RESET}$ resets each stage of the mask register.

Interrupt gate 520 is responsive to the outputs from the interrupt register and the mask register and produces a normally high output if there is no interrupt condition and a low output if an interrupt condition occurs. More specifically, the interrupt gate 520 includes four parallel AND gates 523 through 528 that have their outputs coupled to a common NOR gate 530. A first AND gate 523 has one input terminal coupled to the stage of the interrupt register associated with the least significant bit $b_7$ of the first four bits of the byte and a second input coupled to receive the output M from the mask register stage associated with the least significant bit $b_3$ of the other four bits. The interrupt condition outputs of the other three stages of the interrupt register are applied to one input of each of other AND gates 524 through 528 while the mask bit outputs M from the other three stages of the mask register 522 are applied to the second input of the AND gates 524 through 528, respectively. In operation, any time that the interrupt condition output from interrupt register and the mask bit output M from the mask register 522 applied to the same AND gate, such as AND gate 523, are both high the output of the AND gate goes high whereupon the output of NOR gate 530 goes low. When the output of NOR gate 530 goes low it indicates an interrupt condition and is fed to the micromemory counter character M1 to interrupt the program. As previously stated, if an interrupt condition occurs and the associated stage of the mask register is reset then only one of the inputs to AND gate 523 is high and its output remains low. As a result, the output of NOR gate 530 remains high. Thus, the interrupt condition is overridden.

The outputs from the interrupt register stages and the mask register stages are also applied to inverting inputs of eight stages of AND gates including the AND gate 496 associated with the least significant bit. In addition, the other two input terminals of AND gates 496 receive the source control signals E1S and IφB from the selection decoder 460. This allows the information on the interrupt/mask register to be placed on the BUS (input) to the general logic character L1 where it may be operated upon and/or routed to other locations in the machine. The principle reason for this is to test the interrupt bits individually to determine which one or ones caused the interrupt, as gate 520 does not discern which one(s) of the interrupt bit(s) is/are active.

Figure 44:
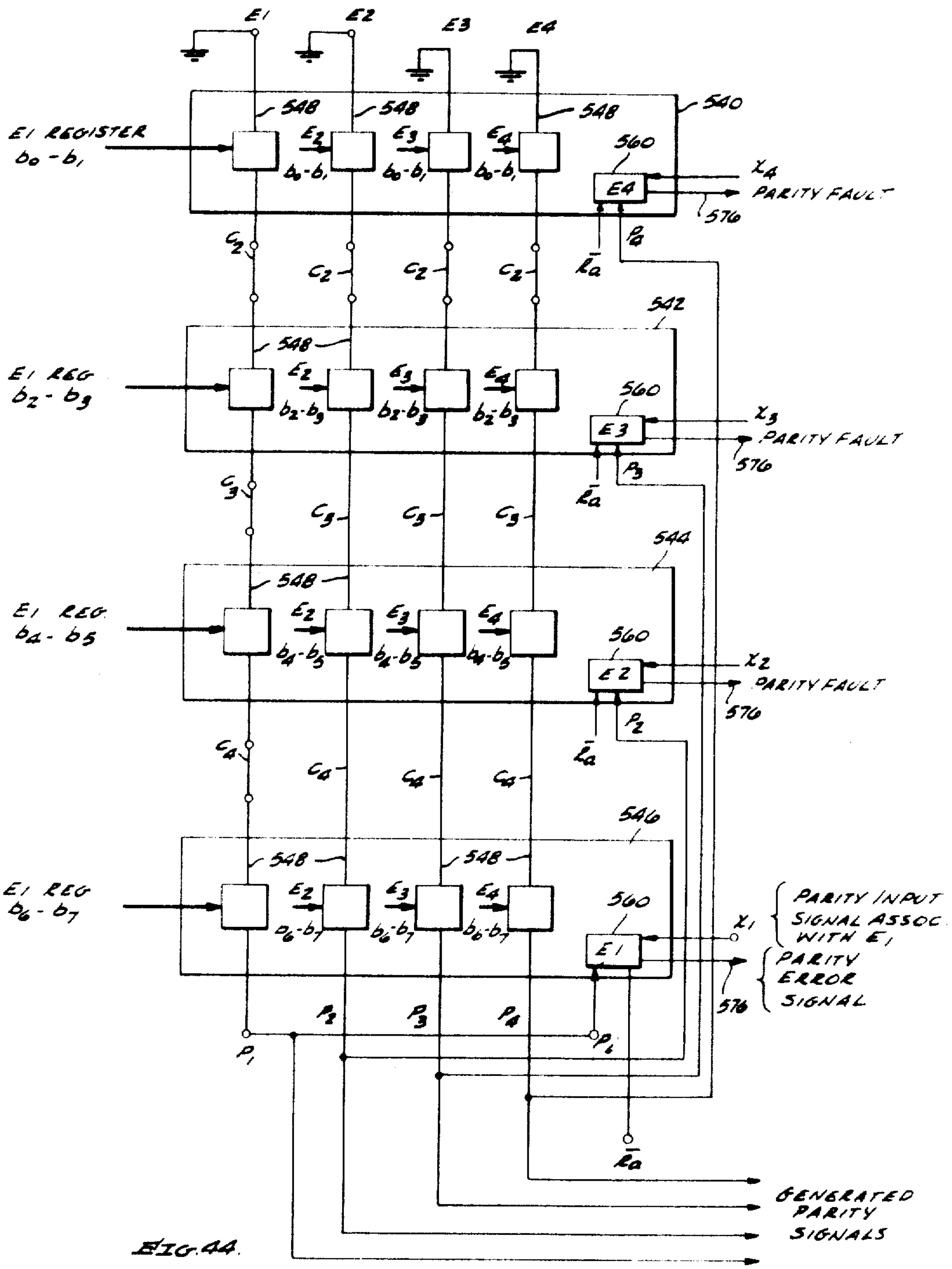
FIG. 44 is a logic diagram illustrating the parity checking circuit utilized in the input/output character of FIG. 42.

The parity check circuit 466 includes 16 identical circuits of the type illustrated in FIG. 45 wherein four of these circuits are associated with each separate one of the storage registers 452 through 458, respectively, as illustrated in FIG. 44. In essence, the total parity check circuit might include four logic stages 540, 542, 544, and 546 connected in series circuit relationship so that the input of each subsequent stage connected to receive the outputs from any preceding stage. In addition, each of the logic stages 540 through 546 receives a unique two of the eight bits of all four storage register. For example:

the first logic circuit 540 might receive the bits $b_0$ and $b_1$; the second logic circuit 542 might receive the bits $b_2$ and $b_3$; the third logic stage 544 might receive the bits $b_4$ and $b_5$; and the fourth logic stage 546 might receive the bits $b_6$ and $b_7$. In operation, when there is odd parity, defined as one or three bits true of the two data bits received by a logic circuit and a carry bit from the preceding stage a carry output signal is produced by that stage and is fed to the subsequent stage.

Assuming then that the bits $b_0$ and $b_1$ are received by the first logic stage 540 and since there is no preceding stage the first carry input terminal 548 illustrated in FIG. 44 is connected to ground. Referring now to FIG. 45, realize that there are four such circuits illustrated in FIG. 45 within circuit 540. Each such circuit of FIG. 45 receives bits $b_0$ and $b_1$ of a separate one of the four storage registers, plus its own unique carry bit C1. As a result of the grounding of terminal 548, the carry signal $c_1$ of any typical one of the four circuits is low and its complement $\overline{c_1}$ produced by NAND gate 549 is high. The true and false carry signal $c_1$, $\overline{c_1}$ and the true and false bit signals $b_0$, $\overline{b_0}$, $b_1$ and $\overline{b_1}$ are selectively applied to the input terminals of four parallel AND gates 550, 552, 554, and 556. The outputs of these four AND gates are connected in parallel to a common NOR gate 558 which generates a carry signal $C_2$ for the following conditions:

$$C_2 = b_0 \cdot \overline{b_1} \cdot \overline{c_1} + \overline{b_0} \cdot b_1 \cdot \overline{c_1} + \overline{b_0} \cdot \overline{b_1} \cdot c_1 + b_0 \cdot b_1 \cdot c_1$$

This carry signal $C_2$ is fed to the carry input terminal 548 of the second logic stage 542 (FIG. 44).

The second logic stage 542 is structurally identical to the first logic stage and differs only in that the inputs thereto are different. For example, the bits $b_2$ and $b_3$ from the storage register 452 can be substituted for the bit inputs $b_0$ and $b_1$ and the carry input terminal 548 receives a carry output $C_2$ from the preceding stage to generate the carry signal $c_2$ and $\overline{c_2}$ thus substituting the true and false signals for $b_0$, $b_1$, and $c_1$ in the above equation with the true and false signals for $b_2$, $b_3$, and $c_2$, respectively. A carry output signal $c_3$ will be generated by the second logic stage 542. Similarly, the third and fourth logic stages 544 and 546 are coupled to receive the carry signal $c_3$ and $c_4$ from the stage that precedes them at their carry input terminals 548 and produce carry output signals $c_4$ and $P_1$, respectively. In essence, the carry signal $c_4$ will be the same as the carry signal $c_2$ indicated above with the exception that the true and false signals for $b_4$, $b_5$, and $c_3$ are substituted for the true and false signals $b_0$, $b_1$, and $c_1$ respectively. In addition, the carry signal P1 from the last stage is defined by the above equation where the true and false bits for the signals $b_6$, $b_7$, and $c_4$ are substituted in the equation for the carry signal $c_2$. This carry signal P1 is fed to a parity check comparison circuit 560.

The parity check comparison circuit 560 includes four circuits of the type illustrated in FIG. 44 wherein each is coupled to receive the carry bit P$i$ and to receive and store an externally applied parity input signal (X$i$) associated with an individual storage register 452

– 458 for comparing the two input signals in response to a check enable signal {EiS · $\overline{IOB}$}, of the type received by the storage register 452, for producing a parity error signal if there is no coincidence between the carry signal P*i* and the externally applied parity input signal X*i*. *i* is an indicator, being 1 for register 452; 2 for register 454; 3 for register 456; 4 for register 458.

More specifically, the parity check comparison circuit 560 includes a storage bit (P.B.) for the incoming parity signal X*i*. FIG. 45.1 illustrates the detail of one such circuit 560 which is associated with register 452 and has indicator $i = 1$. Storage bit P.B. includes three parallel AND gates 561, 562, and 563 having their outputs connected to the inputs of a common NOR gate 564. The output of NOR gate 564 which is high only when all of the inputs thereto are low is fed to a NAND gate 566 which operates as an inverter. The inverted signal is fed back to one input of AND gate 563 to latch the state of NOR gate 564.

The bit P.B. may be operationally considered as an extension of register 452 which holds an incoming parity signal. AND gates 561 and 562 are similar in purpose to gates 468 and 470 of FIG. 43 in that they are used to store an incoming signal in a bit. Like gate 468, gate 561 has one input coupled to receive externally applied enable signal el and the other input to receive parity signal $X_1$, which is the parity bit associated with the 8 bits of CH1. AND gate 562 has one input coupled to receive parity signal $X_1$ and, like gate 470, two inputs coupled to receive sub-field bit T21 and IE1 control signals. Thus, if external enable signal $e_1 = 1$, or alternately T21 · IE1 = 1, or both, the parity signal $X_1$ controls the state of AND gate 561 and/or AND gate 562. If parity signal $X_1 = 0$, the outputs of both gates 561 and 562 are low. Since a preclear maintains AND gate 563 low, all inputs to NOR gate 564 are low and its output is high. This causes the output of NAND gate 566 to go low, latching the bit. If, however, parity signal $X_1 = 1$, the output of either or both AND gates 561 and 562 goes high. The output of NOR gate 564 is forced low, and the output of NAND gate 566 goes high, latching the bit.

In essence, then, the bit P.B. stores the state of $X_1$ in response to the enable equation ($e_1$ + [T21 · IE1]), which is the same equation which sets the data of CH1 into register 452. The output of NOR gate 564 is the false or $\overline{X}_1$ side of the bit and the output of NAND gate 566 the true or $X_1$ side of the bit.

The second input to AND gate 563 is signal $\overline{R}_1$. This signal resets or "preclears" bit P.B. and is the same signal which resets register 452.

The second part of circuit 560 is a parity check bit P.C., very similar in construction and operation to bit P.B. Parallel AND gates 567, 568, and 569 provide inputs to common NOR gate 572. The output of NOR gate 572 is inverted by NAND gate 574 and returned to one input of AND gate 569.

Control signals E1S and $\overline{IOB}$ are both input to AND gates 567 and 568. Signal P1 is inverted in gate 578 such that parity bit $\overline{P1}$ is also available. The other two inputs of AND gate 567 are connected to receive parity bit P1 and the output $\overline{X1}$ from NOR gate 564. The other two inputs of AND gate 568 are connected to receive signal $\overline{P}_1$ from NAND gate 578 and signal $X_1$ from NAND gate 566.

Suppose control signals E1S and $\overline{IOB}$ are both high. A parity check is thus enabled. Signals P1 and $X_1$ can have four possible relationships.

| | $X_1$ | $P_1$ |
|---|---|---|
| 1 | 0 | 0 |
| 2 | 0 | 1 |
| 3 | 1 | 0 |
| 4 | 1 | 1 |

Under condition 1, AND gate 568 has a zero input ($X_1$) and AND gate 567 has a zero input ($P_1$). Since reset signal $\overline{R}_a$ maintains AND gate 569 low, all inputs to NOR gate 572 are low. Thus, the output of NOR gate 572 is high and the output of NAND gate 574 low, latching the bit in this state.

The same result occurs under condition 4, since again AND gate 568 has a zero input ($\overline{P1}$) and AND gate 567 has a zero input ($\overline{X}_1$).

Under condition 2, AND gate 567 goes high since all inputs thereto, $P_1$, $\overline{X}_1$, $\overline{IOB}$, and E1S, are high. Under condition 3, AND gate 568 goes high since all inputs thereto, $\overline{P}_1$, $X_1$, $\overline{IOB}$, and E1S, are high.

Thus, under condition 2 or 3, one input to NOR gate 572 is high, forcing its output low. The output of NAND gate 574 is forced high, and the bit is latched in this state.

The output of NAND gate 574 is connected to an output terminal 576 used as a parity fault signal (usage thereof is optional). A "0" on output terminal 576 indicates no fault; and a "1" indicates a fault. As the above shows, the "1" condition occurs only when both of the following occur.

a. A check is initiated by signals E1S and $\overline{IOB}$ both = 1 b. Bits P1 (parity of data from CH1 stored on register 452) and X1 (incoming parity bit associated with CH1) disagree. Bit P.C. is reset by externally applied signal $\overline{R}a$ whose origin is to be determined by the user. Signal terminal 576 is also used as the user sees fit.

In essence, the parity error signal on output terminal 576 is defined by the equation:

parity error = (E1S · $\overline{IOB}$) (P1 · $\overline{X1}$ + $\overline{P1}$ · X1) This parity error signal is fed off of the input/output character L3. From this it can be seen that any time there is coincidence between the carry bit P1 and the externally applied parity signal X1 for a selected storage register responsive to the check enable signal (E1S · $\overline{IOB}$) the signal on output terminal 576 will be low. If, however, there is no coincidence between the carry signal P1 and the externally applied parity bit $X_1$ then the level of the parity error signal on output terminal 576 will be high to indicate a parity error.

It should be noted that there is one circuit of the type illustrated in FIG. 45.1 for each of the four storage registers. Furthermore, data could be transferred between two input/output characters L3 with the carry P1 of one input/output character being connected to the externally applied parity bit input terminal $X_1$ of the other input/output character. It should be noted that the other three circuits 560 associated with registers 454, 456, and 458 require the following substitutions of signals in FIG. 45.1 and related text.

| | Register 452 | | Registers 454 | 456 | 458 |
|---|---|---|---|---|---|
| For.... | P1 | Substitute.... | P2 | P3 | P4 |
| | X1 | | X2 | X3 | X4 |
| | e1 | | e2 | e3 | e4 |
| | T21 | | T22 | T23 | T24 |
| | $\overline{R1}$ | | $\overline{R2}$ | $\overline{R3}$ | $\overline{R4}$ |
| | E1S | | E2S | E3S | E4S |
| | $\overline{Ra}$ | | $\overline{Rb}$ | $\overline{Rc}$ | $\overline{Rd}$ |

It should also be noted that the function of parity generation is a subset of the functions of parity checking. In essence, P1 is the parity of the data on register 452. Therefore, when register 452 is used as an output channel by use of the eight terminals and amplifiers illustrated by amplifier 480 of FIG. 43, parity signal P1 can be used as its output parity bit. Likewise, parity signals P2, P3, and P4 perform the same function for registers 454, 456, and 458, respectively.

If data is wider than 8 bits, say 16 bits, and two input/output characters L3 are used to make 16 bit registers and it is desired to generate and check parity over all 16 bits, the following scheme may be used:

Upper-order input/output character L3: connect circuit 540 as shown in FIG. 44. Do not use parity check comparison circuit 560.

Lower-order input/output character L3: connect parity signals P1 of upper-order input/output character L3 to input terminals 548 of circuit 540 (the terminals are shown grounded in FIG. 44). Connect circuits 560 as shown in FIG. 45.

This scheme may be extended to check parity of 24 and 32 bit words by connecting parity bits P1 of one byte to the uppermost input terminals 548 of the following byte using the 560 of only the last byte.

EXPANSION OF INPUT/OUTPUT CHARACTER — L3

Input/output character L3 is like arithmetic logic character L2 in that it is an optional addition to each logic unit and thus is not a defining element of parallel or multicomputational expansion.

Input/output character L3 provides four 8 bit output channels by use of four 8 bit registers, four 8 bit buffered input channels by use of the same four 8 bit registers, and three unbuffered 8 bit input channels by use of three additional inputs per bit to select logic 450 (FIG. 42).

If I/O channels of longer bit length are desired, several input/output characters L3 may be used together to form I/O channels of the desired width (in 8 bit increments) by means of word length expansion.

If more I/O channels than can be provided by one word expanded level of input/output characters L3 are desired, L3 characters can be added by functional expansion means to provide new I/O channels.

The number and bit length of the registers in one or more input/output characters L3 directly determines the number and bit length of I/O channels of the logic unit. Functionally expanded input/output character L3 provide more unique registers, thus more I/O channels. Word length expanded input/output characters L3 provide registers and thus I/O channels of longer bit lengths.

Registers 452, 454, 456, 458, select logic 450, selection decode 460, and destination decode 462 and reset logic 463 are very similar to the equivalent logic of the the micromemory register storage character G1. The functional and word length expansion of the input/output character L3 with respect to this logic is identical to the functional and word length expansion of micromemory register storage character G1. The entire discussion of word length, functional, and combined word length and functional expansion of micromemory register storage character G1 is also applicable to input/output character L3.

The difference is that input/output character L3 responds to source codes $b_0\ b_1\ b_2\ b_3\ b_4 = 1\ b_1^*\ b_2^*\ 00$, $1\ b_1^*\ b_2^*\ 01$, $1\ b_1^*\ b_2^*\ 10$, $1\ b_1^*\ b_2^*\ 11$. That is, bit $b_0$ must be 1 for any input/output character L3 to respond. The various combinations of bits $b_1$ and $b_2$ again select the input/output character L3 desired to respond when the characters L3 are functionally expanded, and the bits $b_3\ b_4$ code selects the specific one of the four registers on the character L3 which $b_1\ b_2$ specifies. Likewise, destination codes are responsive to bits $b_{11}\ b_{12}\ b_{13}\ b_{14}\ b_{15} = 1\ b_{12}^*\ b_{13}^*\ b_{14}\ b_{15}$; $b_0 = 1$ for character L3 response with bits $b_{12}\ b_{13}$ specifying the character L3 and bits $b_{14}\ b_{15}$ specifying the register (452 – 458) on the character L3 selected by $b_{12}\ b_{13}$.

Another difference is that the arbitrary limit of functional expansion of the input/output character L3 is set at three L3 characters or 12 registers rather than at four characters and 16 registers as is the case for micromemory register storage character G1. Thus, only codes 100XX, 101XX, and 110XX are needed for input/output character L3 source and destination coding. This is done since character G1 codes occupy all 0XXXX codes, and it is necessary to reserve some codes for source and destination coding for general logic characters L1 and arithmetic logic characters L2. The 111XX codes are thus reserved for this purpose.

Figure 46:
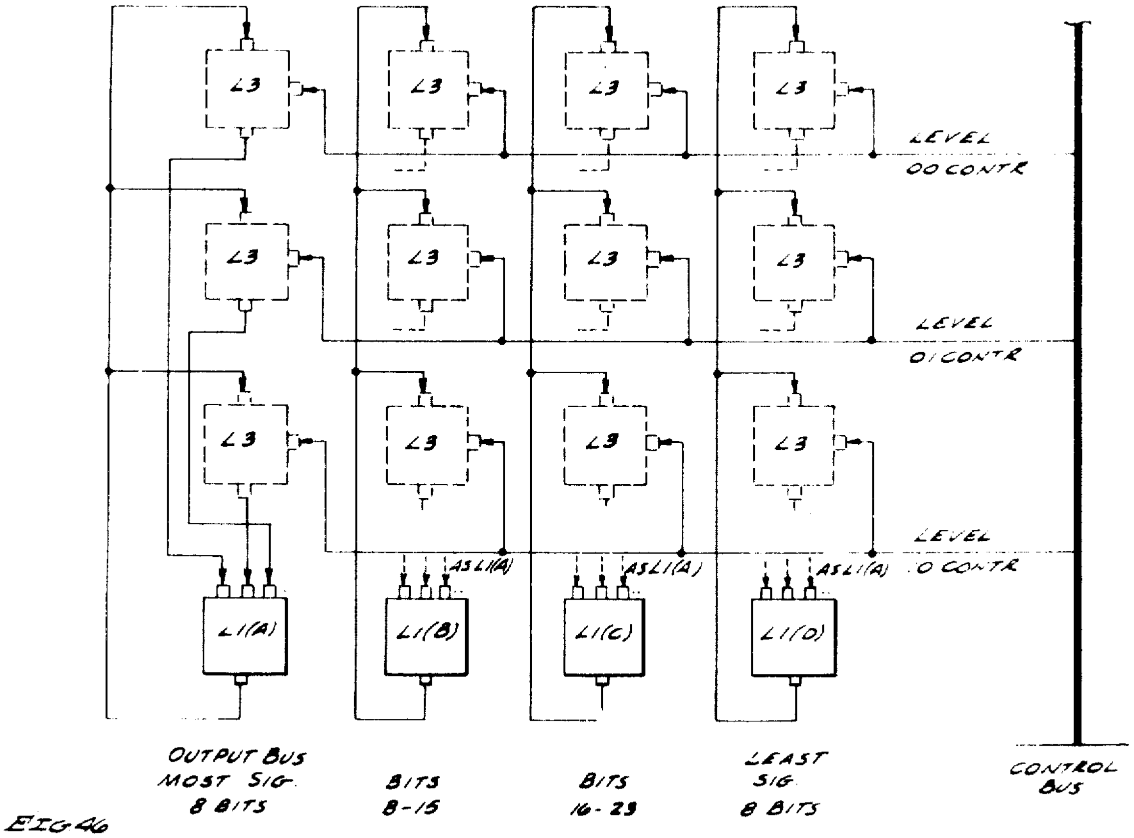
FIG. 46 is a functional block diagram illustrating an expanded bank of input/output characters L3.

By an analysis similar to that which led up to FIG. 14 for micromemory register storage character G1, it is possible to arrive at an equivalent circuit illustrated in FIG. 46 for input/output character L3. Notice of course that input/output character L3 has only one BUS (input), one BUS (output) and one control input compared to the two of each that character G1 has. This is done since input/output character L3 "banks" such as FIG. 46 are only under control of one logic unit. Inclusion of any one of the 12 input/output characters L3 in the final L3 character bank is again a decision which may be made independently of the presence or absence of any other L3 character or any arithmetic logic character L2 or micromemory register storage character G1. Of course, micro-array character MM, micromemory counter character M1, and microinstruction register character M2 are necessary to establish the control bus. The only restriction is that before any input/output character L3 is entered into a column of the matrix in FIG. 46, there must be a general logic character L1 for that column.

Thus, the input/output character L3 bank can grow from 1 character L3 with 7 input and 4 output channels 8 bits wide to 12 characters L3 with 21 input and 12 output channels 32 bits wide. All intermediate sizes are available, with channel width in increments of 8 bits. If a channel not a multiple of 8 bits is desired, it is necessary only to expand a channel to be wider than the desired one and then connect only the desired number of bits. If, for example, 20 bit channels are desired, the input/output character L3 bank would be 3 input/output characters L3 wide. Only 4 bits of the last input/output character L3 would be used.

Number of channels grows in increments of 7 input and 4 output channels. If the desired number of channels is not a multiple of these numbers it is only necessary to use the next highest multiple with the last L3 character level being used at less than peak operational capability. If, for example, 10 input and 5 output channels are needed, the input/output character L3 bank is 2 characters deep.

The interrupt/mask register 464 and interrupt gate of input/output character L3 have no equivalent logic on micromemory register storage character G1. The interrupt/mask register expands like any other L3 or G1 register for functional and word length expansion. Each functional expanded level of input/output character L3 receives an individual signal y (FIG. 43). The output of each gate 530 on each input/output character L3 is sent to micromemory counter character M1 which has provision for handling all such incoming interrupt signals.

The parity logic of FIGS. 44 and 45 also have no equivalent logic on micromemory register storage character G1.

Basically each E register 452 – 458 (8 bits) on each input/output character L3 has its own generator and checker. If it is desired to generate or check parity on an E register larger than 8 bits thus involving more than one input/output character L3, the following steps are taken.

Connect the generator of that part of the register contained on the first input/output character L3 as shown on FIG. 44. Do not use the parity checker (block 560) of that part of the register. For that part of the register contained on the next input/output character L3, connect the generator as shown in FIG. 44 except instead of grounding the first input terminal 548 as shown, connect to it instead the signal P1 of the parity generator on the first input/output character L3. If this second input/output character L3 does not contain the last portion of the E register, ignore its parity checker and connect its P1 signal to the first input terminal 548 of the generator of the L3 character which contains the next portion of the E register. Continue until the last input/output character L3 is reached. Connect to the first input terminal 548 of the last input/output character L3 the parity signal P1 of the generator of the next-to-last input/output character L3. The parity signal P1 of the generator on the last input/output character L3 is the parity output bit of the entire register. Connect the parity checker 560 of the last input/output character L3 as shown in block 560 of FIG. 44 and described in the related detailed description.

Make the above connection on a register by register basis. All parity generators 540 – 546 are used but only the parity checkers 560 on the last input/output character L3 are used.

In this manner, parity can be generated and checked over 8, 16, 24, or 32 bit E registers on a register-by-register basis.

Basically, parity signal P1 is the parity of the 8 bits of the register on that character for the first input/output character L3. If parity signal P1 connects to input terminal 548 on the next input/output character L3, signal P1 of that second character is the parity of the total 16 bits on that character and the first character. P1 thus can be thought of as a "PARITY - CARRY" signal. Also, each signal P1 is the parity of the entire register to that point. The final P1 is the parity of the completely expanded register.

Many variations of parity generation and checking may be performed. For example, parity of all 32 bits on a single input/output character L3 may be obtained by proper parity signal P1 to input terminal 548 connections. The invention involves great flexibility in this category.

Figure 47:
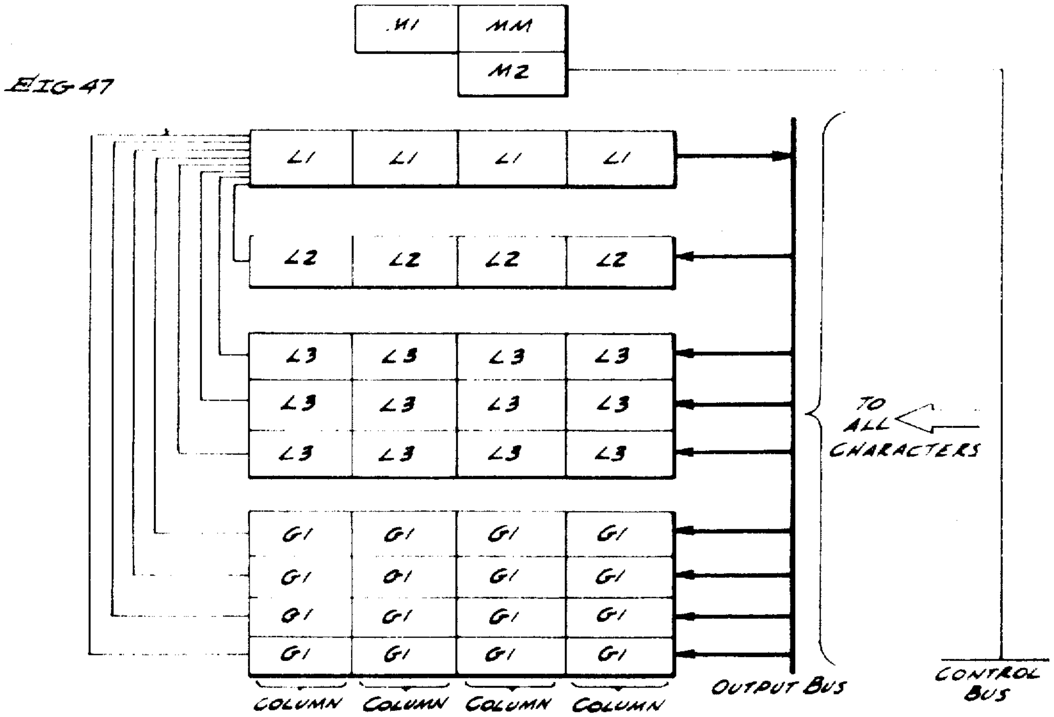
FIG. 47 is a functional block diagram illustrating an expanded logic unit including general logic characters L1, arithmetic logic characters L2, and input/output character L3, and an expanded register unit including micromemory register storage characters G1.

FIG. 47 combines what has been said about expansion of general logic character L1, arithmetic logic character L2, input/output character L3, and micromemory register storage character G1 for a single logic unit.

Assuming a micromemory counter character M1, micro-array character MM, and micro-instruction register character M2 are present for control, these are the basic choices the invention offers a system designer.

A. A choice of 1, 2, 3, or 4 general logic characters L1 establishing the data width of the unit.

B. A choice of 0, 1, 2, 3, or 4 arithmetic logic characters L2. It is necessary that a general logic character L1 be present in the column with any arithmetic logic character L2 used.

C. Choice of from 0 to 12 input/output characters L3 in any position shown. Only necessary that a general logic character L1 be present in the same column as any input/output character L3 used.

D. Choice of from 0 to 16 micromemory register storage characters G1 in any position shown. Only necessary that a general logic character L1 be present in the same column as any micromemory register storage character G1 used.

CONTROL UNIT

Reference is now made to the details of the control unit including the micro-array character MM, the micromemory character M1, and the micro-instruction register character M2.

MICRO-ARRAY CHARACTER — MM

Figures 48, 56:
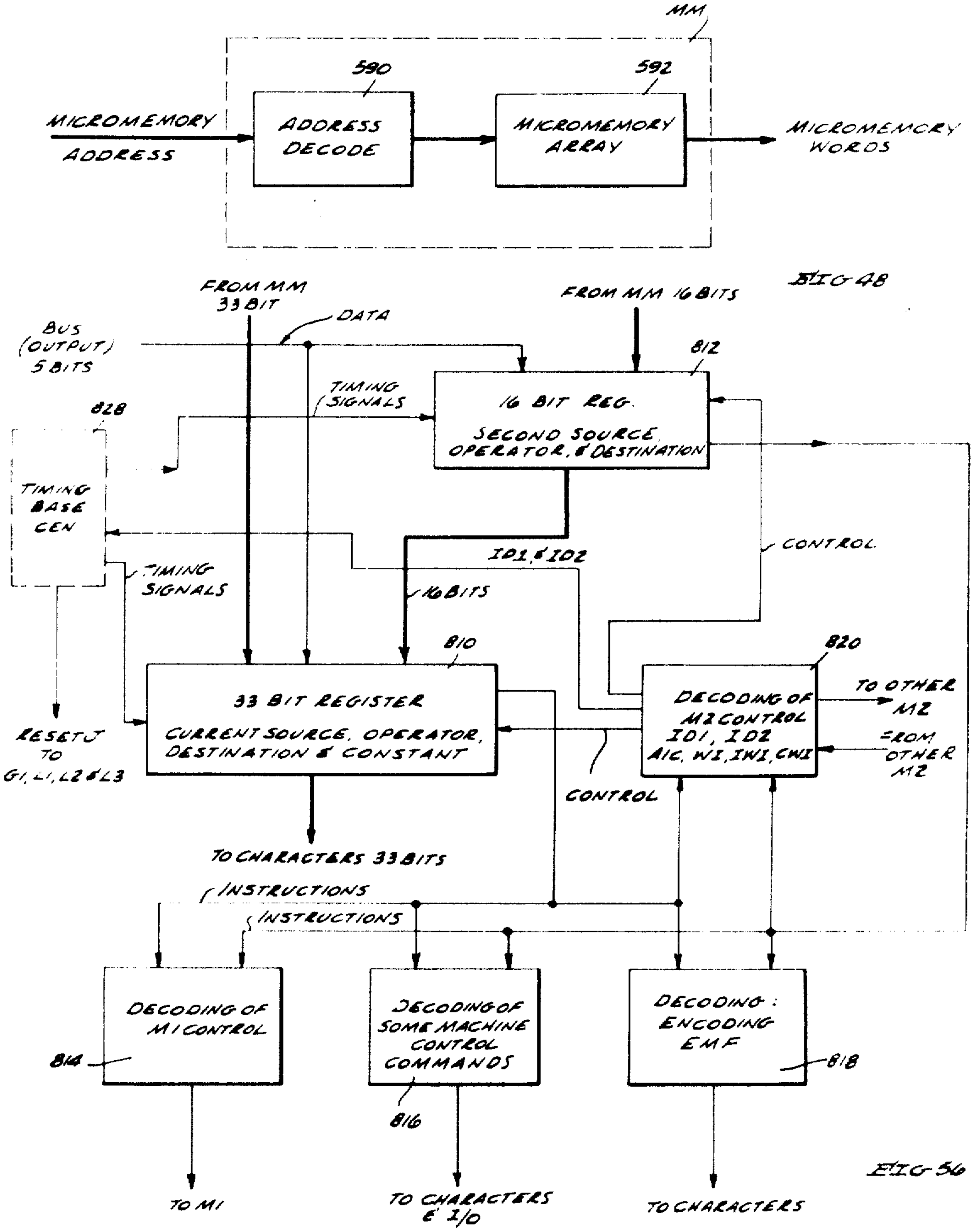
FIG. 48 is a block diagram illustrating the micro-array character MM utilized in the control unit of FIG. 1.
FIG. 56 is a block diagram illustrating a micro-instruction register character M2.

The micro-array character MM illustrated in FIG. 48 is responsive to the micromemory address from the micromemory counter character M1 to produce the 50 bit wide micromemory word illustrated in FIG. *2a*. Structurally, the micro-array character MM includes an address decoder 590 that is connected to receive the 10 bit wide micromemory address word from the micromemory counter character M1. The micromemory address word includes 8 code bits to activate one out of 256 parallel word lines output from the address decoder 590. In addition, the micromemory address word includes two inhibit bits which inhibit the decoder under certain conditions. The output from address decoder 590 is fed to a micromemory array 592.

The micromemory array 592 is a 256 word by 50 bit read only memory. This micromemory array can be fabricated from a MμL9034 integrated circuit manufactured by the Fairchild Semiconductor Company and illustrated and described in Fairchild Semiconductor Data Catalogue 1969, Copyright 1968, Fairchild Semiconductor Company BR-BR-0034-58 25M Library of Congress Catalogue card 68-8780, Pages 3-62E through 3-62J. The outputs from micromemory array 592 are the 256 micro-instruction words of 50 bits each including one parity bit. These micromemory words are utilized throughout the system in the manner previously explained.

MICROMEMORY COUNTER CHARACTER - M1

Figure 49:
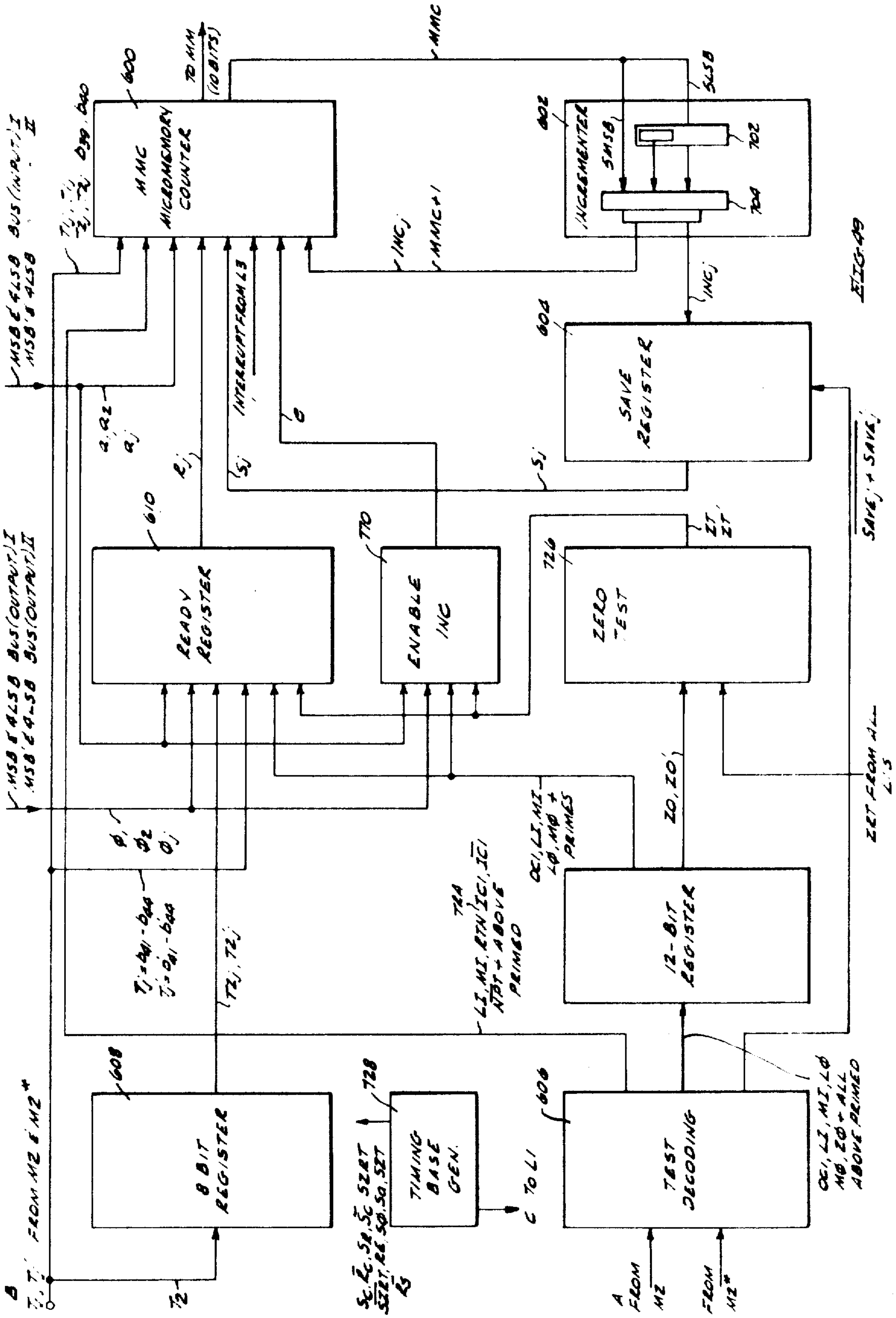
FIG. 49 is a block diagram illustrating the micromemory counter character M1 utilized in the control unit of FIG. 1.

The micromemory counter character M1 is a highly specialized parallel entry counter that provides the micromemory address register and performs related functions. As illustrated in FIG. 49, the micromemory counter character M1 includes a micromemory counter register MMC 600 that provides 10 bits of storage plus enable logic for addressing up to 1,024 micromemory words in the micro-array character MM of FIG. 48. In essence, the micromemory counter register MMC 600 contains the address of the next micro-instruction word to be accessed.

Associated with the micromemory counter register MMC is a 5 bit incrementer 602 which automatically steps the contents of the micromemory counter register MMC through 32 micro-program address states by incrementing the 5 least significant bits thereof. Thereafter the micromemory counter MMC begins repeating addresses. This produces the effect of a micro-program ring of 32 words in which the program will loop (that is increment from one word to the next through the ring) until the program issues an unconditional transfer command. This transfer command takes the program out of the present ring. In addition, there is a save register 604 that saves the incremented instruction in response to a SAVE command so that the address is later available for reinsertion into the micromemory counter register MMC.

A test decoding circuit 606 is responsive to conditional an unconditional transfer commands in the constant sub-field bits $b_{37}$ through $b_{40}$ (FIG. 2c) received from one or two micro-instruction register characters M2 for producing control signals corresponding to fast tests or slow tests. These control signals are fed to the micromemory counter register MMC 600 for enabling new addresses to enter the MMC conditional upon the results of certain tests and stopping the incremented output from incrementer 602 from entering the MMC when a conditional or unconditional transfer specifies that a new address is to be entered into the micromemory counter register MMC instead.

The new address from the T1 sub-field, T2 sub-field, and bits $b_{39}$ through $b_{40}$ of the transfer command sub-field are received by the micromemory counter character M1 from up to two micro-instruction register characters M2. Register 608 stores the two T2 sub-fields if there is a slow test. When there is a slow test with positive results, the new address is transferred to a ready register 610 where it is stored for the one cycle time that is necessary for slow tests. Thereafter it is transferred to the micromemory counter MMC for addressing the micro-array character MM. Addresses from T1 $b_{39}$ and $b_{40}$ are used for both fast and slow tests. Timing allows them to bypass storage in register 608.

The micromemory counter character M1 also receives the most significant bit and the four least significant bits from the BUS (output) and the BUS (input) of up to two general logic characters L1. In addition, a zero test signal ZRT is received from each general logic character L1 to indicate if all of the bits on its byte of the BUS (output) are zero. Furthermore, timing signals that are either clocks or self generated are received by the micromemory counter character M1 as will be explained in more detail subsequently. Still further, the micromemory counter register MMC receives an interrupt signal on an interrupt line from all input/output characters L3.

Figure 50A:
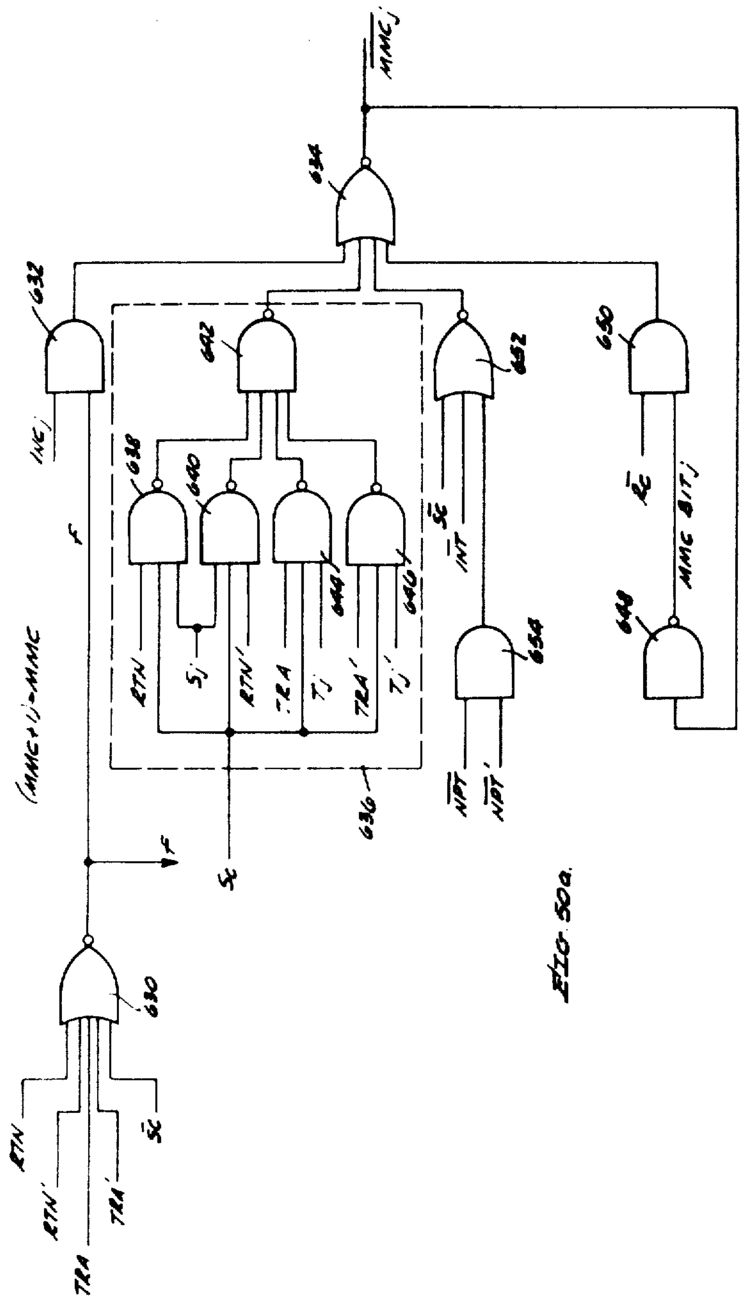
FIGS. 50*a* and 50*b* are logic diagrams illustrating the micromemory counter of FIG. 49 and illustrate one stage of the 5 most significant bits and one stage of the 5 least significant bits respectively.

Referring now to the details of the micromemory counter MMC 600, the five significant bit stages thereof are fabricated from circuitry of the type illustrated in FIG. 50a. For example, a parallel entry circuit including NAND gate 642 enters the contents of save register 604 into the micromemory counter MMC 600 in response to command signal RTN from the machine control field and is responsive to an unconditional 10 bit transfer command signal TRA from the transfer command sub-field entering the T1 and T2 sub-fields and bits $b_{39}$ and $b_{40}$ into the counter. For inhibiting the five most significant bits from storing the feed-back signals from the incrementer 602, an increment inhibit circuit including gate 630 is responsive to signals TRA and RTN. (The five least significant INC bits are inhibited from entering the counter when TRA, RTN, or a fast test is active.) More specifically, when no one of signals RTN or TRA from either micro-instruction register character M2 are active the output of NOR gate 630 is high and is fed to one input of AND gate 632 in the micromemory counter MMC 600. The other input of AND gate 632 receives the jth bit fed back from the incrementer 602. The output of AND gate 632 is fed to a one input of a common NOR gate 634. A second input of NOR gate 634 receives the output signal from a control logic circuit 636 that enables the contents of the save register 604 or an unconditional 10 bit transfer address to be written into the micromemory counter MMC. In order to enter the *j*th bit $S_j$ from the save register 604 into the *j*th stage of the micromemory counter MMC upon command from either one of two microinstruction registers M2 or M2', two parallel NAND gates 638 and 640 have one input coupled to receive the enter-save-register-into-MMC command signals RTN and RTN', respectively. A second input of each NAND gate 638 and 640 receives the *j*th bit $S_j$ from the save register 604 and a third input terminal receives a timing pulse $S_c$. The output of these two NAND gate 638 and 640 are fed to two inputs of a common NAND gate 642.

Figure 55A:
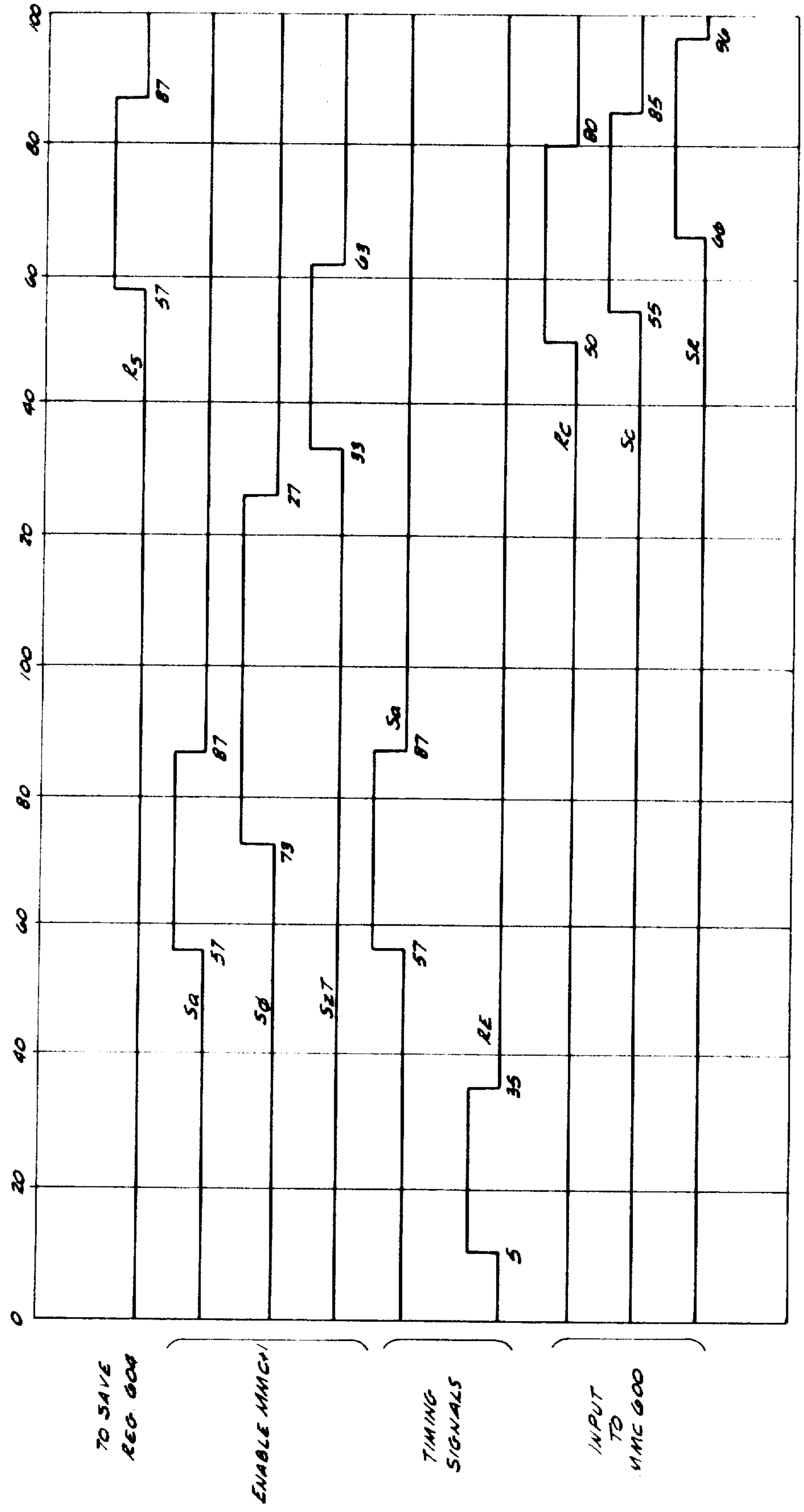
FIGS. 55*a* and 55*b* are timing diagrams illustrating the timing relationship associated with the operation of different portions of the functional characters.
Figure 55B:
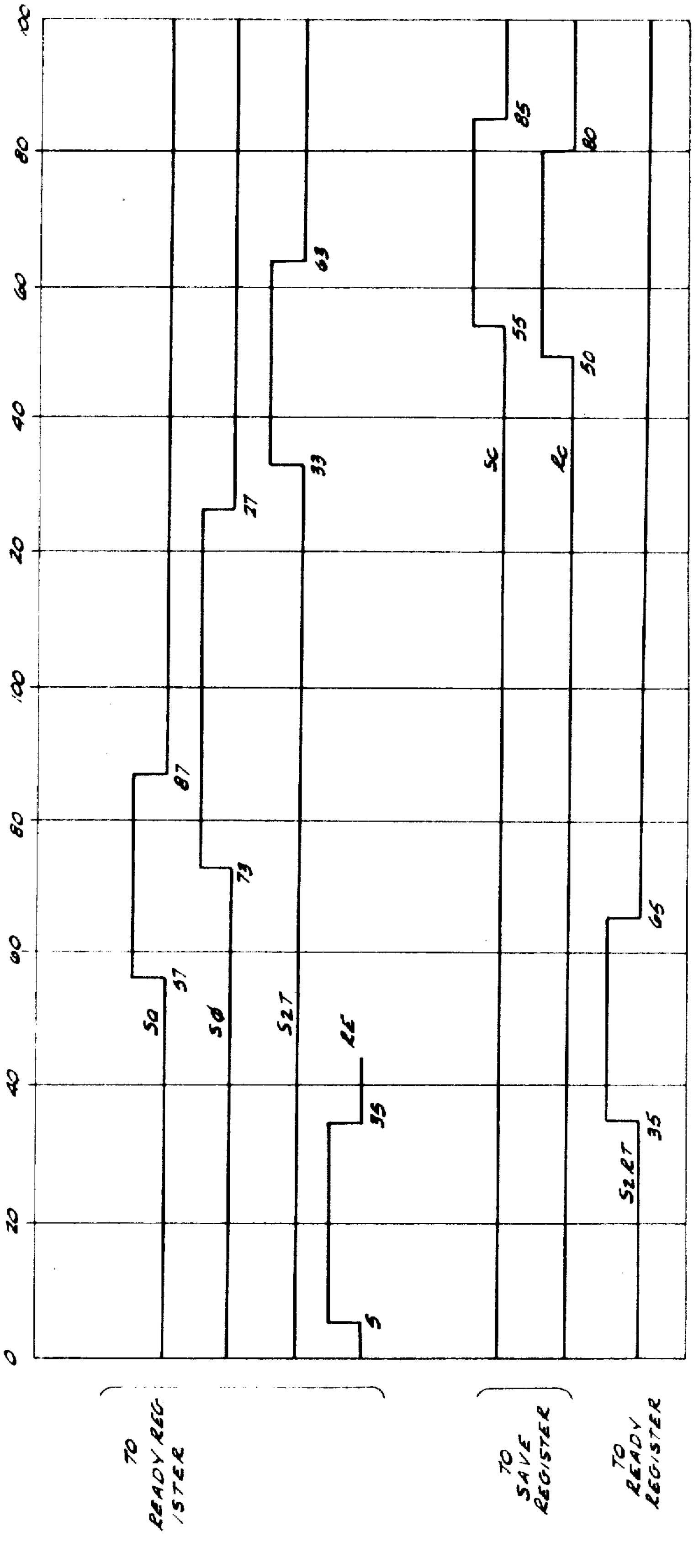

The control logic circuit 636 further includes two additional parallel NAND gates 644 and 646 having input terminals coupled to receive the unconditional 10 bit transfer command signals TRA and TRA' from the two microinstruction registers M2 and M2', respectively. A second input of each NAND gate 644 and 646 is coupled to receive the *j*th bit of the "T" sub-field extending from bits $b_{30}$ to $b_{43}$ from the two micro-instruction registers M2 and M2', respectively. A third input terminal of each NAND gate 644 and 646 receives the timing signal $S_c$ (FIG. 55b). The common NAND gate 642 receives the outputs from NAND gates 644 and 646 wherein the output signal is normally low. When, however, the contents of the save register 604 are to be entered into the micromemory counter MMC or an unconditional transfer address is to be stored therein from the "T" sub-field such as occurs after a 32 increment, the output signal has the value of bit $S_j$ or $T_j$.

The $j$ th bit output of NOR gate 634 in the micromemory counter MMC is latched therein by means of a feed-back loop including a NAND gate 648 that inverts the jth bit output signal $\overline{MMC_j}$. The inverted output $MMC_j$ from NAND gate 648 is fed to one input of an AND gate 650 that is used to latch or reset the $j$th stage. A second input of AND gate 650 receives a timing signal $\overline{R}_c$. The output of this AND gate 650 is fed back to an input of NOR gate 634 to store the output signals state therein.

In addition, an interrupt logic circuit including NOR gate 652 has two inputs coupled to receive the timing signal $\overline{S}_c$ and an interrupt signal $\overline{INT}$ from the input/output characters L3. When interrupt command signal $\overline{NPT}$ or $\overline{NPT'}$ received from the micro-instruction register characters M2 or M2' machine control field on the two inputs of AND gate 654 its output to NOR gate 652 enables the state of the interrupt signal INT to determine whether the stages of the micromemory counter MMC are to be set to ONE.

It should be understood, at this time, that each of the ten stages include a separate NOR gate 634 and its associated feed-back loop, one AND gate 632 and one logic circuit 636. There is, however, one increment inhibit logic circuit 630 for the five most significant bits and a similar circuit 660 for the five least most significant bits. Furthermore, there is only one interrupt logic circuit 652 common to all ten bits in the micromemory counter MMC.

For the five least significant bit stages of the micromemory counter MMC include the circuitry illustrated in FIG. **50*b*, Generally, for all five of the least significant bit stages there is a common increment inhibit circuit 660 which has an output signal $f$ that is normally high. If, however, a fast test address is to be entered into the five least significant bits of the micromemory counter MMC, then the output signal $f$ goes low. More specifically, the increment inhibit circuit 660 includes a common NOR output 662 having four of its inputs coupled to receive the output signals from parallel AND gates 664, 666, 668, and 670. AND gate 664 receives the least significant bit $b_1$of the BUS (input) at one input terminal and a least significant bit 1 test signal L1 at its other input terminal. If the least significant bit $b_1$ is a 1 and the test signal is also 1, the output of AND gate 664 goes high whereupon the output of NOR gate 662 (signal $f$) goes low. As a result, the least significant five bits of the incremeter are inhibited from entering micromemory counter MMC 600. Similarly, AND gate 666 receives the most significant bit $b_2$ and the most significant bit 1 test signal M1, at its two input terminals, to produce a high output signal if the test condition occurs. AND gate 668 receives the least significant bit $b_1'$ from a second BUS (input) and the least significant bit one test signal L1' to produce a corresponding output signal. The fourth AND gate 670 receives the most significant bit $b_2'$ on the second BUS (input) and the most significant bit 1 test signal M1' to produce a corresponding output signal if the test condition occurs. The common NOR gate 662 also receives command signal IC1 and IC1' for inhibiting the INCREMENT function if it is necessary to transfer the four least significant bits received on either of the two BUS (inputs) to the micromemory counter MMC unconditionally. IC1 is decoded from the machine control field, as is signal RTN. Signal TRA is decoded from the transfer test field, as are all the transfer test signals L1, M1, L1', and M1'. Similarly, the command signals RTN and RTN' for entering the contents of the save register into the micromemory counter MMC and the command signals TRA and TRA' for an unconditional 10 bit transfer for both of the microinstruction register characters M2 and M2' are applied to the common NOR gate 662. Thus, any time the save register or an unconditional transfer address is to be entered into the micromemory counter MMC, the output signal f of NOR gate 662 goes low the feed-back loop from the incrementer 602 to the micromemory counter MMC for the five least significant bits, just as circuit 630** closes this path for the most significant 5 bits under the same conditions.

Each of the four next least significant bit stages of the micromemory instruction address stage are each represented by the six parallel AND gates 672, 674, 676, 678, 680, and 682 and the logic circuits 684 and 686. The stage associated with the least significant bit does not include the AND gates 674 through 682 of the logic circuit 686, as will be explained in more detail subsequently.

Thus, for the five least significant bits, the AND gate 672 receives the $j$th least significant bit $INC_j$ from the incrementer 602 on one input terminal and the fast test increment inhibit signal $f$ on a second input terminal and a normally high slow test increment inhibit signal $e$ on a third input terminal. Thus, if there is no slow test or fast test address to be entered into the micromemory counter MMC, the state of the signal $INC_j$ received from the incrementer 602 controls the output state of the AND gate 672. If, however, there is a fast test address or a slow test address to be entered into the micromemory counter, the increment inhibit signals f or e break the feed-back loop from the incrementer 602 to the micromemory counter MMC.

The AND gate 674 has one input terminal coupled to receive the $j$th bit $R_j$ from the ready register 610 and is responsive to a timing signal $S_R$. The AND gate 674 allows the contents of the ready register 610 to be loaded into the micromemory counter MMC.

The four parallel AND gates 676 through 682 allow the transfer field address to be entered into the micromemory counter MMC when one of the test conditions prove true. These gates exist for the four bits above the LSB only.

For example, the AND gate 676 is responsive to a least significant bit equal one test in response to a least significant bit equal one test control signal L1 received on one input terminal. The least significant bit $b_1$ is received from a first logic unit on a second input terminal while the $j$th bit $T1_j$ of the T1 sub-field is received on a third input terminal. A timing signal $S_c$ is received on a fourth input terminal of AND gate 676 and all other ones of the AND gates 678, 680, and 682. Thus, if the tests prove true, the $j$th bit $T1_j$ of the T1 sub-field is loaded into the micromemory counter MMC.

The AND gate 678 is responsive to a test of the most significant bit equal one for the most significant bit $b_2$ on a first BUS (input). In essence, the most significant bit equal one test signal M1 is received on one input terminal and the most significant bit $b_2$ is received on a second input terminal. The $j$th bit of the T2 sub-field $T2_j$ is received on a third input terminal and is loaded into the micromemory counter stage if the test proves true.

Similarly, the AND gates 680 and 682 are responsive to the tests of a least significant bit equal one and the most significant bit equal one respectively for the least significant bit $b_1'$ and the most significant bit $b_2'$ received from a second BUS (input). When these tests prove true, the jth bit $T1'_j$ of the T1' sub-field or the jth bit $T2'_j$ of the T2 sub-field associated with the second logic unit are loaded into the micromemory counter *j*th stage.

The control logic circuit 686 is responsive to control signals $\overline{IC1}$ and $\overline{IC1}'$ for unconditionally transferring the four least or *j*th significant bits of the two BUS (inputs) to the micromemory counter MMC control signal for the two logic units. For example, a *j*th bit $b_j$ associated with the first logic unit is received on one input terminal of the NOR gate 688 while a timing signal $\overline{S}_c$ is received at another input terminal of NOR gate 688 and one input terminal of NOR gate 690. The third input terminal of NOR gate 688, receives the control signal $\overline{IC1}$ whereupon the *j*th bit $b_j$ switches the output of NOR gate 688. This *j*th bit $b_j$ is applied to one input terminal of NOR gate 634.

Similarly, for the second logic character the jth bit $b_j'$ and the control signal $\overline{IC1}'$ applied to NOR gate 690 caused the output terminal thereof to switch in accordance with the *j*th bit $b_j'$ associated with the second BUS (input)' for the second logic unit. Outputs of gates 688 and 690 are applied to input of NOR gate 634. The logic circuit 684 is responsive to control signal RTN of RTN' for entering the save register's *j*th bit $S_j$ into the *j*th stage of the micromemory counter MMC upon command from either one of two logic characters. More specifically, the logic circuit 684 includes four parallel NAND gates 692, 694, 696, and 698 each having one input terminal coupled to receive the timing signal $S_c$ (FIGS. 55*a* – 55*b*). One input terminal of each of the NAND gates 692 and 694 are coupled to receive the jth bit $S_j$ from save register 604 (FIG. 49). A control signal RTN associated with a first logic unit is received on one input terminal of NAND gate 692 while a control signal RTN' associated with a second logic unit is received on one input terminal of NAND gate 694. Similarly, an unconditional 10 bit transfer control signal TRA and TRA' associated with the two logic units are received on one input terminal of NAND gates 696 and 698, respectively. The other input terminal of NAND gates 696 and 698 received the *jth* bit $T_j$ of a T sub-field extending from bits $b_{44}$ to $b_{48}$ (FIG. 2*c*) associated with a first logic unit and a *j*th bit $T_j'$ of a T sub-field associated with a second logic unit. The four outputs of these NAND gates are fed to a common NAND gate 700. Thus, depending upon the selected transfer condition the level of the output signal of common NAND gate 700 is fed to one input of NOR gate 634.

NOR gate 634 and the feed-back loop including NAND gates 648 and 650 operate substantially the same as the corresponding components in FIG. 50*a* whereupon the selected input signal determines the state of the output signal of NOR gate 634 and the feed-back loop including NAND gate 648 and AND gate 650 stores that state until reset.

The 10 bit output from the micromemory counter MMC is received by the incrementer 602. The incrementer 602 can include a five stage parallel output incrementer logic circuit 702 similar to the type described with reference to the general logic character L1 and which increments the five least significant bits. The incrementer automatically steps through 32 microprogram address stages and then begins repeating addresses. This produces the effect of a microprogram ring of 32 words in which the program will loop (that is, increment from one word to the next through the ring) until the program issues an unconditional transfer command. This transfer command takes the program out of the present ring. The incremented five least significant bits from the incrementer and the five most significant bits are fed directly to a 10 bit storage register 704 in the incrementer of the type described with reference to the general logic character L1 wherein they are stored. The 10 bits of stored incremented address $INC_j$ are fed back to the micromemory counter in the manner described with reference to FIGS. 50*a* and 50*b*. In addition, the incremented address $INC_j$ is fed to the save register 604.

Figure 50B:
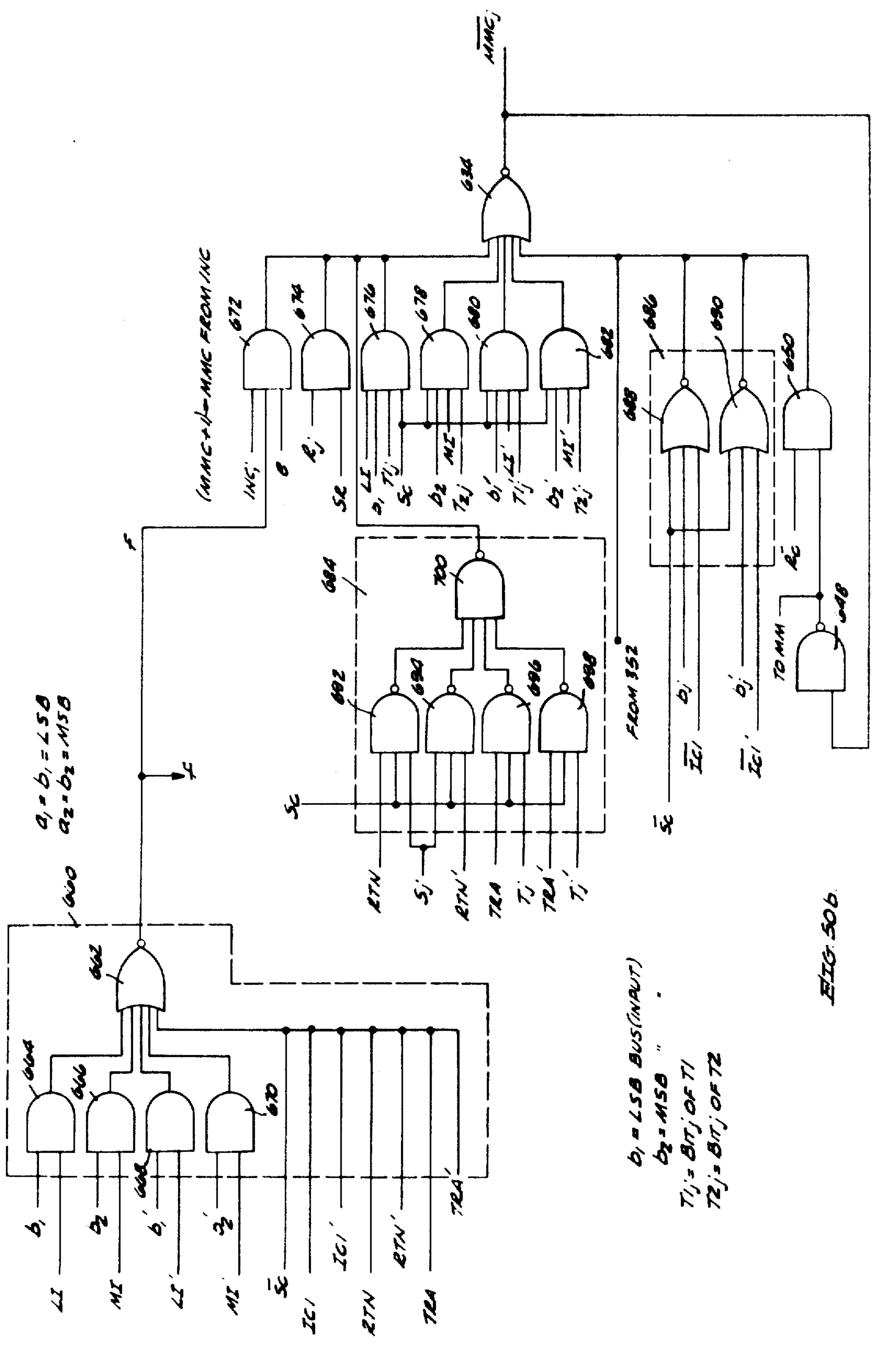
Figure 51:
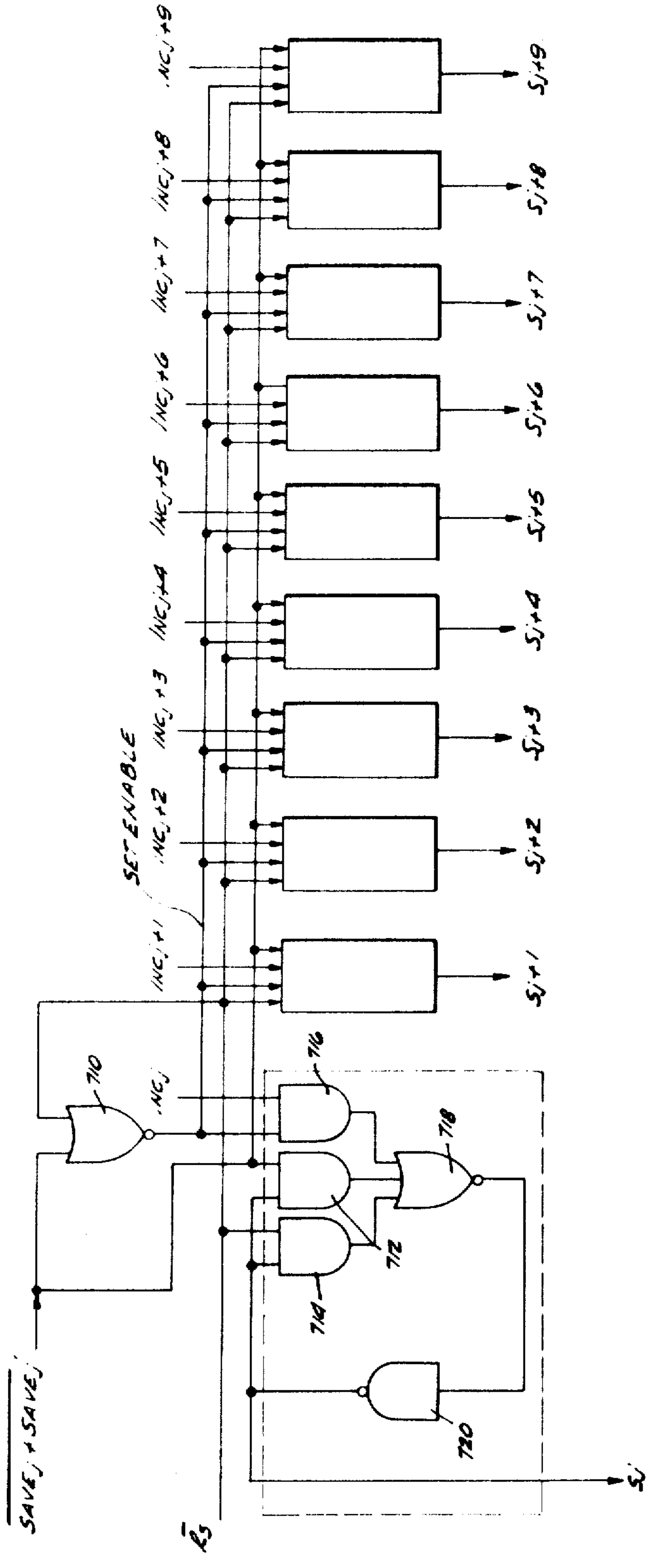
FIG. 51 is a logic diagram illustrating the save register utilized in the micromemory counter character M1 of FIG. 49.

The save register 604 illustrated in FIG. 51 receives the 10 bit incremented address in 10 parallel storage stages in response to a save command $(\overline{save_t + save_t'})$ received from the test decoder 606. The save command $(\overline{save_t + save_t'})$ is fed to one input of a NOR gate 710 that produces a SET ENABLE output signal that is fed in parallel to all 10 storage stages $S_j$ through $S_{j+9}$. In addition, the save command $\overline{save_t + save_t'}$ is fed to an AND gate, such as 712, in the stage $S_j$ illustrated in detail in FIG. 51 and to similar AND gate in each of the other storage stages $S_{j+1}$ through $S_{j+9}$ for clearing each stage when the timing signal $\overline{R}_S$ is received by the other AND gate 714. The third AND gate 716 receives the SET ENABLE signal from NOR gate 710 after a slight time delay resulting from the circuit component characteristics in response to the timing signal $\overline{R}_S$. The AND gate 716 also receives the incremented bit $INC_j$ from the incrementer 602 in coincidence with the SET ENABLE signal from NOR gate 710 for setting a common NOR gate 718 in response to the incremented bit $INC_j$. The output of NOR gate 718 is fed back through an inverting NAND gate 720 to other inputs of AND gates 712 and 714 for maintaining the output state of NOR gate 718. In addition, the output of inverting NAND gate 720 is the save register's output bit $S_j$ that is returned to the micromemory counter MMC 600 in the manner described in detail with reference to FIGS. 50*a* and 50*b*.

The other nine storage stages for the save bits $S_{j+1}$ through $S_{j+9}$ are structurally identical to the logic circuit including AND gates 712 through 716, NOR gate 718, and NAND gate 720 with the exception that the other nine bits $INC_{j+1}$ through $INC_{j+9}$ are received at the AND gates corresponding to AND gate 716 illustrated in STAGE $S_j$.

Referring back to FIG. 49, the test decoder 606 receives a plurality of command signals from one or two micro-instruction register characters M2 or M2' as will be explained in more detail subsequently. The plurality of command signals received by the test decoder 606 includes the transfer command field bits $b_{37}$ through $b_{40}$ and the following 11 exemplary command signals from each of the micro-instruction register characters M2 by a conventional NAND and NOR gate decoding circuit of the type previously described with reference to other characters.

A constant source command signal $CNT_1$ and $\overline{CNT_1}$ is produced in response to the source sub-field bits $b_0$ through $b_4$ to allow for 16 bits of the micromemory word to be accessed. These 16 bits enter the data BUS (input). The constant field occupies bits $b_{32}$ through $b_{48}$ and when accessed inhibit action otherwise indicated by the machine control and the transfer sub-field. Similarly, constant source command signal $CNT_2$ and $\overline{CNT_2}$ are produced in response to the source sub-field $b_{16}$ through $b_{20}$ and produce a similar command operation.

Mask control signals $MSK_1$ and $\overline{MSK_1}$ are produced in response to the operator sub-field bits $b_5$ through $b_{10}$ and cause the soruce data selected at time one to be masked by constant field bits $b_{32}$ through $b_{47}$ of the micromemory word. The lower order 16 bits of the source data are masked by corresponding bits $b_{32}$ through $b_{47}$ right justified. The upper order bits of the source data are made ZERO. A mask bit of ONE and a source bit of ONE in corresponding positions will produce a ONE while all other combinations result in a ZERO.

Similarly, masked control signals $MSK_2$ and $\overline{MSK_2}$ are produced in response to operator sub-field bits $b_{21}$ through $b_{26}$ to perform the above described function during a second micromemory word.

Another special control signal received from the micro-instruction register character M2 is the control signal EMF·MK1·MK2·TRS where an extended machine control field control signal EMF provides for the specification of three additional controls at the expense of the transfer field. Any three of the following machine control fields may be specified:

| | |
|---|---|
| RTN | MO2 |
| NPT | IC1 |
| XOR | OC1 |
| FRY | IL2 |
| CRY | G41 |
| ID1 | G42 |
| ID2 | G81 |
| MS1 | G82 |
| MS2 | IOB |
| MO1 | IOS |

The operational significance of those mnemonic instructions not already defined, will be defined subsequently with reference to the circuit operation.

A mask at "one" time control signal MK1 causes the source data selected at "one" time to be masked by bits $b_{37}$ through $b_{48}$ of the micromemory word (right side of the constant field). The lower order 12 bits of the soruce data are masked by corresponding bits $b_{37}$ through $b_{48}$ right justified. The upper order bits of the source data are made ZERO. A mask bit of ONE and a source bit of ONE in corresponding positions will produce a ONE. All other combinations result in a ZERO. A mask at "two" time control signal MK2 causes the source data selected at "two" time to be masked by bits $b_{37}$ through $b_{48}$ of the micromemory word. The lower order 12 bits of the source data are masked by corresponding bits $b_{37}$ through $b_{48}$ right justified. The upper order bits of the source data are made ZERO. A mask bit of ONE and a source bit of ONE in corresponding positions will produce a ONE. All other combinations reslut in a ZERO.

Transfer and store control signal TRS saves the present contents of the micromemory counter incremented one modulo 32 in the save register illustrated in FIG. 49 and FIG. 50*b* and FIG. 51, and transfers the full transfer field $b_{39}$, $b_{40}$, T1 and T2 to the micromemory counter MMC 600 as will be explained in more detail subsequently. If, however, bits $b_{37} \cdot b_{38} = 0$ then only the first half of the operation is performed that is, no transfer is made and only the micromemory counter save operation is executed. All of the above described machine control signals are produced from the machine control field bits $b_{32}$ through $b_{36}$. In addition, save control signal SAVE, is received from the micro-instruction register character M2 to control the save register 604 illustrated in FIG. 51.

It should, of course, be understood that other control signals could be produced by the micro-instruction register character M2 and applied to the micromemory counter character M1 and that the above described signals are only exemplary and chosen to describe the cooperation and operating nature of the characters.

The test decoder 606 includes, in general, a 12 stage parallel register wherein the input to each stage includes a decoding logic such as a NOR gate that selectively receives the above described control and command signals from the micro-instruction register character M2. The test decoder 606 produces fast test or transfer control signals and slow test or transfer control signals.

Because explaining the operation of the fast test and slow test or transfer signals, the transfer fields bit $b_{37}$ through $b_{48}$ are first explained with reference to FIG. 52. The transfer field includes the transfer command field bits $b_{37}$ through $b_{40}$, the T1 transfer field bit $b_{41}$ through $b_{44}$ and the T2 transfer address field $b_{45}$ through $b_{48}$. This transfer field allows for microprogram specification of both conditional and unconditional transfers within the micro-program. FIG. 2*c* shows the location of the transfer field within the micro-instruction word. An unconditional transfer provides a 10 bit address which is the full micro-program addressing capability while conditional transfers provide a 4 bit address. FIG. 52 illustrates the bit position of these two transfer addresses relative to the micromemory counter MMC 600. Note that the 4 bit address for conventional transfers is not right justified. At all times when a transfer is not effected, either conditional or unconditional, the micromemory counter is incremented by one modulo 32.

There are basically three testable functions. They are: least significant bit — true; most significant bit — true; and all bits — false; where true equals ONE and false equals Zero. Furthermore, some of these functions may be tested as inputs to the logic unit or as outputs and in various combinations which will be defined hereinafter. The action time with the transfer command is divided into two classes, those that either sample conditions only as inputs to the logic unit or as unconditional transfers and those that sample conditions at least partially at the output of the logic unit.

The first class samples at time one of the word time where the data is specified by the first instruction field and effects the program transfer for the immediately following micro-instruction word, this is called a fast test.

The second class samples at time two of the word time as a result of circuit time delays and operating time delays where the data is specified by the second instruction field and effects the transfer for the second following micromemory instruction. This is called a slow test. The transfer address may come from bits $b_{41}$ through $b_{44}$ of the transfer address field T1 or bits i $b_{45}$ through $b_{48}$ of the transfer address field T2 of the micromemory word or in some cases from both resulting in a logical OR result. In other words, if $T_1 = 0011$ and $T_2 = 0101$ and both conditions prove true than the resulting transfer address will be 0111. However, if the condition for T1 is false and the condition for T2 is true, then the result would be 0101. Or if $T_1$ and $T_2$ conditions are true and false, respectively, then the result is 0011. For the case where conditions for $T_1$ $T_2$ are both false, the previous instruction address is incremented by ONE. In conditional transfer cases proving true the least significant bit of the micromemory counter is set to ZERO as illustrated below.

RESULTANT ADDRESSES FOR CONDITIONAL TRANSFER TESTS

| 1st test | 2nd test | Resultant address ($T_{AI}$) | Example: $T_{AI-1}=10110$ (bits 5-9) $T_1=0011$; $T_2=0101$ |
|---|---|---|---|
| 0 | 0 | $T_{AI-1}+1$ | 10111 |
| 0 | 1 | $T_2 \cdot 2$ | 01010 |
| 1 | 0 | $T_1 \cdot 2$ | 00110 |
| 1 | 1 | $(T_1+T_2) \cdot 2$ | 00110 |

NOTE.—Bits 0-4 of MMC remain unchanged during a conditional test.

It can be seen from the foregoing that the micromemory program will operate within a ring of 32 words incrementing from one to the next and jumping upon conditions to even words within this ring. To place the program outside this ring and into another it is necessary to issue an unconditional transfer. There exists twelve conditional transfer test combinations and one unconditional transfer. Bits $b_{37}$ through $b_{40}$ in the transfer command field define these tests and as a result are named the transfer command field. The mnemonic used are defined as: L equals least significant data bit — true; M equals most significant data bit — true; Z equals all data bits — false; I equals data tested at input to logic unit; 0 equals data tested at output of logic unit; TRA equals unconditional transfer; T1 equals transfer address bit $b_{41}$ through $b_{44}$ of micromemory words; and T2 equals transfer address bits $b_{45}$ and $b_{48}$ of micromemory words.

Referring now to the fast tests or transfers, the test signal L1 tests the least significant bits for the ONE state on the bBUS (input) to the logic unit at the time the source data specified by the first instruction field is present. If the test proves true, then the transfer address field $T_1$ will be transferred to the micromemory counter MMC resulting in an immediate program jump to the new location. The fast test signal M1 tests the most significant bit for the ONE state on the BUS (input) to the loguc unit when the data on the first instruction is present. If the test proves true, then the transfer address field $T_2$ is transferred to the micromemory counter MMC resulting in an immediate program jump. The machine control RTN is a return control signal that reacts as fast as a fast test does and transfers the contents of the save register 604 into the micromemory counter MMC. This operation causes the next instruction read into micromemory to be the one addressed by the contents of the save register. Thus, the normal sequence of accessing sequential instructions is altered allowing for, perhaps the return from a subroutine.

Another fast test signal TRA derived from bits $b_{37}$ through $b_{40}$ of the transfer fields is an unconditional 10 bit transfer of the micromemory word to the micromemory counter MMC causing an immediate micro-program jump. These 10 bits from the micromemory instruction register are transferred to the micromemory counter MMC 600 as illustrated in FIG. 52.

The machine control signal IC1 reacts as an unconditional test that provides for a jump within a micromemory dependent upon data on the BUS (input). The four lower order bits on the BUS (input) are set into bits $b_5$ and $b_8$ of the micromemory counter MMC 600. Bits $b_0$ through $b_4$ are left undisturbed and bit $b_9$ is reset to ZERO. The effect is to transfer to one of 16 even locations in micromemory within the ring that the instruction itself is located.

The slow test or transfers that occur at time two include the least significant bit equal one test L1, and the most significant bit equal one test M1 that are essentially the same as the previously described corresponding fast test except that they occur during slow tests, operate when data of the second source is present, and both cause field $T_1$ to be transferred to the MMC.

Another slow test signal is LO that tests the least significant bit for a one state on the BUS (output) from the logic unit at the time the source data specified by the second instruction appears thereafter having been operated upon as specified by this same instruction. If the test proves true, then the transfer address field $T_2$ is transferred to the micromemory counter MMC resulting in a program jump to the new location delayed one word time.

Another slot test signal MO tests the most significant bits for the ONE state on the BUS (output) leaving the logic unit when the data on the second instruction is present. If the test proves true, then the transfer address field $T_2$ is transferred to the micromemory counter MMC resulting in a program jump on the second following word time.

A slot test signal ZO tests all bits on the BUS (output) for ZERO at the time data specified by the second instruction is present. If the test proves true, then the transfer address field $T_2$ is transferred to the micromemory counter MMC resulting in a micro-program jump on the second following word time. As the table with FIG. 52 shows, encoded in bits $b_{37}$ through $b_{40}$ are commands which call upon various combinations of the slow tests LI, MI, LO, MO, and ZO to be executed simultaneously.

Machine control signal OC1 reacts as a slow test and causes the output to the micromemory counter MMC to provide for a jump within the micromemory dependent upon data on the BUS (output). The four lower order bits on the BUS (output) are fed into bits $b_5$ through $b_8$ of the micromemory counter MMC. Bits $b_0$ through $b_4$ are left undisturbed and bit $b_9$ is reset to ZERO. The effect is to transfer to one of 16 even locations in micromemory within which the ring instruction itself is located at the second following word time as an unconditional transfer.

The test decoder also produces an interrupt control signal NPT that allows the micro-program to be interrupted if an interrupt line is active. An interrupt consists of transferring program control to location ONE and storing the micromemory counter words incremented once in the save register 604. The interrupt control signal NPT takes precedent over conditional and unconditional transfers.

The test decoder 606 also produces a save command signal ($\overline{SAVE_i}$ + $\overline{SAVE_i'}$), which takes into account all previously mentioned conditions under which the contents of the incrementer are to be entered into the save register.

The above described fast test signals and the interrupt signals NPT are fed directly to the micromemory counter MMC 600 in the manner illustrated in FIGS. 49, 50*a*, and 50*b*.

The slow test signals are fed to a 12 bit register wherein the six slow test signals associated with each of the micro-instruction register characters M2 and M2' are stored to be later applied to the ready register. The enabled delayed tests OC1, L1, M1, LO, MO (output from the above register) are fed to a ready register 610. The enable ZERO test ZO (also output from the 12 bit register) is fed to a ZERO test logic circuit to solve timing problems.

Figure 53:
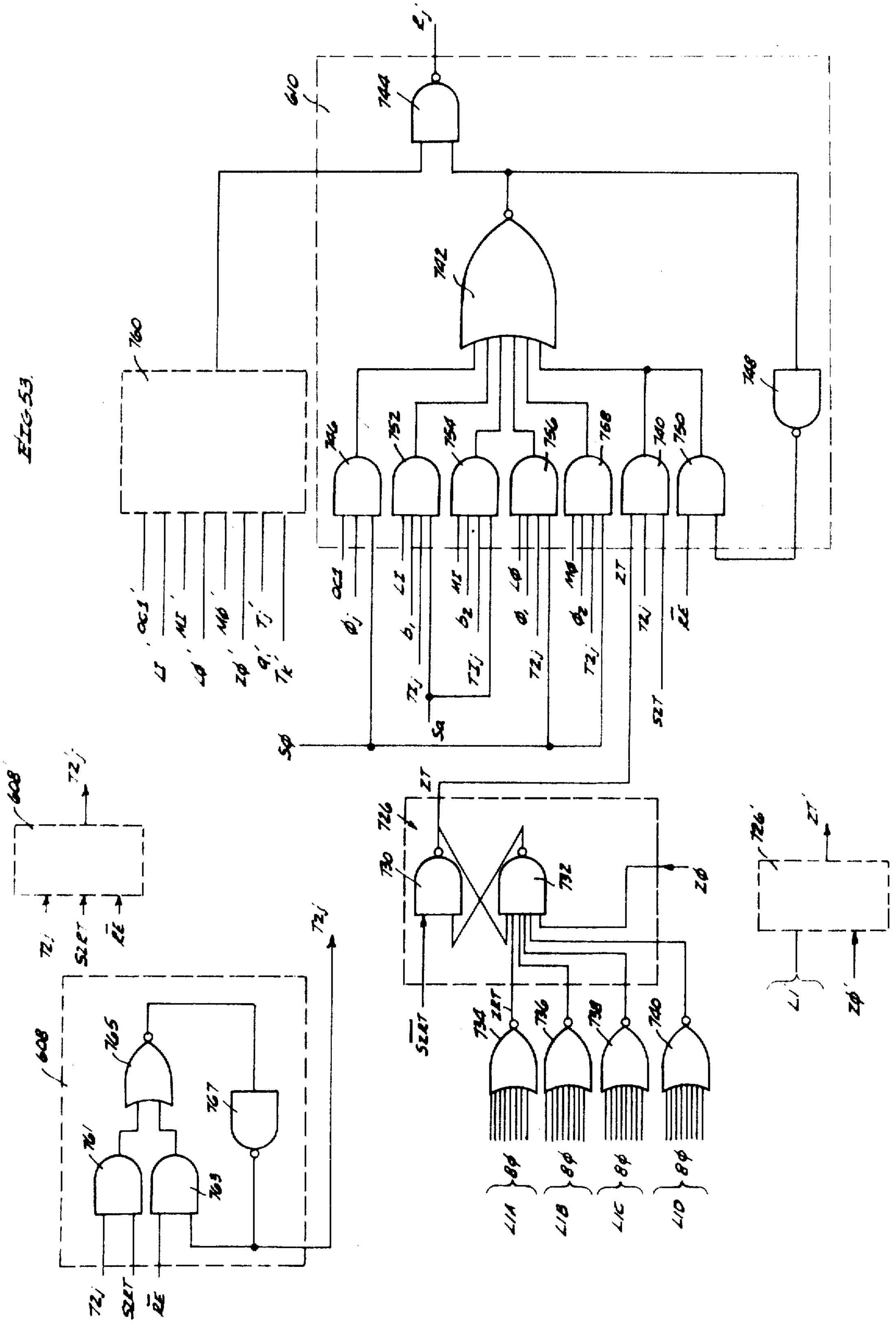
FIG. 53 is a logic diagram illustrating stages of the 8 bit register, the ready register, and the ZERO test register utilized in the micromemory counter character of FIG. 49.

The ZERO test circuit 726, illustrated generally in FIG. 49 and in detail in FIG. 53, includes two substantially identical circuits each of which is responsive to enable ZERO test signals ZO and ZO', respectively, produced in response to the command signals received from the two micro-instruction register characters M2 and M2'. In operation, when the timing signal $S_{ZT}$ is low, the timing signal $\overline{S_{ZRT}}$ produced by the timing base generator 728 (FIG. 49) sets the NAND gate 730 to a ONE state or high. The enable ZERO test command signal ZO is applied to one input terminal of NAND gate 732 when the all ZERO on the BUS (output) test is being run. Four parallel NOR gates 734, 736, 738, and 740 have their eight input terminals coupled to the eight lines of the BUS (output) of four general logic characters L1(A) through L1(D), respectively. When all of the inputs to the NOR gates 734 through 740 are low, the four outputs thereof which are fed to NAND gate 732 are high. As previously stated, the NAND gate 730 is set to its ONE state and its output signal ZT is high or preset to a ONE condition. If the enable ZERO test ZO is true, the output signal ZT of NAND gate 730 remains high. Shortly thereafter when a timing signal $S_{ZT}$ is received by one stage of a ready register 610 along with the ZERO test signal ZT the bit T2*j* of the transfer address field $T_2$ will be loaded into the appropriate stage of the ready register 610 as output bit $R_j$. The output signal ZT of the ZERO test circuit will be reset to ZERO if the enable ZERO test signal ZO goes to ZERO (if no command is received) or if any bit on any one of the four output busses is high. Consequently, the timing signal $S_{ZT}$ applied to the stage in ready register 610 will sense a low state for a false test and the gate will take no action to transfer the bit T2*j* to the output line thereof. For convenience, the relationship of the timing signal produced by timing base generator 728 is illustrated in FIGS. 55*a* and 55*b*.

Other stages in the ready register 610 are responsive to the other test signals for transferring the selected bits, such as $\phi j$, to the output line Rj as follows: the test command signal OC1 and the *j*th bit $\phi_j$ on the BUS (output) of L1 and a timing signal $S\phi$ are received by AND gate 746. When there is coincidence between these received signals the output of AND gate 746 goes high and is fed to NOR gate 742. The output R*j* of NAND gate 744 receives this signal then goes high to produce the high output signal R*j* if the *j*th bit $\phi_j$ is high or a low output signal R*j* if the *j*th bit $\phi_j$ is low. A NAND gate 748 receives the output of NOR gate 742, inverts it, and feeds it back to an AND gate 750 which is also responsive to a reset timing signal $\overline{R_E}$ to produce an output signal which holds the NOR gate 742 to the storage state.

Similarly, an AND gate 752 is responsive to the test command signal L1 (slow test only) and a timing signal $S_a$ for transferring the *j*th bit T1*j* received at one input terminal thereof to the output line as bit signal R*j* if the least significant bit $b_1$ on the BUS (input) is high.

AND gate 754 is responsive to the test command signal M1 (slow test only) and the timing signal $S_a$ for transferring the *j*th bit T1*j* to the output terminal as bit signal R*j* if the most significant bit $b_2$ on the BUS (input) is high.

AND gate 756 is responsive to the test command signal LO and the timing signal $S\phi$ for transferring the *j*th bit T2*j* in the $T_2$ sub-field to the output terminal as signal R*j* when the least significant bit $\phi 1$ on the BUS (output) is high.

The AND gate 758 is responsive to the test command signal M*o* and the timing signal $S\phi$ for transferring the *j*th bit T2*j* in the $T_2$ address transfer sub-field as the output signal R*j* when the most significant bit $\phi_2$ on the BUS (output) is high. It should, of course, be understood that there are four of these stages in ready register 610 associated with the micro-instruction register character M2 and that there are four of these stages in the ready register 610 associated with the micro-instruction register character M2'. The stages associated with the second micro-instruction register character M2' are illustrated in block diagram form at 760 and it should be understood that they are substantially identical to the stage illustrated in detail in logic block 610.

An eight stage parallel register 608 is coupled to receive the bits $b_{45}$ through $b_{48}$ and the bits $b_{45}'$ and $b_{48}'$ the transfer address sub-field $T_2$ received from each micro-instruction register character M2 and M2', respectively. The register 608 stores the new address during one cycle. The output bits T2*j* and T2'*j* are thus fed to the ready register 610 for slow test conditions in the manner previously described. One stage of 8 bit register 608 is illustrated in FIG. 53*a* and includes parallel AND gates 761 and 763, common NOR gate 765, and feed-back NAND gate 767. It is important to realize that inputs T2*j* and T2'*j* to ready register 610 are actually the outputs of this register unit 608. However, for any logic block except 610, inputs specified as T2*j* or T2'*j* are these signals directly as input from M2 and M2' without intermediate storage.

Figure 54:
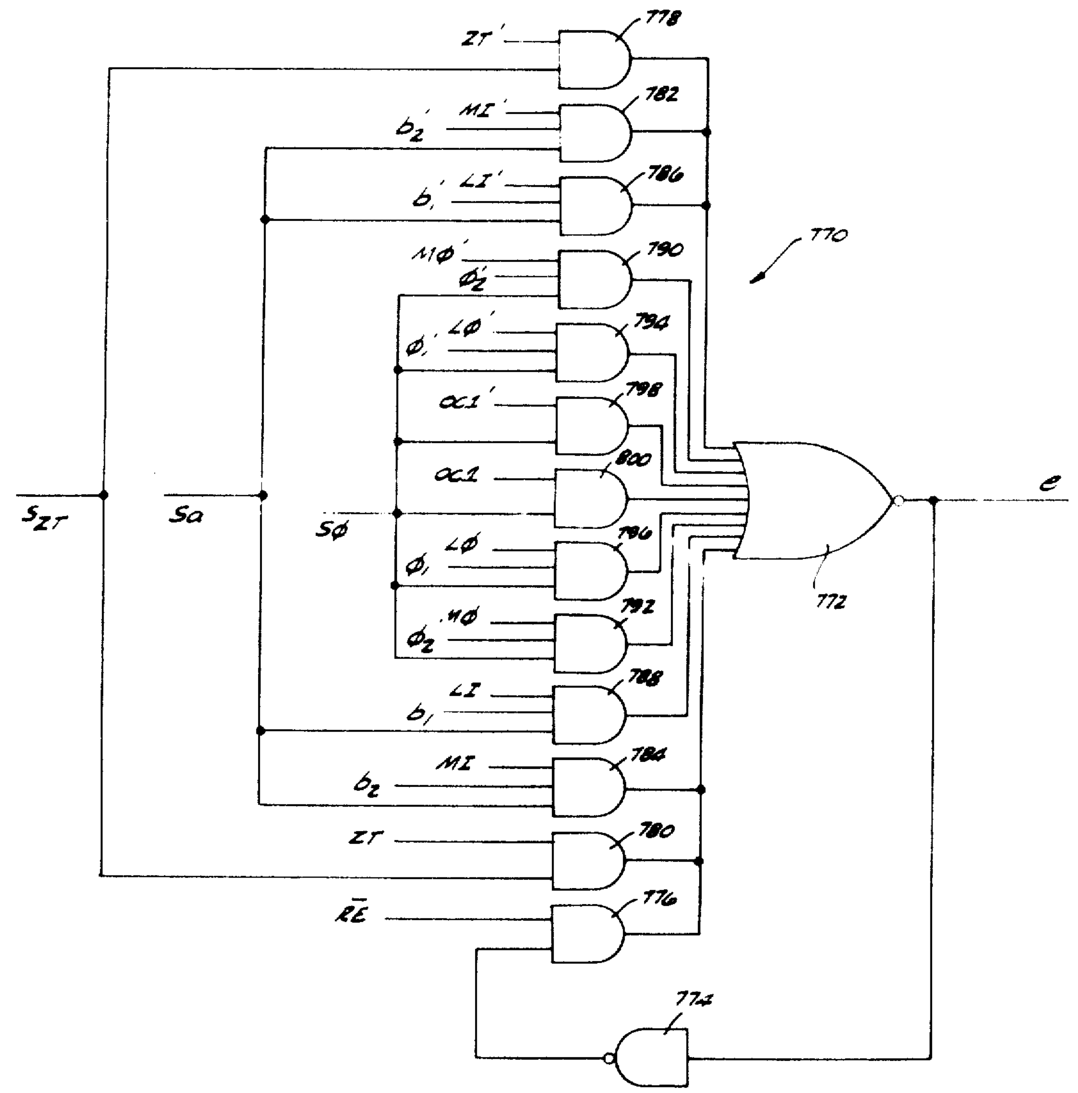
FIG. 54 is a logic diagram illustrating the enable increment register utilized in the micromemory counter character of FIG. 49.

An enable increment circuit 770, illustrated in general in FIG. 49 and in detail in FIG. 54, produces a slow test disable signal e if a slow test is true. For example, the enable increment circuit 770 includes a single stage of the type illustrated in FIG. 54 having a plurality of AND gates connected in parallel circuit relationship to a common NOR gate 772 which produces the slow test disable signal e on its output line. The slow test disable signal e is fed back through a NAND gate 774 which produces an inverted output signal that is fed to an AND gate 776. The AND gate 776 is also responsive to a reset timing signal $\overline{R_E}$ to hold the state of NOR gate 772 at its output state.

More specifically, AND gate 778 and 780 are responsive to the ZERO test signals ZT' and ZT, respectively, received from the ZERO test circuit 726 (FIG. 53a) and the timing signal $S_{ZT}$ where upon the outputs go high if the test is true. These outputs are fed to common NOR gate 772 causing its output signal *e* to go low for a transfer condition. Similarly, AND gates 782 and 784 are responsive to the slow test command signals M1' and M1, and the timing signal $S_a$ for producing a signal on the output terminals in response to the most significant bit $b_2$ and $b_2$ of the BUS (input) received on their respective input terminals.

AND gates 786 and 788 areresponsive to the slow test command signals L1' and L1, the timing signal $S_a$ to produce *a* signal on their output terminals in response to the least significant bit $b_1$' and $b_1$ on the BUS (input).

AND gates 790 and 792 are respectively responsive to the slow test command signals MO' and MO, the timing signal Sϕ to produce a signal on their output terminals in response to the input signal correcponding to the most significant bit $\phi_2$' and $\phi_2$ correspondigng to the most significant bit on the BUS (output).

AND gates 794 and 796 receive the slow test command signals LO' and LO, respectively, and the timing signal Sϕ and produce signals on their output terminals in response to the input signals $\phi_1$' and $\phi_1$ corresponding to the least significant bit of the BUS (output).

AND gates 798 and 800 are responsive to the test command signals OC1' and OC1 and the timing signal Sϕ for producing an output signal when the condition is true.

The output of common NOR gate 772 is a slow test disable signal *e* which is high if there is no slow conditional transfer or no slow unconditional transfer. If there is a transfer condition, the disable signal *e* goes low. As previously stated, the disable signal e is fed to the micromemory counter MMC previously described, disabling the incrementer feed-back loop if a slow test or transfer is to occur. Signal *f*, as previously described, is the corresponding signal relative to fast tests or transfers.

Timing base generator 728 (FIG. 49) has the responsibility of generating all of the timing signals required by the logic blocks of micromemory counter character M1. In addition, generator 728 provides the strobe pulse (*c*) for all general logic characters L1 in the system. Use of the strobe pulse is discussed in reference to the general logic character L1. The principal purpose of strobe pulse (*c*), which is normally low, is to keep the logic signals on the BUS (output) also normally low, preventing false set spikes from the destination decoders of the various characters from accidentally setting their associated registers.

MICRO-INSTRUCTION REGISTER CHARACTER — M2

The micro-instruction register character M2, illustrated in FIG. 56, is a highly specialized 50 bit storage register. In operation, outputs from the micro-array character MM are stored in the micro-instruction register character M2. Command signals produced in the micro-instruction register character M2 are then relayed to all characters in this system except for the micro-array character MM. Some decoding is done within the micro-instruction register character M2 and certain bits may act as data rather than command. Consequently, the character connects to the logic characters for data transfer and to the micromemory counter character M1 for address transfer. From a system point of view, the micro-instruction register character M2 is an integral part of the micromemory control group wherein it stores commands and controls most of the characters.

Referring to the circuit in more detail, during the first half of a timing cycle (FIG. 4) 33 bits received from the micro-array character MM are loaded into a 33 bit parallel entry parallel output storage register 810. These bits are bits $b_0$ through $b_{15}$ and $b_{32}$ through $b_{48}$ (FIGS. 2*a* – 2*c*). At the same time, 16 additional bits received from the micro-array character MM are loaded into a 16 bit parallel entry output storage register 812. These bits include bits $b_{16}$ through $b_{31}$. During the next half of the timing interval, these 16 bits are transferred from register 812 and loaded into the 33 bit register 810 in response to timing signals received from the timing base generator 828. As a result, all 49 bits are available to the characters during a full timing cycle. The storage stages of the register 810 and register 812 are substantially identical to the gate storage stages previously described with regard to the other characters.

Instruction words from the 33 bit register 810 and the 16 bit register 812 are fed to a plurality of decoder circuits 814, 816, 818, and 820 which produce control and command signals in response thereto. Each of these decoding circuits could inclue NAND and NOR logic gates of the type previously described which are selectively coupled to produce an output signal in response to certain bits of the instruction word in the same general manner that the decoder illustrated in FIG. 38 was fabricated.

More specifically, the decoder 814 decodes the instruction words for producing the control signals that are fed to the micromemory counter character M1 as previously described. Decoder 816 decodes some of thd machine control commands as desired and feeds these command signals to the other characters and to the input/output devices if desired. Decoder 818 decodes the instruction words and encodes the extended machine field EMF to produce control signals that are fed to the other characters as previously described with regard to the extended machine control field EMF.

The decoder 820 decodes the instruction words from the 33 bit register 810 and the 16 bit register 812 to produce a plurality of control signals for the micro-instruction register character M2. For example, decoder 820 is responsive to selected bits of the instruction words for producing an alter instruction code AIC which allows thd micro-instruction exactly one word time away to be altered by the present micro-instruction. The five lower order bits of the output data but are transferred to the micro-instruction register according to mask bits in the constant fields. For alteration of the first instruction field, bits $b_{41}$, $b_{42}$, and $b_{43}$ of the constant field are to the mask bits. For alteration of the second instruction field, bits $b_{45}$, $b_{46}$, and $b_{47}$ are the mask bits. The first bit of each of the above groups control alteration of the source sub-field. The second bit controls the operator sub-field and the third bit controls the destination sub-field. The masked bits, when set, allow alteration of their respective sub-fields.

The 33 bit register 810 and the 16 bit register 812 are responsive to the alternate instruction code control signal AIC to enter five data bits on the BUS (output) into a selected ONE of the two registers.

Another control signal produced by the decoder 820 is the intermediate word inhibit control signal IWI. The intermediate work inhibit control signal IWI inhibits execution of the alternate word assocaited with the intermediate word inhibit signal IWI. Thereafter, both words are executed.

Another control signal produced by the decoder 820 is the word inhibit control signal WI which inhibits the execution of the succeeding alternate words. The alternate word is the one not containing the instruction inhibit control. This inhibit condition js maintained until a clear word inhibit control signal CWI is executed.

The clear word inhibit control signal CWI inhibits the word inhibit control signal WI returning the processor to the normal state when the full word is executed. The clear word inhibit control signal CWI must appear in the word being executed. Any clear word inhibit control signal CWI appearing on the inhibited word will not be executed. The reset is immediate, that is, the alternate word associated with the clear word inhibit control signal CWI will be executed.

In addition to feeding these control signals to the 33 bit register 810 and the 16 bit register 812, words are transferred between the decoder 820 and the other micro-instruction register character M2'.

It should, of course, be understood that there are other arrangements that can be used for the micro-instruction register character M2 and that the above described arrangement is merely meant to be exemplary of the modularity of the character.

Decoder 820 also produces signals ID1 and ID2 which are used by th timing base generator 828 to determine whether or not the RESET J signal will be issued.

In addition to providing internal timing signals, timing base generator 828 is responsible for issuing the reset timing signal RESET J to the previously described micromemory register character G1, general logic character L1, arithmetic logic character L2, and input/output character L3. Depending on the relationship of these characters to the micro-instruction register character M2 in question, these characters will use the RESET J signal either as RESET I or RESET II. The function of RESET I and RESET II is described in reference to each of the above mentioned characters. Basically, the RESET J signal of a given micro-instruction register character M2 connects to the RESET I input of all mentioned characters which are directly controlled by that micro-instruction register character M2 through its micro-instruction word, and connects to the RESET II input of all mentioned characters of an alternate logic unit not directly controlled by the given micro-instruction register character M2.

RESET J is normally issued twice every cycle time. However, its release during the first half of the cycle time is conditioned upon the absence of an ID1 command; it is released during the second half of the cycle time only if command ID2 is absent. The effect of not releasing the RESET J signal during a given half-cycle is that the register whose destination code is specified during that half cycle (FIG. 2*b*) does not receive the usual reset or pre-clear signal (the pre-clear or reset signals are those specified as $\overline{\text{RESET}}$ on micromemory register storage character G1 and general logic character L1, $\overline{\text{RESET A}}$ and $\overline{\text{RESET B}}$ on arithmetic logic character L2, and $\overline{\text{R1}}$, $\overline{\text{R2}}$, $\overline{\text{R3}}$, $\overline{\text{R4}}$, and $\overline{\text{RESET}}$ on input/output character L3). The absence of these signals are negligible on those bits of the specified register which are reset (or storing "038 ). However, lack of these signals means that bits of the specified register thatare set (or storing "1") will not be reset (or "cleared") prior to the writing of new data on them. The result is that they will retain their set or "1" state regardless of the state of incoming data from the BUS (output) or elsewhere. Thus, a logical "OR" is accomplished on the register between the data it was storing prior to that particular half cycle and the data incoming to it from the BUS (output) or other means during that particular half cycle.

Thus, use of timing signal control on micro-instruction register character M2 adds logical "OR" capability to the system.

EXPANSION OF THE MICROMEMORY COUNTER CHARACTER M1, MICRO-ARRAY CHARACTER MM, AND MICRO-INSTRUCTION REGISTER CHARACTER MZ

Figure 57:
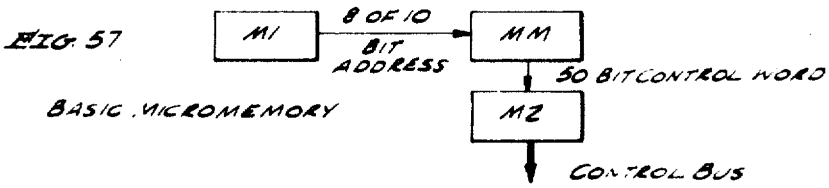
FIG. 57 is a block diagram illustrating a basic micromemory control unit.

Micromemory counter character M1, micro-array character MM, and micro-instruction register character M2 make up the control micromemory of the digital machine. In its minimal form the control micromemory consists of one each of the three above referenced "M" characters. At least one of each character is needed for a functioning micromemory, as illustrated in FIG. 57.

Figure 58:
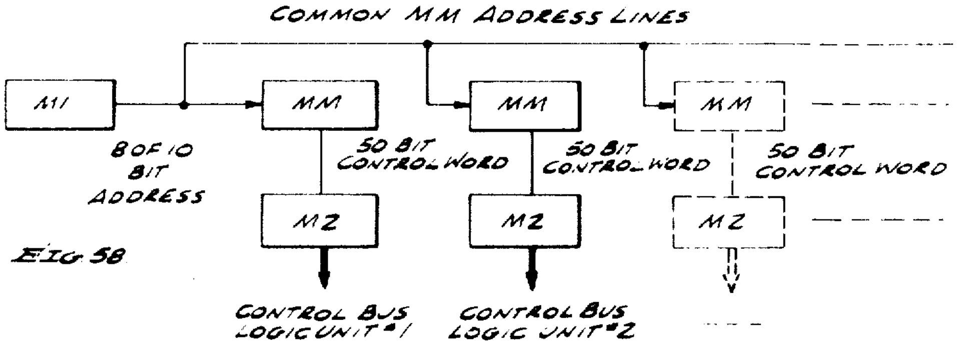
FIG. 58 is a functional block diagram illustrating parallel computation expansion utilizing a plurality of micro-array characters MM and micro-instruction register character M2.

As discussed with respect to parallel computation expansion, addition to each logic unit requires addition of one micro-array character MM to store the control words for that unit and a micro-instruction register character M2 to hold and partially decode the current control word and to provide the control bus for that added unit (FIG. 58). As discussed before, the added micro-array character MM output words from the same address as the first, so all micro-array characters MM receive the same address from micromemory counter character M1. The overall effect with respect to the micro-array characters MM is to provide a single 256 word ROM (Read-Only-Memory) of 50, 100, 150, etc. bit word lengths.

There is relatively little interaction between micro-instruction register characters M2 added in this manner. In fact, a micro-instruction register character M2 does little more than hold and decode the output of a given micro-array character MM, and except for operations of instructions WI, CWI, and IWI discussed in the micro-instruction register character M2 portion each M2 character more or less stands alone. So micro-instruction register character M2 does not "expand" in the same sense as the other characters as indicated by FIG. 58.

Figure 59:
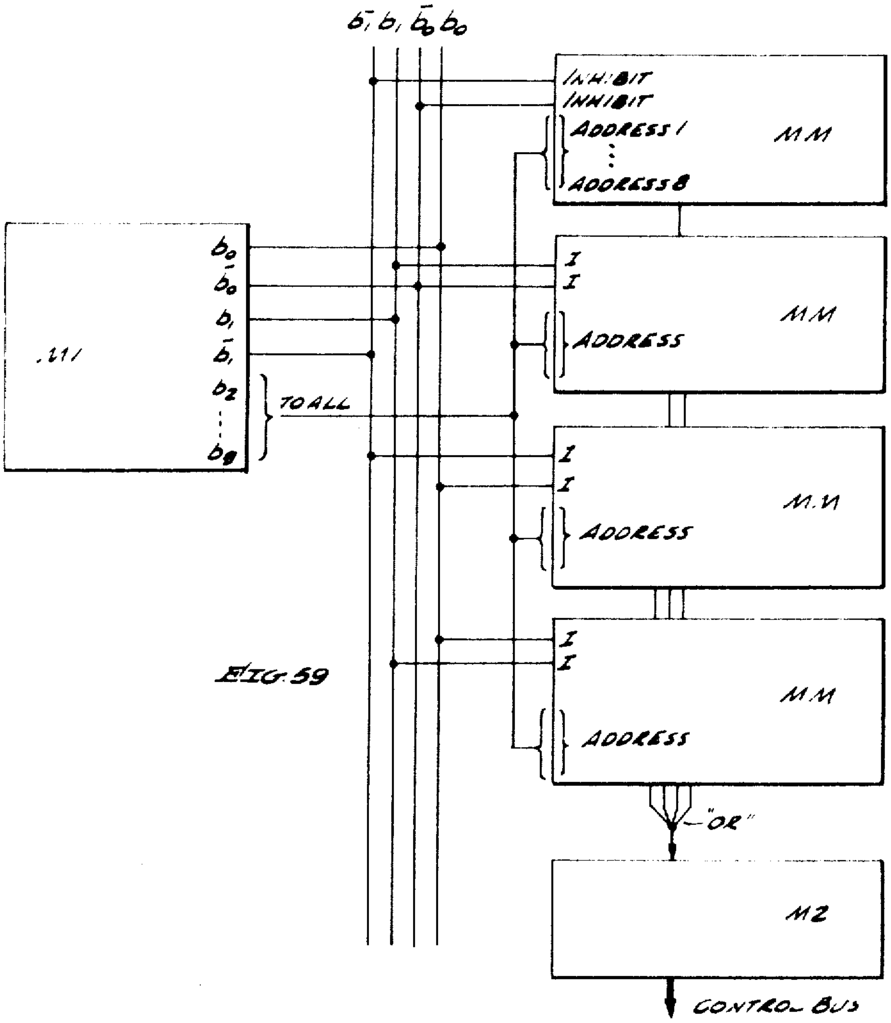
FIG. 59 is a functional block diagram illustrating expansion in the word dimensioned utilizing a plurality of micro-array characters MM.

Micro -array character MM is also capable of providing expansion in the word dimension as illustrated in FIG. 59 to provide ROM's of 256, 512, 768, and 1024 words of the necessary bit length. Thus, the control micro-program of each logic unit may have available to it storage space of either of the above four choices.

This is accomplished by selective connection of the eight address input pins and two character inhibit pins on each micro-array character MM to the address output pins of the micromemory counter character M1, which include all 10 bits of the address $b_0$ through $b_9$ plus the negated or inverted signals of the two most significant address bits $\bar{b}_0$ and $\bar{b}_1$. The least significant eight address bits $b_2$ through $b_9$ connect to the eight address inputs on each micro-array character MM. This selects the one word of 256 desired providing that the character MM is "enabled" or more properly not inhibited by either of its two inhibit input signals.

Assume a full 1024 word ROM contained on four MM characters. The character MM storing words 0000000000 through 0011111111 receives $b_0$ and $b_1$ on its inhibit inputs. It will thus only respond when $b_0$ and $b_1$ are both zero. If this is true, it will output 1 of 256 words depending on the state of bits $b_2$ through $b_9$. Similarly, the character MM storing words 0100000000 through 0111111111 receives $b_0$ and $\bar{b}_1$ on its inhibit inputs. It will respond only when $b_0$ $b_1$ = 01. It this is true, it will output the 1 of 256 words specified by bits $b_2$ through $b_9$. Similarly, the character MM storing words 1000000000 through 1011111111 receives $\bar{b}_0$ and $b_1$ on its inhibit input and responds only to words in which $b_0 = 1$ and $b_1 = 0$. The last character MM stores words 1100000000 through 1111111111 and receives $\bar{b}_0$ and $\bar{b}_1$ on its inhibit inputs.

The outputs of all four of the above micro-array characters MM are connected to the input of a common-micro-instruction register character M2. This is possible by techniques such as collector or wiring OR-ing since only the character MM will output a data word at a time.

Notice that the connection is made in such a way that four, three, two or only one character MM could be connected simply by leaving out those characters MM of FIG. 59 not desired. Thus, the desired degree of expansion is accomplished.

Figure 60:
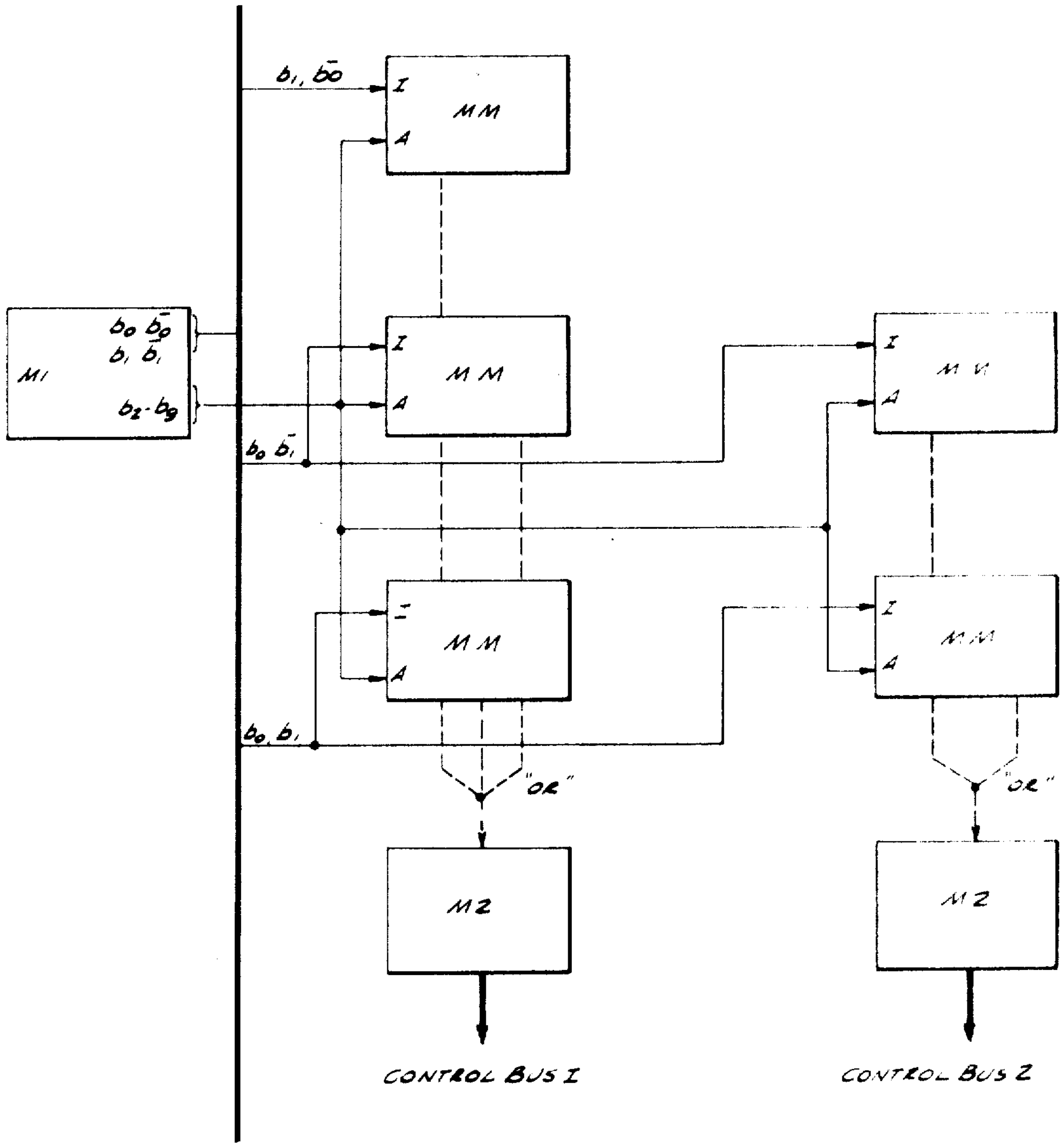
FIG. 60 is a functional block diagram illustrating both parallel computation expansion and word dimension expansion.

As illustrated in FIG. 60, both the type of expansion illustrated in FIG. 58 and the type illustrated in FIG. 59 could be used simultaneously. Furthermore, if this is done, one, two, three or four micro-array characters MM could be connected to each micro-instruction register character M2 independently of the number of character MM connected to any other character M2.

Micromemory counter charater M1 "expansion" is limited to the following feature. The character M1 is controlled by information from micro-instruction register characters M2 and feed-back from logic units. Two complete, identical and independent feed-back control networks are provided which use two complete, identical and independent sets of pins on character M1. Use of both sets of pins and networks is not required. Thus, at the discretion of the circuit designer, character M1 may be controlled by feed-back from one or two logic units and characters M2. With respect to the discussion on micromemory counter character M1, the two networks and pin sets are distinguished by the presence or absence of the "prime" mark on each mnemonic. If both networks are active and both enter a micro-program jump to the micromemory counter MMC simultaneously, the state of the micromemory counter MMC will become the logical "OR" of the two jump addresses.

While the salient features have been illustrated and described with respect to the particular embodiments, it should be readily apparent that modifications can be made within the spirit and scope of the invention.

What is claimed is:

1. In a data processing system, modular digital equipment providing an expanded data processing system comprising:

individual modular units including a logic unit module for logical processing of data bytes and storage unit module for storing data bytes, said storage unit module having first and second storage input busses for supplying first and second data bytes in parallel providing concurrent random selection of storage locations for the parallel data bytes;

a logic function expansion arrangement of logic unit modules including a plurality of groups of substantially identical logic unit modles, each group of said plurality of groups having parallel bus outputs assigned to a respective plurality of first, or plurality of second storage input busses of a plurality of storage unit modules whereby data bytes outputted from a group are distributed to a plurality of storage unit modules by parallel bus outputs of the group;

each logic unit module having a respective logic output bus and a multiplicity of logic input busses for supplying data bytes in parallel to the logic unit module, each of said logic input busses supplying an individual data byte to the respective logic module and logical circuit means coupled to the logic input busses included in the logical module for performing logical operations on the data byte supplied to the logic input busses to provide logical modification of the data byte, said logical circuit means being coupled to the logic output bus of the respective logic module and propagating the data byte to the respective logic output bus for selective storage in the locations of a respective storage module by the assigned first or second storage input data busses for the respective group, and a control input for each of the groups of said logic unit modules for supplying individual logic control signals assigned to respective ones of the groups to provide for controlling the logical circuit means of logic modules of the respective groups;

a data storage expansion arrangement in combination with the logic expansion arrangement for functional expansion of the data processing system including a plurality of substantially identical storage unit modules, each of said storage unit modules including a plurality of storage input busses for supplying in parallel individual data bytes, a plurality of data registers including storage gating circuit means for selectively storing the data bytes supplied by the first and second input data busses to the data registers of the storage module, and storage control means individual to each storage module producing storage control signals for controlling said gating circuit means;

said storage control means for each storage module including a plurality of storage decoders individual to an assigned one of said first and second input busses;

each storage decoder having inputs for receiving address signals designating both said storage module and any selected one of said data registers within said individual storage module, and the individual storage decoder supplies to the gating circuit means in response to received address signals, storage control signals for the respective first or second input bus whereby respective data bytes supplied by respective ones of said first and second storage input busses are selectively stored in respectively addressed registers of the storage module;

said first and second groups of logic unit modules being assigned to respective ones of the first and second storage input busses of the plurality of storage modules including coupling of the logic output busses of the first group to respective first storage input busses, coupling logic output busses of the second group to respective second storage input busses whereby a data byte supplied to the first or second group for logical operations by the respective group may be selectively stored in registers of the respective storage modules according to the seelection of one of the logic modules in the respective first and second groups.

2. The modular digital equipment of claim 1 in which each of said storage unit modules further includes:

first and second individual storage output busses coupled to logic input busses of logic modules of different groups, each of said storage output busses capable of outputting in parallel a data byte from a selected one of said plurality of data registers of the respective storage modules;

storage output gating circuit means within each storage module for selectively coupling individual ones of the registers within the storage module to individual ones of said first and second storage output busses of the respective storage module;

storage output control means, individual to the respective storage module for controlling the respective storage output gaging means, said storage output control means including a plurality of storage output decoders;

each storage output decoder being individual to an assigned one of said first and second storage output busses of the respective storage module and the individual storage decoder has inputs for receiving storage output address signals designating both said individual storage module and any selected one of said data registers within said individual storage module, and the individual output storage decoder supplies to the gating circuit means in response to received address signals, otuput control signals for the respective first or second storage output bus, whereby respective data bytes stored in respectively addressed registers of the storage unit, are selectively outputted by respective storage output data busses, and data bytes stored in registers of the plurality fo storage modules are concurrently accessible to each of the groups of logic modules on respective first and second storage output busses of a storage module by also addressing the first or second storage output bus assigned to the respective group of logic modules.

3. The modular digital equipment of claim 1 in which said logical circuit means of each logic module of a group comprises rotate circuit means coupled to the logic input busses for rotating data supplied to logic input busses, and decoder circuit means individual to said logic module for decoding logic control signals assigned to the respective group of logic modules, said rotate circuit means being responsive to the decoded logic control signals for rotating the bits of a data byte supplied to an input bus, a predetermined number of bit positions including $(n-1)$ bit positions according to the control signal assigned to the respective group wherein $n$ = number of bits in a data byte.

4. The modular digital equipment of claim 3 in which said rotate circuit means of each logic module of a group comprises first and second stage rotate circuit means in which said first stage rotate circuit means provides for rotating bits of a data byte and the second stage rotate circuit means is coupled to said first stage rotate means to receive rotated bits from the first stage, and input busses are provided for supplying data bytes from other logic modules for further rotation incuding $(k-1)n$ bit positions where $k$ is the number of data bytes.

5. The modular digital equipment according to claim 4 in which said logic circuit means includes a complementer logic circuit coupled to receive logic control signals and coupled to receive the data byte received on the logic input busses for performing a logic operation of complement thereon, wherein the complemented data byte is coupled to the logic output bus means.

6. The modular digial equipment according to claim 1 in which the logic unit decoder means includes circuit means operable in response to said logic control signals to produce mask bits which are fed to said rotate circuit for masking predetermined bits of the rotated digital signals during rotation.

7. In a data processing system including peripheral storage equipment for mass data storage and a main memory providing individually addressable word storage locations, a data processor comprising:

a group of individual modules having a common data bus, each module having control inputs and at least one decoder for individual control of the respective module, at least one data input bus and one data ouptut bus for each module, and individual modules of the group having different data processor functions which are expandable by addition of modules of corresponding function and combined by interconnection of data busses to provide a single data processor of the derived functional capacity for processing data, each data bus supplying in parallel an individual data byte, said individual modules of the group having different processor functions including:

a data storage module having a plurality of individually addressable data storage registers for storage of operands within the data processor and input and output control means including individual input and output decoders coupled to respective input and output control inputs;

said input and output control means being responsive to control signals to provide respective input and output control of addressing a respective one of the data storage modules and individual one of the data registers of the addressed data storage module for selectively accessing data byte storage locations provided by the respective data registers of the module for selective storage of operands supplied on the input bus, and selectively accessing operands in the registers to supply an operand on the output bus according to selective control by the output control means whereby input busses of a plurality of data storage modules providing expanded data byte storage in registers of a plurality of storage modules can be connected to said common data bus and provide selective storage of an operand in an addressed register of a storage module selected by the input control means of the respective storage module by addressing of the storage module and individual register of the module;

an input-output storage module included within the data processor and having a plurality of individually addressable data registers for inputting and outputting of data bytes including storage data bytes including operands accessed from the main memory for current prpcessing by the data processor and processed operands being returned to the main memory from the data processor, said input-output module including input and output control means including individual input and output decoders coupled to respective input and output control inputs of the input-output module, said input-output module input and output control means being responsive to control signals applied to respective control inputs to provide respective input and output addressing of the respective input-output modules and individual one of the data registers of the addressed module for selectively accessing data byte storage locations provided by the respective data registers of the addressed module for byte selective storage of operands supplied on the input bus of the input-output machine and selectively accessing operands in the regisrers to supply on the output bus of the input-output module according to selectively control by the respective input and output control means of the input-output module, whereby input busses of a plurality of storage modules can be connected to said common data bus and provide selective storage of an operand in an addressed register on a storage module selected by the input control means of the respective storage module addressing the storage module and individual register of the module;

at least one logic module for the group, said logic module comprising logical circuit means for processing of operands coupled to individual input busses of the logic module to provide for logical operations on operands according to control signals supplied to its control inputs and decoded by the decoder of the logic module;

said logic module having a plurality of parallel data input busses individually coupled directly to respective output busses of the storage modules of the group to provide individual data byte paths directly from the respective output busses of the storage modules to the respective input busses whereby the operands accessed from the respective storage modules are individually routed directly to the logic module for processing by the logical circuit means wherein the processed operands are coupled to th data output but of the logic module and wherein the data output bus of the logic module is coupled to said common data bus to provide a common data path to said storage modules by respective input busses of the storage modules; and processor control means individual to the group of modules and including means for storing and decoding instructions for providing control signals at the control inputs of the modules of the group, said control signals including (a) destination control signals selectively coupled to the input control means of each of the storage modules to provide selection of both the individual storage module and register of the module for storage of an operand on the command data bus, (b) source control signals selectively coupled to the output control means of the storage modules for controlling accessing of an operand stored in an individual register of one of the storage modules to selectively supply an individual one of the operands to an assigned data input bus of the logic module for processing according to control signals supplied by the processor control mesns to the control inputs of the logic module to provide a processed operand on the data output bus of the logic module to a common data bus for storage in a register of a module designated by destination control signals and supplied to the input control means of the storage modules, and (c) logic control signals selectively applied to the logic module for controlling the logical operations on the operands by the logical circuit means of the logic module.

8. The data processor of claim 7 which further includes an arithmetic module having control inputs and input and output data busses, said input data bus being coupled to the common data bus for receiving operands supplied from storage modules to the common data bus through a logic module, said arithmetic module comprising input control means including a decoder responsive to destination control signals applied to its control inputs to provide for the arithmetic module for receiving an operand on the common data bus;

a data register for storing an operand received by the arithmetic module and an adder for summing data bytes including receiving operands to provide an output at the output bus of the arithmetic unit which output bus is coupled to a respective assigned input bus of the logic module for logical operation and outputting to said common data bus.

9. The data processor of claim 7 which further comprises at least one additional data storage module in the group to provide a plurality of data storage modules which are interconnected in parallel to at least one logic module to increase the operand storage capacity of the data processor.

10. The data processor of claim 9 in which the input busses of the data storage modules are coupled to said common data bus and the output busses of respective data storage modules are connected to respective input busses of a logic module to provide functional expansion of the data processor by increased operand storage capacity of the group.

11. The data processor of claim 9 in which at least one logic module is added to the group and interconnected in parallel to the storage modules to increase the logical capacity of the data processor group.

12. The data processor of claim 11 in which the output busses of the logic modules are connected to a common data bus which common data bus is connected to the input data busses of the storage modules to selectively store data outputs of the logic module in a selected register of a selected module according to the control signals supplied by the processor control means

13. The data processor of claim 9 which further includes a second common data bus, and added storage and logic modules are assigned to parallel data byte operations for expansion of word length including a plurality of data bytes, said common data busses being coupled to respective input data busses of the storage modules of a respective one of two subgroups and the output bus of at least one logic module of each of the respective subgroups is connected to a respective one of the common data busses individual to a subgroup.

14. The data processor of claim 7 in which said data storage module having a plurality of data registers includes a plurality of input data busses including first and second input data busses coupled to the data registers of the respective data storage modules, a pluality of output data busses including first and second output data busses coupled to the data registers of the respective data storage modules, and first and second control inputs for the data storage module and furter includes:

a plurality of said data storage modules;

first and second sets of said logic modules;

first and second common data busses; and first and second processor control means for supplying first and second sets of control signals to respective control inputs of first and second sets of logic modules and respective first and second control inputs of the data storage modules to provide first and second groups of individual modules for the data processor;

said first and second output data busses of the plurality of data storage modules being connected to individual logic input busses of the first and second sets respectively of the logic modules and the output busses of the first and second sets of logic modules being connected to respective first and second common data busses which common data busses are connected to first and second input busses respectively, of the data storage module whereby operands stored in the plurality of data registers are selectively coupled to either the first and second sets of logic modules by the output control means individual to each of the output data busses of the plurality of data storage modules and said first and second sets of logic modules provide for processing of operands coupled thereto in response to first and second control signals supplied to the logic control inputs from the first and second processor control means respectively for the first and second groups.

15. In a data processing system including peripheral storage equipment for mass data storage and a main memory providing individually addressable word storage locations, a data processor comprising:

a group of individual modules having a common data bus, each module having control inputs and at least one decoder for individual control of the respective module, at least one data input bus and one data input bus for each module, and individual modules of the group having different data processor functions which are expandable by addition of modules of corresponding functions and combined by interconnection of data busses to provide a signle data processor of the derived functional capacity for processing data, each data bus supplying in parallel an individual data byte, said individual modules of the group having different processor functions including:

a plurality of data storage modules having a plurality of individually addressable data registers for sleectively storing individunal data bytes in respective registers, an input bus coupled to said common data bus, an output bus and individual input and output circuit means coupled to respective control inputs for selective accessing storage locations of said registers for storing data butes, on the common data bus and outputting data butes on its output bus;

at least on logic module having a plurality of individunal input busses for prviding an assigned input bus for each output bus of other modules whereby data bytes accessed from the storage modules are coupled directly to the logic module on the respectively assigned one of the input busses;

said logic module including logical circuit means for general logical operations on all data bytes accessed from the storage modules and coupled to respective input busses of the logic module by respective data output busses of the respective storage modules.

16. The data processor of claim 15 in which the processor includes a plurality of logic modules, each of said plurality of logic modules having circuit means for rotating of bit positions of data bytes coupled to an input bus of the logic module and an output bus for the rotate circuit means is provided which is coupled to a plurality of logic modules by respectively assigned input busses for byte rotation whereby data bytes operated on by the rotate circuit means of one logic unit are supplied to the other logic modules for byte rotation.

* * * * *